US007797336B2

(12) United States Patent
Blair et al.

(10) Patent No.: US 7,797,336 B2
(45) Date of Patent: Sep. 14, 2010

(54) SYSTEM, METHOD, AND COMPUTER PROGRAM PRODUCT FOR KNOWLEDGE MANAGEMENT

(76) Inventors: Tim W Blair, 2250 Latham St., No. 21, Mountain View, CA (US) 94040; Andrew S DeWolfe, 947 Willowleaf Dr., San Jose, CA (US) 95128; Paul B Germeraad, 14606 Horseshoe Dr., Saratoga, CA (US) 95070; Irving S Rappaport, 1500 Edgewood Dr., Palo Alto, CA (US) 94301; Kevin G Rivette, 2165 Waverly St., Palo Alto, CA (US) 94301; Brent Rosenquist, 707 Continental Cir., #2116, Mountain View, CA (US) 94040

( * ) Notice: Subject to any disclaimer, the term of this patent is extended or adjusted under 35 U.S.C. 154(b) by 357 days.

(21) Appl. No.: 09/848,437

(22) Filed: May 4, 2001

(65) Prior Publication Data
US 2002/0007373 A1    Jan. 17, 2002

Related U.S. Application Data

(63) Continuation-in-part of application No. 08/921,369, filed on Aug. 29, 1997, which is a continuation-in-part of application No. 08/867,392, filed on Jun. 2, 1997, now Pat. No. 5,991,751.

(51) Int. Cl.
*G06F 17/30* (2006.01)
(52) U.S. Cl. ...................................................... 707/773
(58) Field of Classification Search .................... 707/3, 707/4, 5, 10, 106.1
See application file for complete search history.

(56) References Cited

U.S. PATENT DOCUMENTS 4,205,780 A    6/1980    Burns et al.

(Continued)

FOREIGN PATENT DOCUMENTS

EP    0239884    10/1987

(Continued)

OTHER PUBLICATIONS

Osborn et al., "Evaluating Document Retrieval in Patent Database: a Preliminary Report", Proceedings of the 6th International Conference on Information and Knowledge Management, 1997, pp. 216-221.*

(Continued)

*Primary Examiner*—Khanh B Pham
(74) *Attorney, Agent, or Firm*—Sterne, Kessler, Goldstein & Fox P.L.L.C.

(57) ABSTRACT

A system, method, and computer program product of enabling a user to organize and analyze information in electronic form are described herein. The method operates by searching a first set of documents to thereby generate a second set of documents. The method automatically creates a first group comprising the second set of documents. The method analyzes the first group according to one or more analytical functions to thereby generate a third set of documents. The method automatically creates a second group comprising the third set of documents. The method enables selective iteration of any of these operational steps. The method also generates objects corresponding to process components of this work flow. The user can re-execute the work flow (process) by traversing the objects, or create a new process by modifying the objects.

72 Claims, 33 Drawing Sheets

U.S. PATENT DOCUMENTS

| | | |
|---|---|---|
| 4,270,182 A | 5/1981 | Asija |
| 4,486,857 A | 12/1984 | Heckel |
| 4,533,910 A | 8/1985 | Sukonick et al. |
| 4,555,775 A | 11/1985 | Pike |
| 4,613,946 A | 9/1986 | Forman |
| 4,622,545 A | 11/1986 | Atkinson |
| 4,686,590 A | 8/1987 | Kunii et al. |
| 4,716,476 A | 12/1987 | Okada et al. |
| 4,719,523 A | 1/1988 | Kutaragi |
| RE32,632 E | 3/1988 | Atkinson |
| 4,736,308 A | 4/1988 | Heckel |
| 4,748,618 A | 5/1988 | Brown et al. |
| 4,752,889 A | 6/1988 | Rappaport et al. |
| 4,772,882 A | 9/1988 | Mical |
| 4,785,408 A | 11/1988 | Britton et al. |
| 4,788,538 A | 11/1988 | Klein et al. |
| 4,812,834 A | 3/1989 | Wells |
| 4,847,604 A | 7/1989 | Doyle |
| 4,868,733 A | 9/1989 | Fujisawa et al. |
| 4,873,623 A | 10/1989 | Lane et al. |
| 4,884,223 A | 11/1989 | Ingle et al. |
| 4,899,136 A | 2/1990 | Beard et al. |
| 4,914,732 A | 4/1990 | Henderson et al. |
| 4,931,783 A | 6/1990 | Atkinson |
| 4,935,865 A | 6/1990 | Rowe et al. |
| 4,939,507 A | 7/1990 | Beard et al. |
| 4,959,769 A | 9/1990 | Cooper et al. |
| 4,977,455 A | 12/1990 | Young |
| 4,985,863 A | 1/1991 | Fujisawa et al. |
| 4,991,087 A | 2/1991 | Burkowski et al. |
| 5,008,853 A | 4/1991 | Bly et al. |
| 5,021,989 A | 6/1991 | Fujisawa et al. |
| 5,029,013 A | 7/1991 | Hiratsuka et al. |
| 5,062,060 A | 10/1991 | Kolnick |
| 5,072,412 A | 12/1991 | Henderson, Jr. et al. |
| 5,120,944 A | 6/1992 | Kern et al. |
| 5,142,674 A | 8/1992 | Barker et al. |
| 5,148,154 A | 9/1992 | MacKay et al. |
| 5,155,806 A | 10/1992 | Hoeber et al. |
| 5,157,768 A | 10/1992 | Hoeber et al. |
| 5,163,104 A | 11/1992 | Ghosh et al. |
| 5,179,643 A | 1/1993 | Homma et al. |
| 5,183,404 A | 2/1993 | Aldous et al. |
| 5,206,830 A | 4/1993 | Isobe et al. |
| 5,222,160 A | 6/1993 | Sakai et al. |
| 5,228,123 A | 7/1993 | Heckel |
| 5,237,158 A | 8/1993 | Kern et al. |
| 5,241,671 A | 8/1993 | Reed et al. |
| 5,251,294 A | 10/1993 | Abelow |
| 5,253,362 A | 10/1993 | Nolan et al. |
| 5,276,616 A | 1/1994 | Kuga et al. |
| 5,283,894 A | 2/1994 | Deran |
| 5,319,745 A | 6/1994 | Vinsonneau et al. |
| 5,327,235 A | 7/1994 | Richards |
| 5,334,030 A | 8/1994 | Brilliott |
| 5,349,170 A | 9/1994 | Kern |
| 5,353,059 A | 10/1994 | Lawlor et al. |
| 5,359,428 A | 10/1994 | Kubota et al. |
| 5,359,508 A | 10/1994 | Rossides |
| 5,381,175 A | 1/1995 | Sudo et al. |
| 5,392,428 A | 2/1995 | Robins |
| 5,402,336 A | 3/1995 | Spiegelhoff et al. |
| 5,404,295 A | 4/1995 | Katz et al. |
| 5,404,514 A | 4/1995 | Kageneck et al. |
| 5,428,778 A | 6/1995 | Brookes |
| 5,430,681 A | 7/1995 | Sugawara et al. |
| 5,432,897 A | 7/1995 | Tatsumi et al. |
| 5,434,962 A | 7/1995 | Kyojima et al. |
| 5,440,481 A | 8/1995 | Kostoff et al. |
| 5,442,778 A | 8/1995 | Pedersen et al. |
| 5,444,615 A | 8/1995 | Bennett et al. |
| 5,444,779 A | 8/1995 | Daniele |
| 5,452,018 A | 9/1995 | Capitant et al. |
| 5,481,666 A | 1/1996 | Nguyen et al. |
| 5,511,186 A | 4/1996 | Carhart et al. |
| 5,519,857 A | 5/1996 | Kato et al. |
| 5,530,520 A | 6/1996 | Clearwater |
| 5,537,526 A | 7/1996 | Anderson et al. |
| 5,540,597 A | 7/1996 | Budman et al. |
| 5,544,302 A | 8/1996 | Nguyen |
| 5,544,352 A | 8/1996 | Egger |
| 5,550,976 A | 8/1996 | Henderson et al. |
| 5,551,055 A | 8/1996 | Matheny et al. |
| 5,553,216 A | 9/1996 | Yoshioka et al. |
| 5,557,722 A | 9/1996 | DeRose et al. |
| 5,557,785 A | 9/1996 | Lacquit et al. |
| 5,559,942 A | 9/1996 | Gough et al. |
| 5,568,639 A | 10/1996 | Wilcox et al. |
| 5,576,954 A | 11/1996 | Driscoll |
| 5,581,686 A | 12/1996 | Koppolu et al. |
| 5,583,982 A | 12/1996 | Matheny et al. |
| 5,584,035 A | 12/1996 | Duggan et al. |
| 5,592,607 A | 1/1997 | Weber et al. |
| 5,592,608 A | 1/1997 | Weber et al. |
| 5,594,837 A | 1/1997 | Noyes |
| 5,596,700 A | 1/1997 | Darnell et al. |
| 5,604,901 A | 2/1997 | Kelley et al. |
| 5,615,112 A | 3/1997 | Sheng et al. |
| 5,615,328 A | 3/1997 | Hadderman et al. |
| 5,615,362 A | 3/1997 | Jensen et al. |
| 5,619,632 A | 4/1997 | Lamping et al. |
| 5,623,679 A | 4/1997 | Rivette et al. |
| 5,623,681 A | 4/1997 | Rivette et al. |
| 5,628,003 A | 5/1997 | Fujisawa et al. |
| 5,630,125 A | 5/1997 | Zellweger |
| 5,632,031 A | 5/1997 | Velissaropoulos et al. |
| 5,634,012 A | 5/1997 | Stefik et al. |
| 5,634,051 A * | 5/1997 | Thomson ........................ 707/5 |
| 5,638,519 A | 6/1997 | Haluska |
| 5,642,502 A | 6/1997 | Driscoll |
| 5,692,176 A | 11/1997 | Holt et al. |
| 5,696,963 A | 12/1997 | Ahn |
| 5,721,910 A * | 2/1998 | Unger et al. .................. 707/100 |
| 5,732,216 A | 3/1998 | Logan et al. |
| 5,748,956 A | 5/1998 | Lafer et al. |
| 5,754,840 A | 5/1998 | Rivette et al. |
| 5,761,497 A | 6/1998 | Holt et al. |
| 5,765,152 A | 6/1998 | Erickson |
| 5,774,833 A | 6/1998 | Newman |
| 5,787,424 A * | 7/1998 | Hill et al. ........................ 707/6 |
| 5,794,257 A | 8/1998 | Liu et al. |
| 5,799,325 A | 8/1998 | Rivette et al. |
| 5,806,079 A | 9/1998 | Rivette et al. |
| 5,808,615 A | 9/1998 | Hill et al. |
| 5,809,318 A | 9/1998 | Rivette et al. |
| 5,826,252 A | 10/1998 | Wolters, Jr. et al. |
| 5,832,476 A | 11/1998 | Tada et al. |
| 5,848,409 A | 12/1998 | Ahn |
| 5,870,770 A | 2/1999 | Wolfe |
| 5,875,431 A | 2/1999 | Heckman et al. |
| 5,892,900 A | 4/1999 | Ginter et al. |
| 5,918,236 A * | 6/1999 | Wical .......................... 715/500 |
| 5,924,090 A * | 7/1999 | Krellenstein ................... 707/5 |
| 5,933,841 A | 8/1999 | Schumacher et al. |
| 5,950,214 A | 9/1999 | Rivette et al. |
| 5,963,941 A * | 10/1999 | Hirakawa ....................... 707/5 |
| 5,990,897 A | 11/1999 | Hanratty |
| 5,991,751 A | 11/1999 | Rivette et al. |
| 5,999,907 A | 12/1999 | Donner |
| 6,003,033 A | 12/1999 | Amano et al. |
| 6,006,257 A | 12/1999 | Slezak |
| 6,041,323 A | 3/2000 | Kubota |
| 6,067,528 A | 5/2000 | Breed et al. |
| 6,078,913 A | 6/2000 | Aoki et al. |

| | | | |
|---|---|---|---|
| 6,151,595 | A | 11/2000 | Pirolli et al. |
| 6,169,995 | B1 | 1/2001 | Yoshimura et al. |
| 6,175,824 | B1 | 1/2001 | Breitzman et al. |
| 6,279,014 | B1 | 8/2001 | Schilit et al. |
| 6,282,545 | B1 | 8/2001 | Coats |
| 6,339,767 | B1 | 1/2002 | Rivette et al. |
| 6,389,434 | B1 | 5/2002 | Rivette et al. |
| 6,393,406 | B1 | 5/2002 | Eder |
| 6,460,034 | B1 * | 10/2002 | Wical .......................... 707/5 |
| 6,499,026 | B1 | 12/2002 | Rivette et al. |
| 6,556,992 | B1 | 4/2003 | Barney et al. |
| 6,581,039 | B2 | 6/2003 | Marple et al. |
| 6,963,920 | B1 | 11/2005 | Hohmann et al. |
| 7,437,471 | B2 | 10/2008 | Hohmann et al. |
| 7,523,126 | B2 | 4/2009 | Rivette et al. |
| 2002/0035499 | A1 | 3/2002 | Germeraad et al. |
| 2002/0055924 | A1 | 5/2002 | Liming |
| 2002/0077835 | A1 | 6/2002 | Hagelin |
| 2002/0082778 | A1 | 6/2002 | Barnett et al. |
| 2003/0204514 | A1 | 10/2003 | Owens et al. |
| 2007/0078886 | A1 | 4/2007 | Rivette et al. |
| 2007/0136116 | A1 | 6/2007 | Germeraad et al. |
| 2007/0208669 | A1 | 9/2007 | Rivette et al. |

FOREIGN PATENT DOCUMENTS

| | | |
|---|---|---|
| EP | 0 694 829 A1 | 1/1996 |
| JP | 5-135109 | 6/1993 |
| JP | 6-231141 | 8/1994 |
| JP | 8-221435 | 8/1996 |
| WO | WO 93/25974 A1 | 12/1993 |
| WO | WO 94/14122 A1 | 6/1994 |
| WO | WO 95/00896 A2 | 1/1995 |
| WO | WO 95/14280 A1 | 5/1995 |
| WO | WO 98/16890 | 4/1998 |
| WO | WO/98/34179 | 8/1998 |
| WO | WO 98/44430 | 10/1998 |
| WO | WO 98/55945 | 12/1998 |
| WO | WO 99/62005 | 12/1999 |
| WO | WO 00/11575 A1 | 3/2000 |
| WO | WO 00/52618 A2 | 9/2000 |
| WO | WO 00/60495 A2 | 10/2000 |
| WO | WO 01/73657 A1 | 10/2001 |

OTHER PUBLICATIONS

Cohen, "Browsers get BookWorm for Mac," MacWeek, vol. 7, No. 39, Oct. 4, 1993, p. 4.
Commands and Settings, OmniPage Professional Windows Version 5, Caere Corporation; Chapter 1, pp. 1-1 to 1-70, 1988-1993.
The Complete Document Profiling and Retrieval System for Windows, World Software Corporation, Worldox, Copyright World Software Corp., 1992.
Conklin, "Hypertext: An Introduction and Survey," Computer, pp. 17-41, Sep. 1987.
Cooper et al., "Oh? Pascal?," pp. 389-399, Jan. 1982.
Cote et al., "Searching for Common Threads," Byte, vol. 17, No. 6, Jun. 1992, pp. 290-305.
"ZyIndex Developer's Toolkit for Windows, Version 5.0, Programmers Guide," ZyLab, Copyright 1992, pp. 1-35.
Curran, "Growing company changes data entry," ImagingWorld, vol. 4, Issue 3, Mar. 1995.
"Dataware Technologies: Products and Services," Dataware Technologies, Copyright 1996.
"ZyIndex for Windows User's Guide," ZyLab Division, Copyright 1992, pp. 1-262.
Doherty, "New Op-Disk Peripherals Displayed at Conference," Electronic Engineering Times, No. 339, Jul. 22, 1985, p. 15.
Duncan, "ZyImage's Use of Windows Interface Falls Short of Mark," LXI Times, vol. 10, Issue 10 May 24, 1993, pp. 70 and 79.
"Eastern Electricity: BRS/Search Customer Profile," Dataware Technologies, Copyright 1995.
Editing Recognized Documents, OmniPage Profession Windows Version 5, Caere Corporation, Chapter 3, pp. 3-1 to 3-20, 1988-1993.

"EZ-C+DE2 Images: The New Standard in Data Capture," Textware Corporation, Copyright 1994, pp. 1-8.
The Fastest, Most Powerful Full Text Retrieval System, ZyIndex 5.2 for Windows, Zylab, 1994.
Fersko-Weiss, "3-D Reading with the Hypertext Edge," PC Magazine, vol. 10, No. 10, May 28, 1991, pp. 241-282.
Fish et al., Quilt: a collaborative tool for cooperative writing, Conf. on Information Systems '88, pp. 30 to 37, Jan. 1988.
"Forms Processing Products & Services," TextWare Corporation, Copyright 1996.
"FormWare for Windows 95/NT," TextWare Corporation, Copyright 1996.
"Fuzzy Searching," Executive Technologies, Inc., Last Updated: Jan. 12, 1996.
Gerber, "Lotus rolls out gateway for Notes, cc: Mail," InfoWorld, v. 14, N. 46, p. 1(2), Nov. 1992.
Halasz et al., "Issues in the Design of Hypermedia Systems," CHI '90 Tutorial, Jan. 1990.
Hamey, "TextWare's FormWare—Complex Data Capture that Puts Simplicity First," Imaging Magazine, Apr. 1996.
Haskin, "Textware 4.0: Text Retrieval for Electronic Documents," Computer Shopper, vol. 13, No. 8, Aug. 1993, pp. 334-335.
Haskin, "ZyImage Finds Images and Text," PC-Computing, vol. 6, No. 5, May 1993, p. 60.
Help Yourself! With PCT Patent Search on CD-ROM, MicroPatent, New Haven, CT, appears to be before Jul. 1, 1993.
"Hip Products," ZyLab Europe BV, Copyright 1996.
Holtz, "Mastering Ventura; Second Edition," pp. 360-375, Jan. 1989.
How to Install and Use the USAPat Demonstration Disc, USPTO Office of Information Products Development, 1994(?).
HyperCard Basics, Apple Computer, Inc., 1990.
"IBM Announces Free On-Line Patent Info Service", Communications Media Center at New York Law School Web Page, Mar. 9, 1997.
"IDI brings Basis plus down to workgroups," The Seybold Report on Publishing Systems, v. 22, N. 14, p. 16(2), Apr. 1993.
Ishii, H., et al., "Clearface: Translucent Multiuser Interface for Team Work Station", Proceedings of the Second European Conference on Computer-Supported Cooperative Work, Sep. 1991, pp. 163-174.
"ZyLab: The Full Text Retrieval & Publishing Experts," ZyLab Europe BV, Copyright 1996.
Jonckheere, C., "EPOQUE (EPO QUEry Service) the Inhouse Host Computer of the European Patent Office," World Patent Information, vol. 12, No. 3, pp. 155-157, 1990.
Karraker, "Voyager Toolkit stretches Expanded Book concept to let users pen their own," MacWeek, vol. 6, No. 11, Mar. 16, 1992, p. 9.
Knibbe, "ZyImage 2 boosts OCR, batch duties," InfoWorld, vol. 15, Issue 51, Dec. 20, 1993, p. 20.
Knibbe, "ZyImage 3.0 will facilitate distribution on CD-ROMs; Boasts integration with WordScan OCR software," InfoWorld, vol. 16, No. 38, Sep. 19, 1994, p. 22.
Lexis-Nexis Printout of a Business Wire Article Entitled: TMS Announces Contract With Major Insurance Information Provider, Business Wire Inc., Feb. 11, 1991.
Lexis-Nexis Printout of a Business Wire Article Entitled: TMS Announces Easy View Available for CD-Rom Publishers, Business Wire Inc., Mar. 9, 1992.
Lexis-Nexis Printout of a Business Wire Article Entitled: TMS Announces Release of Inner View 2.1 Software, Business Wire Inc., Mar. 18, 1991.
Lougher et al., Supporting long-term collaboration in software maintenance, Conf. on Organizational Computing Systems, pp. 228-238, 1993.
"ZyLab retrieval engine optimized for CD-ROM; ZyLab, Progressive Technologies merge," Seybold Report on Desktop Publishing, vol. 8, No. 10, Jun. 6, 1994, p. 40.
McEvoy, Ed., Object Linking and Embedding: Programmer's Reference, Version 1, Microsoft Press, Redmond, WA, Copyright 1992.
Mallory, "New for Mac: text/graphics retrieval software from TMS," Newsbytes, Jul. 1992.
Marshall, "Text retrieval alternatives: 10 more ways to pinpoint important information," Infoworld, vol. 14, No. 12, Mar. 23, 1992, pp. 88-89.

Marshall, "ZyImage adds scanning access to ZyIndex," InfoWorld, vol. 16, No. 15, Apr. 11, 1994, pp. 73, 76, and 77.
Marshall, "ZyImage is ZyIndex plus a scan interface integrated," InfoWorld, vol. 15, Issue 10, Mar. 8, 1993, p. 100.
Marshall et al., "ZyIndex for Windows, Version 5.0," InfoWorld, v. 15, N. 21, May 1993, pp. 127, 129, 133 and 137.
"MasterView for Microsoft Windows," TMS Inc., Copyright 1993.
Matazzoni, "Expanded Book Toolkit 1.0.1," Macworld, vol. 10, No. 6, Jun. 1993, p. 158.
Mendelson, "HyperWriter for Windows," PC Magazine, vol. 14, No. 3, Feb. 7, 1995, pp. 140, 142, and 143.
Moore, "Dataware lands $6.6M GPO pact," Federal Computer Week, vol. 9, No. 27, Sep. 11, 1995, pp. 84 and 86.
Moore, "The Forms Processing Paradigm Shift," Imaging Magazine, Mar. 1995.
"NetAnswer Hosting Service," Dataware Technologies, Inc., Copyright 1995.
"NetAnswer: Information Super Server for the World Wide Web," Dataware Technologies, Inc., Copyright 1995.
"NetAnswers: Organizations Worldwide Take Content Onto the Web with NetAnswer," Dataware Technologies, Spring 1996.
OmniPage Professional Tutorials, Windows Version 5, Caere Corp.
Ores, "Hypertext Publishing: Edit Trail," PC Magazine, vol. 14, No. 3, Feb. 7, 1995, pp. 132, 134, 136, and 138.
Patents on CD-ROM, Track Technology, Focus R&D, Watch Competitors, Speed Products to Market, Cut Online/Copy Costs, A World of Opportunities from MicroPatent, MicroPatent USA, New Haven, CT, appears to be before Sep. 1, 1992.
PatentImages, User Profile European Patents, Search & Tech Tips, Conference Calendar, MicroPatent World Newsletter, Spring 1991, New Haven, CT.
A. Pelham, A Wave of the Wand for Litigators. Tools of the Trade Go High-Tech, Focus on Technology, Legal Times, Jan. 24, 1994.
Perenson, "Retrieving Text on the Net," PC Magazine, vol. 14, No. 20, Nov. 21, 1995, p. 61.
Previewing the Letter, WordPerfect Workbook for IBM Personal Computers, WordPerfect Corporation, Version 5.0, Lesson 4, p. 24, and Lesson 13, pp. 108-109, 1988.
Print out of On-Line Help Manual, Innerview for Windows 3.0, Version 2.2, Pre-Release #6, TMS, Inc. 1991-1992.
Quattro Pro User's Guide, Borland Int'l, Inc., pp. 240-245, Jan. 1989.
"Re:Search V. 2.6," Software Product Specification, Computer Select, Jan. 1993.
Rooney, "Text-retrieval veterans prepare Windows attack," PC Week, v. 9, N. 24, p. 46, Jun. 1992.
Rooney, "ZyLab partners with Calera: firms roll out document-image system," PC Week, vol. 10, No. 3, Jan. 25, 1993, p. 22.
Schroeder, "Low Price Point Is Key for Buyers of Text Databases," PC Week, vol. 8, No. 20, May 20, 1991, pp. 120 and 122.
Schroeder, "Multimedia offerings target expanded platform support," PC Week, vol. 10, No. 13, Apr. 5, 1993, pp. 59 and 73.
Schwartz, "Dataware Plants CD-ROM Seeds," Computer Systems News, No. 403, Feb. 6, 1989, p. 33.
Search Results from Dialog Search for MicroPatent for News Releases and Corporate Announcements Relating to APS, FullText, PatentImages, Espace, Dialog Files: 148, 479 and 648, 1989-1991.
Simon, "ZyImage: A Winning Combination of OCR and Text Indexing," PC Magazine, vol. 12, No. 6, Mar. 30, 1993, p. 56.
Simpson, Mastering WordPerfect 5.1 & 5.2 for Windows, p. 58.
Somers, "Personal Text-Retrieval Software Works with Calera's WordScan," PC Magazine, vol. 14, No. 2, Jan. 24, 1995, p. 68.
Spencer, "Tijuana data entry shop logs 500K forms/day," ImagingWorld, vol. 4, Issue 4, Apr. 1995.
Spitzer, "Needles in Document Haystacks" DBMS, vol. 9, No. 1, Jan. 1996, pp. 84-87.
Sullivan, "Dataware's CD Author System to Boast Hypertext Capability," PC Week, vol. 8, No. 31, Aug. 5, 1991, pp. 31-32.
"Text Retrieval Products & Services," TextWare Corporation, Copyright 1996.
"TextWare: Instant Information Access," TexWare Corporation, Copyright 1995.
"TextWare Pricing," TextWare Corporation, Effective Mar. 26, 1996.

Thompson et al., Full Write Professional—A User's Guide, pp. 99-122, 1988.
Torgan, "ZyImage: Document Imaging and Retrieval System," PC Magazine, vol. 12, No. 3, Feb. 9, 1993, p. 62.
"Toshiba America Information Systems: CD-ROM Customer Profile," Dataware Technologies, Copyright 1995.
"Total Recall," Dataware Technologies, Copyright 1995.
Tredennick, Jr., J. C., Full-Text Search and Retrieval Winning Big with Computers, Law Practice Management, vol. 19, No. 8, Nov./Dec. 1993.
Tribute, "Searching CeBit for publishing products; Power Mac draws the crowds at Hannover show," Seybold Report on Publishing Systems, vol. 23, No. 15, Apr. 22, 1994, pp. 5-8.
Ueda, H., et al., "An Interactive Natural-Motion-Picture Dedicated Multi-Media Authoring System", Human Factors in Computing Systems-Reaching Through Technology Conference Proceedings, Mar., 1991, pp. 343-350.
Understanding OCR, OmniPage Professional Windows Version 5, Caere Corporation, Chapter 6, pp. 6-1 and 6-8 and Glossary pp. 1-8, 1988-1993.
"Voyager cd-roms," Voyager, Spring, 1996.
"Voyager: cd-rom catalog," Voyager, 1996-1997.
R. W. Wiggins, "Networked Hypermedia: The World-Wide Web and NCSA Mosaic", from the Internet for Everyone—A Guide for Users and Providers, Chapter 13, pp. 245-290, McGraw-Hill, Inc., 1995.
"WorldView V. 1.1 and WorldView Press V. 1.0.2," Software Product Specification, Computer Select, Nov. 1993.
Young, "UK Police Put Criminals On-Line With New National Computer," Imaging Magazine, Aug. 1995.
"ZyImage," ZyLab International, Inc., Copyright 1996.
"ZyImage: Common Questions Asked About ZyImage," ZyLab Europe BV, Copyright, 1996.
"MicroPatent: Providers of Patent and Trademark Information", from http:www.micropat.com/info/mission.htm, Printed Dec. 6, 1996.
"Where will we be?", from http:www.micropat.com/info/shows.htm, 1996.
"Why should you be interested in Patent Information?", from http:www.micropat.com/info/interested.htm, Printed Dec. 6, 1996.
"Patent Searching and Document Delivery Resources", from http:www.micropat.com/info/websrch.htm, 1996.
"MicroPatent's CD-ROM Products", from http:www.micropat.com/info/about.htm, 1996.
"PatentQuery: Search & Deliver", from http:www.micropat.com/info/prelegal.htm, Printed Dec. 6, 1996.
"MicroPatent PatentWeb and Trademark Web Service Agreement", from http:www.micropat.com/cgi-bin/servagree, Printed Dec. 6, 1996.
"United States MicroPatent® Representatives", from http:www.micropat.com/info.usreps.htm, Printed Dec. 6, 1996.
"Canadian MicroPatent® Representatives", from http:www.micropat.com/info/canreps.htm, Printed Dec. 6, 1996.
"European MicroPatent® Representatives", from http:www.micropat.com/info/epreps.htm, Printed Dec. 6, 1996.
"Asian MicroPatent® Representatives", from http:www.micropat.com/info.asreps.htm, Printed Dec. 6, 1996.
"REAL Software Systems, Inc.", from http://www.elcamino.com/rss/, Copyright 1995, 1997, (2 Pages).
"Intellectual Property Management Issues", from http://www.elcamino.com/rss/2.htm, Copyright 1995, 1997, (2 Pages).
"Solutions for Managing Intellectual Property", from http://www.elcamino.com/rss/3.htm, Copyright 1995, 1997, (2 Pages).
"REAL Software Systems, Inc.: Royalties Payable", from http://www.elcamino.com/rss/3a.htm, Copyright 1995, 1997, (4 Pages).
"REAL Software Systems, Inc.: Alliant Participation Management & Accounting", from http://www.elcamino.com/rss/3b.htm, Copyright 1995, 1997, (4 Pages).
"REAL Software Systems, Inc.: Rights Licensing", from http://www.elcamino.com/rss/3c.htm, Copyright 1995, 1997, (3 Pages).
"REAL Software Systems, Inc.: Home Video & Title Based Distribution", from http://www.elcamino.com/rss/3d.htm, Copyright 1995, 1997, (3 Pages).

"Specialized Services", from http://www.elcamino.com/rss/4.htm, Copyright 1995, 1997, (2 Pages).

"What our customers say about us.", from http://www.elcamino.com/rss/5.htm, Copyright 1995, 1997, (2 Pages).

Samtani, Rajan, "Following the Money: Managing Intellectual Property in the Digital Age", from http://www.elcamino.com/rss/7a.htm, Copyright 1995, 1997, (5 Pages).

"IBM Selects RSS's Royalties Payable Solution: Real Software Systems Provides IBM with WorldWide Software Royalty Payments Solution", from http://www.elcamino.com/rss/7b.htm, Nov. 18, 1996, (2 Pages).

"Universal Selects RSS To Provide Worldwide Television Licensing Solution", from http://www.elcamino.com/rss/7c.htm, Apr. 30, 1997, (2 Pages).

"Agent Searching," Executive Technologies, Inc., Last Updated: Jan. 12, 1996.

Alpert, M., CD-ROM: The Next PC Revolution, Fortune Magazine, Jun. 29, 1992.

Dialog Pocket Guide, by Knight-Ridder Information, Inc., Copyright 1995.

Alexander, M., "Visualizing Cleared-Off Desktops", Computerworld, May 6, 1991, p. 20.

Banet, "Creating a CD-ROM: overview of the product field," The Seybold Report on Desktop Publishing, v. 7, N. 6, p. 3(29), Feb. 1993.

Becker, "Voyager kit: Ticket to books on-line," MacWeek, vol. 7, No. 8, Feb. 22, 1993, p. 57.

Berk et al. eds., Hypertext/Hypermedia Handbook, pp. 209-224, 285-297, 329-355, 529-533, Jan. 1991.

Bermant, "Finding It Fast: New Software Features That Search Your System," Personal Computing, vol. 11, No. 11, Nov. 1987, pp. 125-131.

Bish, "An Essential ingredient: Post recognition processing," Imaging World, vol. 5, Issue 3, Mar. 1996.

Blatt, J., A Primer on User Interface Software Patents, The Computer Lawyer, vol. 9, No. 4, Apr. 1992.

Boedeker et al., "Choosing Imaging Software," Law Office Computing, vol. 5, Issue 3, Jun./Jul., 1995, pp. 50-55.

"Boolean Searching," Executive Technologies, Inc., Last Updated: Jan. 12, 1996.

Bradbury, "Expanded Book Toolkit," MacUser, vol. 9, No. 3, Mar. 1993, p. 85.

Briggs, "CD-ROM publishing boom is Dataware's delight," MIS Week, vol. 10, No. 38, Sep. 25, 1989, pp. 40-41.

Briggs, "Dataware Comes to U.S. With CD-ROM Publishing," MIS Week, vol. 10, No. 5, Jan. 30, 1989, p. 21.

Brockschmidt, Inside OLE 2, Microsoft Press, Redmond, WA, Copyright 1994.

Brockschmidt, "What OLE Is Really About," OLE Development, Microsoft Corporation, Copyright 1997, pp. 1-59.

"BRS/Search: An Industrial Strength Document Warehouse Solution—Profile," Dataware Technologies, Copyright May 1996, pp. 1-12.

"BRS/Search," Dataware Technologies, Inc., date unclear.

Catchings et al., "Price Delineates Text-Retrieval Software," PC Week, vol. 8, No. 20, May 20, 1991, pp. 120-123.

Catchings et al., "Retrieval Technologies Inc.: re:Search 2.0," PC Week, v. 8, N. 20, p. 121(2), May 1991.

Catlin et al., InterNote: Extending a Hypermedia Framework to Support Annotative Collaboration, Hypertext '89 Proceedings, pp. 365 to 378, Nov. 1989.

"CD Author/CD Answer," Dataware Technologies, date unclear.

Kramer, J., "An Evaluation of the Internet as a Searching Tool for Patents and Intellectual Property: Alternative or Complementary?", from http://www.fplc.edu/ipmall/ipcomer/evals97/ipsi97/internetpatsearch.htm, Publication date appears to be before Jun. 2, 1997, Downloaded May 8, 1998.

"Chapter 1: Component Object Model Introduction," OLE Development, Microsoft Corporation, Copyright 1997, pp. 1-37.

"ZyImage Web Server," ZyLab Europe BV, Copyright 1996.

Classified Search and Image Retrieval Student Manual, U.S. Patent and Trademark Office, May 7, 1991.

"Advanced Patent Data Mining and Visualization Capabilities for Information Users," Apparent Press Release, London, apparent publication date of Dec. 3, 1996 (printed from Manning & Napier Information Services web page at www.mnis.net).

"Business Objects Announces Data Mining Partnership With DataMind Corporation," Apparent Press Release, Cupertino, CA, apparent publication date of May 20, 1996 (printed from DataMind web page at www.datamindcorp.com).

"Business Objects to Offer Data Mining for the Masses," Apparent Press Release, San Jose, CA, apparent publication date of Nov. 18, 1996 (printed from Business Objects web page at wwww.businessobjects.com).

"CHI Research Competitor Assessments," printed from the CHI Research web page at www.chiresearch.com, pp. 1-2, 1996.

"CHI Research Corporate Brain Mapping," printed from the CHI Research web page at www.chiresearch.com, pp. 1-2, 1996.

"CHI Research Merger & Acquisition Technology Due Diligence," printed from the CHI Research web page at www.chiresearch.com, pp. 1-2, 1996.

"CHI Research Tracking the World's Technology (About CHI Research, Consulting Services and Information Products, History of CHI Research, Science and Technology Indicators, Patent Citation Analysis, and Key Technology Indicators: Number of Patents, Current Impact Index, Technological Strength, Technology Cycle Time, Science Linkage), " printed from the CHI Research web page at www.chiresearch.com, pp. 1-6, 1996.

Creating Value Through Knowledge Management Conference, Conference handouts, San Francisco, CA, Feb. 20 and 21, 1997.

Edvinsson, Leif et al., Intellectual Capital: Realizing Your Company's True Value by Finding Its Hidden Brainpower, HarperBusiness, New York, NY, 1997.

Kim et al., "Patent Technology Portfolio for SAW Filters," Proceedings 1994 IEEE Ultrasonics Symposium, vol. 1, pp. 139-142, 1994.

Kahaner, Larry, Competitive Intelligence: From Black Ops to Boardrooms—How Businesses Gather, Analyze, and Use Information to Succeed in the Global Marketplace, Simon & Schuster, New York, NY, 1996.

Kumamoto, K., "Commercial Databases: The Keypoints and Practical Use. 10. Patent and Trademark," Joho Kanri, vol. 36, No. 10, pp. 914-938, Jan. 1994 (article in Japanese and English abstract submitted herewith).

Narin, Francis, Presentation Figures, "In the Realm of Technology, Asia Looms Ever Larger: Patent Citation as Measures of Corporate and National Strength, Presented at: Stanford University, Asia/Pacific Research Center, Stanford, California," Oct. 29, 1992.

Otake, Y., "Information Each Department in Corporate Needs from the Standpoint of R&D Department," Joho Kanri, vol. 34, No. 7, pp. 635-646, Oct. 1991 (article in Japanese and English abstract submitted herewith).

Stewart, Thomas A., Intellectual Capital: The New Wealth of Organizations, Doubleday, 1997.

Stewart, Thomas A., "Trying to Grasp the Intangible," Fortune, vol. 132, No. 7, Oct. 2, 1995, pp. 157, 158 and 161.

Stewart, Thomas A., "Your Company's Most Valuable Asset Intellectual Capital," Fortune, vol. 130, No. 7, Oct. 3, 1994, pp. 68-74.

Tech-Line CD Indicators of Technological Excellence Manual Including Introduction to Company Evaluation Using Technology Indicators, Bertelsmann InformationsService, CHI Research Inc., TT-Technologie-Transfer GmbH, 1994.

"Tech-Line CD User Manual Part 1 Abridged Version for the World Wide Web," printed from the CHI Research web page at www.chiresearch.com, pp. 1-3, 1996.

"Turning Information Into Insight," Press Release, The Business Wire, Apr. 25, 1997 (printed from Manning & Napier Information Services web page at www.mnis.net).

Warshofsky, Fred, The Patent Wars: The Battle to Own the World's Technology, John Wiley & Sons, Inc., 1994.

M. Albert, "Easy to Patents", Fortune Magazine, Jun. 1992.

Lucas Jay, "The progress of automation at the U.S. Patent and Trademark Office", World Patent Information, vol. 14, No. 3, pp. 167-172, Jan. 1992.

Thielen et al., "Image Handling at the European Patent Office: Bacon and first page", world Patent Information, vol. 13, No. 3, pp. 152-154, Jan. 1991.

Alexander, S., "Users find tangible rewards digging into data mines", Infoworld, vol. 19, Issue 27, pp. 61-62, (Jul. 1997).
"Bertelmann Portrait", from http://www.bertelmann.de/bag/englisch/prtrait, Date Unknown.
"CHI Research, Inc.: Tracking the World's Technology", from http://www.chiresearch.com, Date Unknown.
"CHI Research, Inc.: Technology Indicators Consulting Services and Products", from http://www.chiresearch.com/services.html, Copyright 1996.
"Derwent Patents Citation Index", from http://www.derwent.com/products/database/pcidesc.html, Date Unknown.
"The Digital Patent Office", Smartpatents, Inc., Date Unkown.
"Essentials for Mapping Your Intellectual Property: Annuities Master Data Center", Prentice Hall Legal Practice Management, 1993.
"Manning & Napier Information Services HomePage", from http://www.mnis.net, Date Unknown.
"Manning & Napier Information Services: Competitive Intelligence", from http://www.mnis.net/compete.shtml , Date Available on Internet Unknown.
"Manning & Napier Information Services: Intellectual Property", from http://www.mnis.net/intellect.shtml, Date Available on Internet Unknown.
"Mapit: Prevent Patent Infringement with the Virtual Patent Advisor", from http://www.mnis.net/mapitdemo, Date Available on Internet Unknown.
"Manning & Napier Information Services: Crawler Technology (Trygon)", from http://www.mnis.net/trygon.shtml, Date Available on Internet Unknown.
"Manning & Napier Information Services: AFCEA Intelligence Professionals Adopt New Paradigm for Information Analysis", from http://www.mnis.net/press10.shtml, Jun. 11, 1997.
"Manning & Napier Information Services: Manning & Napier and RTI announce alliance for corporate information market", from http://www.mnis.net/press9.shtml, May 15, 1997.
"Manning & Napier Information Services: Competitive Intelligence Tools Migrating from Government Labs to Corporations", from http://www.mnis.net/press8.shtml, May 15, 1997.
"Manning & Napier: Manning & Napier Information Services", from http://www.mnis.net/press7.shtml, Apr. 25, 1997.
"Manning & Napier Information Services: Patent Licensing Made Easier With MNIS Data Mining Tools", from http://mnis.net/press6.shtml, Jan. 30, 1997.
"Manning & Napier Information Services: Manning & Napier Offers Broad Coverage of Computer and Software Technology Databases", from http://www.mnis.net/press5.shtml, Dec. 3, 1996.
"Manning & Napier Information Services: Innovative Technology Tool Unveiled", from http://www.mnis.net/press4.shtml, Dec. 3, 1996.
"Manning & Napier Information Services: Zolowicz to Head Intellectual Property Unit at Manning & Napier Information Services", from http://www.mnis.net/press3.shtml, Nov. 18, 1996.
"Manning & Napier Information Services: Breakthrough in Intelligent Information Analysis From Software That Thinks Like Humans", from http://www.mnis.net/press2.shtml, Sep. 16, 1996.
"Manning & Napier Information Services: MNIS Announces System for Improving Software Patents—At ABA Conference", from http://www.mnis.net/press.shtml, Jun. 28, 1996.
"Master Data Center: PC Master Patent Lite for Windows", Master Data Center, Date Unknown.
Master Data Center: PC Master Trademark Lite for Windows, Master Data Center, Date Unknown.
MDC Patent Rules Update, May 1996.
MDC Trademark Rules Update, Apr. 1996.
Mogee Research & Analysis Associates, Homepage URL:http://www.mogee.com, (What We Do) and Hyperlinks (Who We Are(1); Who We Are(2); Competitive Technology Reports; Competitive Technology Report:GPS; Competitive Technology Report:Medical Implants; Data resources; Consulting Services), 1996.
Lucena, John J., "Merlot Design Specification", Version 1.0-D2, Last modified Jun. 24, 1996.
"New Wave MetricsWare-Metrics Software You Just Gotta Have", IT Metrics Strategies (Reprint), vol. II, No. 10, Cutter Information Corp. RTM., 1996.
"Patent Abstracts of Japan-Now on CDROM", from http://www.netaxs.com/.about.aengel/PAJ/PAJInfo.html, Last Updated Dec. 22, 1995.
"Patent-Monitor", from http:www.fachinformation.bertelsmann.de/verlagh/wb/profil.htm, Date Unknown.
PC Master Lite Booklet, Master Data Center Intellectual Property Software and Services, 1996.
"Performance Management: The Way It Should Be . . . ", Panorama Business Views, Inc., Date Unknown.
"Platinum technology and Sybase Inc. Expand Partnership to Deliver Wider Selection of Data Warehouse Solutions", from http.www.platinum.com/press/1996/dw.sub.—sybas.htm, Jun. 11, 1996.
Rappaport, I., "Time To Count Your Patents The Way You Would Beans", PCWeek, vol. 14, No. 2, Jan. 13, 1997.
SmartPatent Quarterly Newsletter, vol. 2, No. 3, Winter 1996-1997.
SmartPatent Quarterly Newsletter, vol. 2, No. 4, Spring/Summer 1997. Stewart, T.A., "Getting Real About Brainpower", Fortune, Nov. 27, 1995, (pp. 201-203).
Stewart, T.A., "Getting Real About Brainpower", Fortune, Nov. 27, 1995, (pp. 201-203).
Stewart, T.A., "Mapping Corporate Brainpower", Fortune, Oct. 30, 1995, (pp. 209-211).
Vantive Corporation Home page (Delivering True Customer Asset Management) and Various Hyperlinks (Vantive Products and Services; Solution Partners; Vantive HelpDesk; Vantive Sales; Free White Paper), Vantive, 1996.
"Welcome to ISTA", from http://www.netaxs.com/.about.engel/ista.htm, Date Unknown.
"Welcome to the MicroPatent PatentWeb", from http:www.micropat.com/patentwebindex.htm, 1996.
"Welcome to MicroPatent's PatentWeb . . . For Patent Information", from http:www.micropat.com/info/welcome.htm, Printed Dec. 6, 1996.
"The History of MicroPatent", from http:www.micropat.com/info/history.htm, Printed Dec. 6, 1996.
"A Few Facts About MicroPatent", from http:www.micropat.com/info/facts.htm, Printed Dec. 6, 1996.
Lamping et al., A Focus+Context Technique Based on Hyperbolic Geometry for Visualizing Large Hierarchies, obtained via the Internet at http://www.acm.org/sigchi/chi95/electronic/documents/papers/jl.sub.13 bdy.html, Jan. 1995.
"Creation/Modification of the Audio Signal Processor Setup for a PC Audio Editor", IBM Technical Disclosure Bulletin, vol. 30, No. 10, Mar. 1988.
Alpert, M., Easy Access to Patents, Fortune Magazine, Jun. 29, 1992.
Dintzner, J.P. and J. Van Thielen, "Image Handling at the European Patent Office: Bacon and First Page," World Patent Information, vol. 13, No. 3, pp. 152-154, 1991.
Grahan et al., "Browsing Within Time-Driven Multimedia Documents", Institute for Computer Research, University of Waterloo, Waterloo, Ontario, Canada, pp. 219-227, Jul. 1988.
Ishii, H., et al., Toward an Open Shared Workspace, Communications of the ACM, Dec. 1991, vol. 34, No. 12, pp. 37-50.
Patrick P. Chan, "Learning Considerations in User Interface Design: The Room Model", Software Portability Laboratory, University of Waterloo, Waterloo, Ontario, Canada, Jul. 1984.
Sibley, J.F., "The EPOQUE Suite of Applications," World Patent Information, Elsevier Science Ltd., 1996, vol. 18, No. 3, pp. 141-148.
Sibley, J.F., "STN Express 4.0, a professional software for successful online searches," World Patent Information, Elsevier Publishing, Mar. 1, 1997, vol. 19, No. 1, pp. 73-75.
Williams, J. et al., "STN Easy: point-and-click patent searching on the World Wide Web," World Patent Information, Elsevier Science Ltd., 1997, vol. 19, No. 3, pp. 161-166.
International Search Report from PCT Appl. No. PCT/US00/05080, 6 pages, mailed Dec. 18, 2000.
Iandiorio, Joseph S., "From Start to Finish: Protecting Ideas and Inventions wit Intellectual Property ," Electro/95 International Professional Program Proceedings, Jun. 21-23, 1995, Hynes Convention Center, Boston, MA, pp. 141-149.
Narin, F. et al., "Technological Performanc Assessments Based on Patents and Patent Citations," IEEE *Transactions on Engineering Management*, vol. EM-31, No. 4, Nov. 1984, pp. 172-183.

Jordan, K.A. and Zawilski, A.J., "Specification of a Rapid Prototyping Capability for the Automated Patent System," IEEE, 1990, pp. 76-81.
Liebeherr, J. et al., "The Effect of Index Partitioning Schemes on the Performing of Distributed Query Processing," *IEEE Transactions on Knowledge and Data Engineering*, vol. 5, No. 3, Jun. 1993, pp. 510-522.
Bobbie, P.O., "Clustering Relations of Large Databases for Parallel Querying," *Proceedings of the Twenty-Seventh Seventh Annual Hawaii International Conference on System Sciences*, 1994, pp. 246-252.
Omiecinski, E. at al., "Performance Analysis of a Concurrent File Reorganization Algorithm for Record Clustering," *IEEE Transactions on Knowledge and Data Engineering*, vol. 6, No. 2, Apr. 1994, pp. 248-257.
Stefanov, V. "Some Possibilities of a "Patents" Database in Determining a Firm's Policy," *World Patent Information*, vol. 17, No. 3, 1995, pp. 201-204.
Mylls, R., *Information Engineering Case Practices and Techniques*, Wiley-Interscience, ISBN 0-471-58711-7, pp. 180-201.
Grunder, O. et al., "An Approach to Model and Evaluate Innovation And Concurrent Engineering Projects," *Emerging Technologies and Factory Automation*, vol. 1, Oct. 10-13, 1995, pp. 155-163.
Albano, R.E. and Keska, J.P., "Is design realization a process? A case study," *Electronic Manufacturing Technology Symposium*, Sep. 25-27, 1989, pp. 344-354.
*WELCOME! TextWare Corporation*, from http://www.textware.com/, printed Oct. 29, 1996, 1 page.
English Abstract for Japanese Patent Publication No. 05-135109, supplied by the Japanese Patent Office, 2 pages.
English Abstract for Japanese Patent Publication No. 06-231141, supplied by the Japanese Patent Office, 2 pages.
English Abstract for Japanese Patent Publication No. 08-221435, supplied by the Japanese Patent Office, 2 pages.
Luke Hohmann, Journey of the Software Professional A Sociology of Software Development, Prentice Hall PTR, New Jersey, 1997.
Charniak et al., Introduction to Artificial Intelligence, Addison Wesley, 1986.
Nils J. Nilsson, Principles of Artificial Intelligence, Morgan Kaufmann, Los Altos, Calif., 1980.
Introduction to Dataware's CD-ROM Product and Services, at http://www.dataware.com/site/prodserv/cdintro.htm, 12 pages (n.d.).
ZyIMAGE: Archive Text Fast, at http://www.zylab.nl/zylab/p2/zyimage.html, ZyLAB International, Inc., 1 page (1996).
English Language Abstract of 'Kumamoto, K., "Commercial databases: the keypoints and practical use. 10. Patent and Trademark," Joho Kanri, vol. 36, No. 10, pp. 914-938 (Jan. 1994),' 1 page, printed from Dialog Inspec database.
English Language Abstract of 'Otake, Y., "Information each department in corporate needs from the standpoint of R&D department," Joho Kanri, vol. 34, No. 7, pp. 635-646 (Oct. 1991,' 1 page, printed from Dialog Inspec database.
Germeraad, Paul. "Intellectual Property in a Time of Change". Research Technology Management. Nov./Dec. 1999. vol. 42, Iss. 6, pp. 34-39.
Germeraad, Paul; Lorraine Morrison. "How Avery Dennison Manages its Intellectual Assets". Research Technology Management. Nov./Dec. 1998. vol. 41 Iss. 6. pp. 36-43.
"New Investment Bank Formed to Serve the South Florida Business Community". Business Wire. Mar. 24, 1999.
Australian Examiner's First Report from Appl. No. 36091/00, mailed May 21, 2003, 2 pages.
Lamping, J. et al., "The Hyperbolic Browser: A Focus + Context Technique for Visualizing Large Hierarchies," Journal of Visual Laguage and Computing 7(1): 33-55, Academic Press, London, GB (Mar. 1996).
Coxeter, "Non-Euclidean Geometry", University of Toronto Press, 1965.
Moise, "Elemental Geometry from an Advanced Standpoint," Addison-Wesley, 1974.
"Hyperbolic Tree Toolkit Application: Programmer's Reference," Version 1.0, Xerox Corporation and InXight Software, Inc., Jan. 1997.
Aho et al., "Data Structures and Algorithms", ISBN 0-201-00023-7, 1983.
Parker et al., "Simulation of a coordinated accident rescue system", pp. 5963, CAN.
Kincaid et al., "electronic calendars in the office: An assessment of user needs and current technology", CAN, vol. 3, No. 2, pp. 89-102, Jan. 1985.
European Search Report for European Patent Appln. No. EP 011 249 36.4, published Oct. 20, 2004, 5 pages.
International Search Report from PCT Appl. No. PCT/US98/10923, 2 pages, mailed Oct. 19, 1998.
International Search Report from PCT Appl. No. PCT/US99/19050, 1 page, mailed Nov. 19, 1999.
International Search Report from PCT Appl. No. PCT/US00/05080, 6 pages, mailed Dec. 18, 2000.
International Search Report from PCT Appl. No. PCT/US00/09382, 3 pages, mailed Jun. 12, 2000.
International Search Report from PCT Appl. No. PCT/US01/09584, 1 page, mailed Jun. 8, 2001.
Kevin G. Rivette et al., U.S. Appl. No. 08/341,129, filed Nov. 18, 1994, entitled Method and Apparatus for Synchronizing, Display and Manipulating Text and Image Documents.
Kevin G. Rivette et al., U.S. Appl. No. 09/138,368, filed Aug. 21, 1998, entitled "System, Method, and Computer Program Product for Managing and Analyzing Intellectual Property (IP) Related Transactions."
Kevin G. Rivette et al., U.S. Appl. No. 09/260,079, filed Mar. 2, 1999, entitled "Intellectual Property Asset Manager (IPAM) for Context". Processing of Data Objects.
Paul B. Germeraad, U.S. Appl. No. 09/545,564, filed Apr. 7, 2000, entitled "Patent-Related Tools and Methodology for Use in Research and Development Projects".
Paul B. Germeraad et al., U.S. Appl. No. 09/560,618, filed Apr. 28, 2000, entitled "Patent-Related Tools and Methodology for Use in the Licensing Process".
Paul B. Germeraad, U.S. Appl. No. 09/560,619, filed Apr. 28, 2000, entitled "Patent-Related Tools and Methodology for Use in the General Management of a Business".
Paul B. Germeraad et al., U.S. Appl. No. 09/560,889, filed Apr. 28, 2000, entitled "Patent-Related Tools and Methodology for Use in the Merger & Acquisition Process".
Paul B. Germeraad et al., U.S. Appl. No. 09/564,828, filed May 4, 2000, entitled "Patent-Related Tools and Methodology for Use in the Licensing Process".
Paul B. Germeraad et al., U.S. Appl. No. 09/565,126 filed May 4, 2000, entitled "Patent-Related Tools and Methodology for Use in the General Management of a Business".
Paul B. Germeraad et al., U.S. Appl. No. 10/178,540, Jun. 22, 2002, entitled "Using Hyperbolic Trees to Visualize Data Generated by Patent-Centric and Group-Oriented Data Processing".
Dataware Products and Services, at http://www.dataware.com/site/prodserv/prodserv.htm, 2 pages, 1996.
Derwent Patents Citation Index, at http://www.derwent.com/products/database/pcidesc.html, 2 pages, 1996.
English Language Abstract of Japanese Publication No. 08-221435, 1 page, printed from the JPO PAJ webpage at http://wwwl.ipdl.jpo.go.jp, date of publication of application - Aug. 30, 1996.
Full Write Professional—A User's Guide, Ashton-Tate Corp., pp. 99-122 (1988).
Halperin, M.R. et al. "Firm and Industry Characteristics Influencing Publication of Scientists in Large American Companies," R.D. Management 17: 167-173; reprinted online in Essays of an Information Scientist: 1998. Science Literacy, Policy, Evaluation, and Other Essays, vol. 11, location at <http://www.garfield.library.upenn.edu/essays/v11p246y1998.pdf>, last accessed on Jul. 14, 2009, pp. 246-250.
Mogee Research and Analysis Associates: Who We Are: Company Information, at http://www.mogee.com/whower_1.htm, 3 pages, (1996).
Mogee Research and Analysis Associates: Who We Are: Personal Biographies, at http://www.mogee.com/whower_2.htm, 3 pages, (1996).

NetAnswer Hosting Service, Dataware Technologies, Inc., 4 pages, (Oct. 1995).

Thoma, Elke et al. "Entwicklungen bei Patentdatenbanken," *NfD* 46:331-340 (1995). (German language document and English translation).

WELCOME! TextWare Corporation, from http://www.textware.com/, printed Oct. 29, 1996, 1 page.

Williams, J. et al., "STN Easy: point-and-click patent searching on the World Wide Web," World Patent Information, Elsevier Science Ltd., 1997, vol. 19, No. 3, pp. 161-166.

Young, "UK Police Put Criminals On-Line With New National Computer," Imaging Magazine. Aug. 1995.

ZyIMAGE: Archive Text Fast, at http://www.zylab.nl/zylab/p2/zyimage.html, ZyLAB International, Inc., 1 page, (1996).

ZyIndex Developer's Toolkit for Windows, Version 5.0, Programmer's Guide Information Dimensions, Inc., Copyright 1992, pp. 1-35.

* cited by examiner

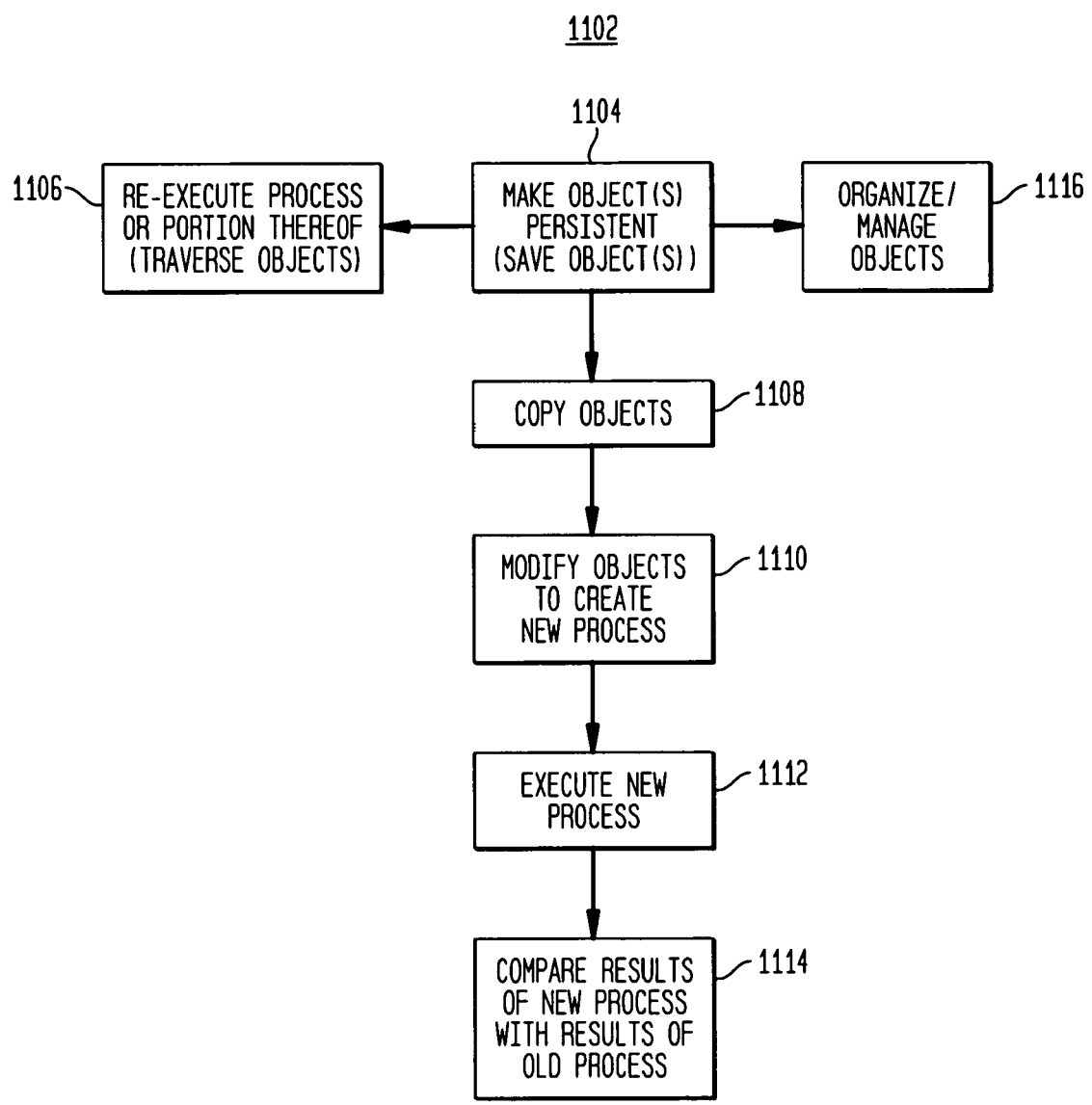

FIG. 13

```
┌─────────────────────────────────────────────────────────────────────┐
│ [Q] Current Folder [📁] \\aos\companyname\jsmith\competitors    [⬆]│
│ Object [Q NewQuery.qry                    ] [Q][💾] Views▾ Tools▾ ⊙ Search│
│         1312              QUERY OBJECT                              │
│                                                                     │
│ Trigger Type: 1302    Start Trigger:      End Trigger:  1306       │
│  ○ Manual              [Thu 4/5/2001  ▾]   ○ No end date           │
│  ⦿ Event-Based                             ⦿ End after: [10] occurences│
│                          1304              ○ End by:  [Thu 4/5/2001 ▾]│
│  ○ Time-Based                                                       │
│                                                                     │
│ Event-Based Trigger:                                                │
│                                         1308                        │
│   Trigger on change to:                                             │
│                                                                     │
│   ○ Database: [Aurigin Patent Database  ▾]                         │
│   ⦿ Object:   [📄 \\aos\companyname\Public Folders\R&D\newproj.lst ▾]│
│                                                                     │
│ Time-Based Trigger:                                                 │
│                                                                     │
│  ⦿ Daily:    ⦿ Every: [1] day(s)     1310                          │
│              ○ Every weekday                                        │
│                                                                     │
│  ○ Weekly   Trigger every [1] week(s) on                           │
│             ☐ Sunday   ☐ Monday   ☑ Tuesday   ☐ Wednesday          │
│             ☐ Thursday ☐ Friday   ☐ Saturday                        │
│                                                                     │
│  ○ Monthly  ⦿ Day [27] of every [1] month(s)                       │
│                                                                     │
│             ○ The [fourth ▾][Tuesday ▾] of every [1] month(s)      │
│                                                                     │
│  [💾 Save]      [ Cancel ]                                          │
└─────────────────────────────────────────────────────────────────────┘
```

FIG. 19

| | | | |
|---|---|---|---|
| Current Folder | \\aos\companyname\jsmith\competitors\Lilly\ | | |
| Object | antivirals | | Views ▾ Tools ▾ ◉ Search |

LIST OBJECT
LIST DISPLAY OPTIONS VIEW

Default View
- ◉ Short List View
- ○ Full List View
- ○ Abstract List View
- ○ Shoebox List View

Documents Per Page
- 30
- 10
- 5
- 1

Content Change Type
- ◉ Auto-Change
- ○ Pending-Change

---

Show Documents with Document Status:
- ☐ Active
- ☑ Deleted
- ☐ Pending-Add
- ☑ Pending-Delete

Sort List by
Assignee
- ◉ Ascending
- ○ Descending

Then by
IPC Code
- ◉ Ascending
- ○ Descending

Then by
Priority Date
- ◉ Ascending
- ○ Descending

---

Show Document View Links
- ☐ Standard View
- ☑ Fulltext View
- ☑ Claims View
- ☑ Aurigin Family View
- ☐ Derwent Family View
- ☑ Summary Page View
- ☑ PDF Image View
- ☑ HTML Image View

---

Show Fields:

| Short List View | Full List View | Abstract List View | Shoebox List View |
|---|---|---|---|
| ☑ Country Code | ☑ Country Code | ☑ Country Code | ☑ Country Code |
| ☑ Kind Code | ☑ Kind Code | ☑ Kind Code | ☑ Kind Code |
| ☑ Doc ID | ☑ Doc ID | ☑ Doc ID | ☑ Doc ID |
| ☑ Title | ☑ Title | ☑ Title | ☑ Title |
| ☑ Priority Date | ☑ Priority Date | ☑ Priority Date | ☑ Priority Date |
| ☑ Filing Date | ☑ Filing Date | ☑ Filing Date | ☑ Filing Date |
| ☑ Publication Date | ☑ Publication Date | ☑ Publication Date | ☑ Publication Date |
| ☑ Assignees | ☑ Assignees | ☑ Assignees | ☑ Assignees |
| ☑ Inventors | ☑ Inventors | ☑ Inventors | ☑ Inventors |
| ☑ IPC Code | ☑ IPC Code | ☑ IPC Code | ☑ IPC Code |
| ☑ USPC Code | ☑ USPC Code | ☑ USPC Code | ☑ USPC Code |
| ☑ Legal Status | ☑ Legal Status | ☑ Legal Status | ☑ Legal Status |
| ☑ Doc Status | ☑ Doc Status | ☑ Doc Status | ☑ Doc Status |
| ☑ Change Source | ☑ Change Source | ☑ Change Source | ☑ Change Source |
| ☑ Status Change Date | ☑ Status Change Date | ☑ Status Change Date | ☑ Status Change Date |
| ☑ Doc View Links | ☑ Doc View Links | ☑ Doc View Links | ☑ Doc View Links |
| ☑ Abstract | ☑ Abstract | ☑ Abstract | ☑ Abstract |
| ☑ Front Page Thumbnail | ☑ Front Page Thumbnail | ☑ Front Page Thumbnail | ☑ Front Page Thumbnail |
| ☑ Primary Drawing | ☑ Primary Drawing | ☑ Primary Drawing | ☑ Primary Drawing |

[Save] [Cancel]      List Content Views: Short  Full  Abstract  Shoebox

FIG. 20

| | | Current Folder | \\aos\companyname\jsmith\competitors\Lilly\ | | | | | | |
|---|---|---|---|---|---|---|---|---|---|
| Object | antivirals | | | | | | Views ▾ Tools ▾ | | |

LIST OBJECT
SHORT LIST VIEW

List Content Views:  Short  Full  Abstract  Shoebox                               Set View Options 150 Documents     Results 1-20      Page [1] of 8 [Go]                    Prev | Next

| | Select | Country Code | Doc ID | Doc Kind | Title | Pub Date | Status | Status Change Date | Change Source | View Document |
|---|---|---|---|---|---|---|---|---|---|---|
| 1 | ☑ | US | 3883561 | A1 | Antibiotic lactones | 5/13/1975 | A | 2/24/2001 | Query549 | T\|C\|📄🗎 |
| 2 | ☑ | US | 3903371 | A1 | Mycophenolic acid derivatives | 9/2/1975 | A | 2/24/2001 | Query549 | T\|C\|📄🗎 |
| 3 | ☑ | US | 3990527 | A1 | Anti-viral method in animals | 11/30/1976 | PA | 3/7/2001 | Query549 | T\|C\|📄🗎 |
| 4 | ☑ | US | 4035481 | A1 | Antibiotic A-28086 and process fo | 7/12/1977 | A | 2/24/2001 | Bool123 | T\|C\|📄🗎 |
| 5 | ☑ | US | 4053598 | A1 | Acylation of pyrazofurin | 10/11/1977 | PO | 3/7/2001 | Query549 | T\|C\|📄🗎 |
| 6 | ☑ | US | 4035224 | A1 | Method of increasing feed utilizati | 4/18/1978 | PA | 3/7/2001 | Query549 | T\|C\|📄🗎 |
| 7 | ☑ | US | 4115197 | A1 | Procedure for obtaining penicilliu | 9/19/1978 | A | 2/24/2001 | Query549 | T\|C\|📄🗎 |
| 8 | ☑ | US | 4133876 | A1 | Antibiotic A-32887 and process | 1/9/1979 | O | 2/28/2001 | Manual | T\|C\|📄🗎 |
| 9 | ☑ | US | 4141907 | A1 | Deoxynarasin antibiotics | 2/27/1979 | A | 2/24/2001 | Query549 | T\|C\|📄🗎 |
| 10 | ☑ | US | 4153695 | A1 | Substituted 2,3-dihydro imidazo[1 | 5/8/1979 | A | 2/24/2001 | Bool123 | T\|C\|📄🗎 |
| 11 | ☑ | US | 3883561 | A1 | Antibiotic lactones | 5/13/1975 | A | 2/24/2001 | Query549 | T\|C\|📄🗎 |
| 12 | ☑ | US | 3903371 | A1 | Mycophenolic acid derivatives | 9/2/1975 | A | 2/24/2001 | Query549 | T\|C\|📄🗎 |
| 13 | ☑ | US | 3990527 | A1 | Anti-viral method in animals | 11/30/1976 | PA | 3/7/2001 | Query549 | T\|C\|📄🗎 |
| 14 | ☑ | US | 4035481 | A1 | Antibiotic A-28086 and process fo | 7/12/1977 | A | 2/24/2001 | Query549 | T\|C\|📄🗎 |
| 15 | ☑ | US | 4053598 | A1 | Acylation of pyrazofurin | 10/11/1977 | O | 2/28/2001 | Manual | T\|C\|📄🗎 |
| 16 | ☑ | US | 4085224 | A1 | Method of increasing feed utilizati | 4/18/1978 | O | 2/28/2001 | Manual | T\|C\|📄🗎 |
| 17 | ☑ | US | 4115197 | A1 | Procedure for obtaining penicilliu | 9/13/1978 | O | 2/28/2001 | Bool123 | T\|C\|📄🗎 |
| 18 | ☑ | US | 4133876 | A1 | Antibiotic A-32887 and process | 1/9/1979 | A | 2/24/2001 | Query549 | T\|C\|📄🗎 |
| 19 | ☑ | US | 4141907 | A1 | Deoxynarasin antibiotics | 2/27/1979 | A | 2/24/2001 | Query549 | T\|C\|📄🗎 |
| 20 | ☑ | US | 4153695 | A1 | Substituted 2,3-dihydro imidazo[1 | 5/8/1979 | A | 2/24/2001 | Query549 | T\|C\|📄🗎 |

[Select All]   [DeSelect All]      [Accept Selected Pending]         [✗ Delete Selected]

150 Documents     Results 1-20      Page [1] of 8 [Go]                    Prev | Next

FIG. 21

| | Select | Country Code | Doc ID | Doc Kind | Title | Assignees | Inventors | Pub Date | IPC Code | View Document |
|---|---|---|---|---|---|---|---|---|---|---|
| 1 | ☑ | US | 3883561 | A1 | Antibiotic lactones | Eli Lilly and Company | Michel,Karl H.; Hoehn,Marvin M. | 5/13/1975 | C07d/00 | T\|C\|≣🗎 |
| 2 | ☑ | US | 3903371 | A1 | Mycophenolic acid derivatives | Eli Lilly and Company | Holmes, Richard E. | 9/2/1975 | [2]C07H/00 | T\|C\|≣🗎 |
| 3 | ☑ | US | 3990527 | A1 | Anti-viral method in animals | Eli Lilly and Company | GALE, CHARLES; McDougald, Larry R. | 11/30/1976 | [2]A61K/66; [2]A61K/71 | T\|C\|≣🗎 |
| 4 | ☑ | US | 4035481 | A1 | Antibiotic A-28086 and process for production thereof | Eli Lilly and Company | Berg, David H.; HAMILL, ROBERT L.; Hoehn,Marvin M. | 7/12/1977 | [2]A61K/00 | T\|C\|≣🗎 |
| 5 | ☑ | US | 4053598 | A1 | Acylation of pyrazofurin | Eli Lilly and Company | Gutowski Gerald E. | 10/11/1977 | [2]C07D/40; [2]C07H/06; [2]C07D/38; [2]C07H/02 | T\|C\|≣🗎 |
| 6 | ☑ | US | 4085224 | A1 | Method of increasing feed utilization | Eli Lilly and Company | Berg, David H.; HAMILL, ROBERT L.; Hoehn,Marvin M. | 4/18/1978 | [2]A61K/35 | T\|C\|≣🗎 |
| 7 | ☑ | US | 4115197 | A1 | Procedure for obtaining penicillium species mutants with improved ability to synthesize mycophenolic acid | Eli Lilly and Company | Queener, Stephen V.; Nash III, Claude H. | 9/19/1978 | [2]C12K/02; [2]C120/10; [2]C120/06 | T\|C\|≣🗎 |
| 8 | ☑ | US | 4133876 | A1 | Antibiotic A-32887 and process for production thereof | Eli Lilly and Company | HAMILL, ROBERT L.; Hoehn,Marvin M. | 1/9/1979 | [2]A61K/06 | T\|C\|≣🗎 |
| 9 | ☑ | US | 4141907 | A1 | Deoxynarasin antibiotics | Eli Lilly and Company | Nakatsukasa, Walter M.; HAMILL, ROBERT L.; MARCONI, GARY G.; Neuss, Norbert | 2/27/1979 | [2]AS1K/35; [2]C070/22 | T\|C\|≣🗎 |
| 10 | ☑ | US | 4153695 | A1 | Substituted 2,3-dihydro imidazo[1,2-c]pyrimidines | Eli Lilly and Company | Turner,William V. | 5/8/1979 | [2]AS1K/605; [2]C070/04 | T\|C\|≣🗎 |

FIG. 23

SYSTEM, METHOD, AND COMPUTER PROGRAM PRODUCT FOR KNOWLEDGE MANAGEMENT

This is a continuation-in-part application of pending U.S. non-provisional application Ser. No. 08/921,369 filed Aug. 29, 1997 titled "Using Hyperbolic Trees to Visualize Data Generated by Patent-Centric and Group-Oriented Data Processing," which is a continuation-in-part application of U.S. Pat. No. 5,991,751 titled "System, Method, and Computer Program Product for Patent-Centric and Group-Oriented Data Processing," both of which are herein incorporated by reference in their entireties.

BACKGROUND OF THE INVENTION

1. Field of the Invention

The invention is generally directed to the management of information (knowledge).

2. Related Art

Many systems exist for organizing documents. Such systems include file management applications (such as Windows Explorer) and document management systems.

Systems also exist for analyzing documents to some extent. Such systems include, for example, various Internet search engines for identifying documents that satisfy some supplied search criteria.

There are many more examples of existing systems for organizing documents, and systems for analyzing documents.

However, systems that effectively and efficiently manage knowledge are rare. Thus, there is a need for such systems. More particularly, there is a need for systems that enable users to organize, process, and otherwise manipulate information contained in any form (text, graphics, multimedia, applications, images, sound, etc.), and that provide diverse and flexible functionality so that users may construct work flows and processes according to their particular needs.

SUMMARY OF THE INVENTION

Briefly stated, the invention is directed to a system, method, and computer program product for managing knowledge. The knowledge that is being managed comprises documents of interest to users. Such documents may be in any form, such as but not limited to text, images, graphics, audio, video, multimedia, computer programs/applications, etc., and combinations thereof.

More particularly, the invention is directed to a computer implemented method of enabling a user to organize and analyze information in electronic form. The method operates by searching a first set of documents to thereby generate a second set of documents. The invention automatically creates a first group comprising the second set of documents. The invention analyzes the first group according to one or more analytical functions to thereby generate a third set of documents. The invention automatically creates a second group comprising the third set of documents. The invention enables selective iteration of any of these operational steps.

The invention also generates objects corresponding to process components of this work flow. The user can re-execute the work flow (process) by traversing the objects, or create a new process by modifying the objects.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. Generally, the drawing in which an element first appears is indicated by the leftmost digit(s) in the corresponding reference number.

BRIEF DESCRIPTION OF THE FIGURES

The present invention will be described with reference to the accompanying drawings, wherein:

FIG. 11 indicates functionality involving objects according to an embodiment of the invention;

FIGS. 12-27 are example user interface screen shots related to objects according to an embodiment of the invention;

DETAILED DESCRIPTION OF THE PREFERRED EMBODIMENTS

1. Overview of the Invention

The invention is directed to a system, method, and computer program product for managing knowledge. The knowledge that is being managed comprises documents of interest to users. Such documents may be in any form, such as but not limited to text, images, graphics, audio, video, multimedia, applications, etc., and combinations thereof.

The invention provides a number of functions for processing and manipulating knowledge. Typically, the functions that are performed are selected by users. More particularly, users select the functions that are to be performed, and the sequence in which those functions are performed. This is referred to as "work flow" or "process."

According to embodiment of the invention, work flows can be saved. In other words, the invention supports persistent work flows or processes. The invention achieves persistent processes through the use of objects. These objects can be manipulated and re-used to achieve a number of advantages.

The invention shall now be described in greater detail.

2. Description of the Knowledge Management System (KMS)

Figure 1:
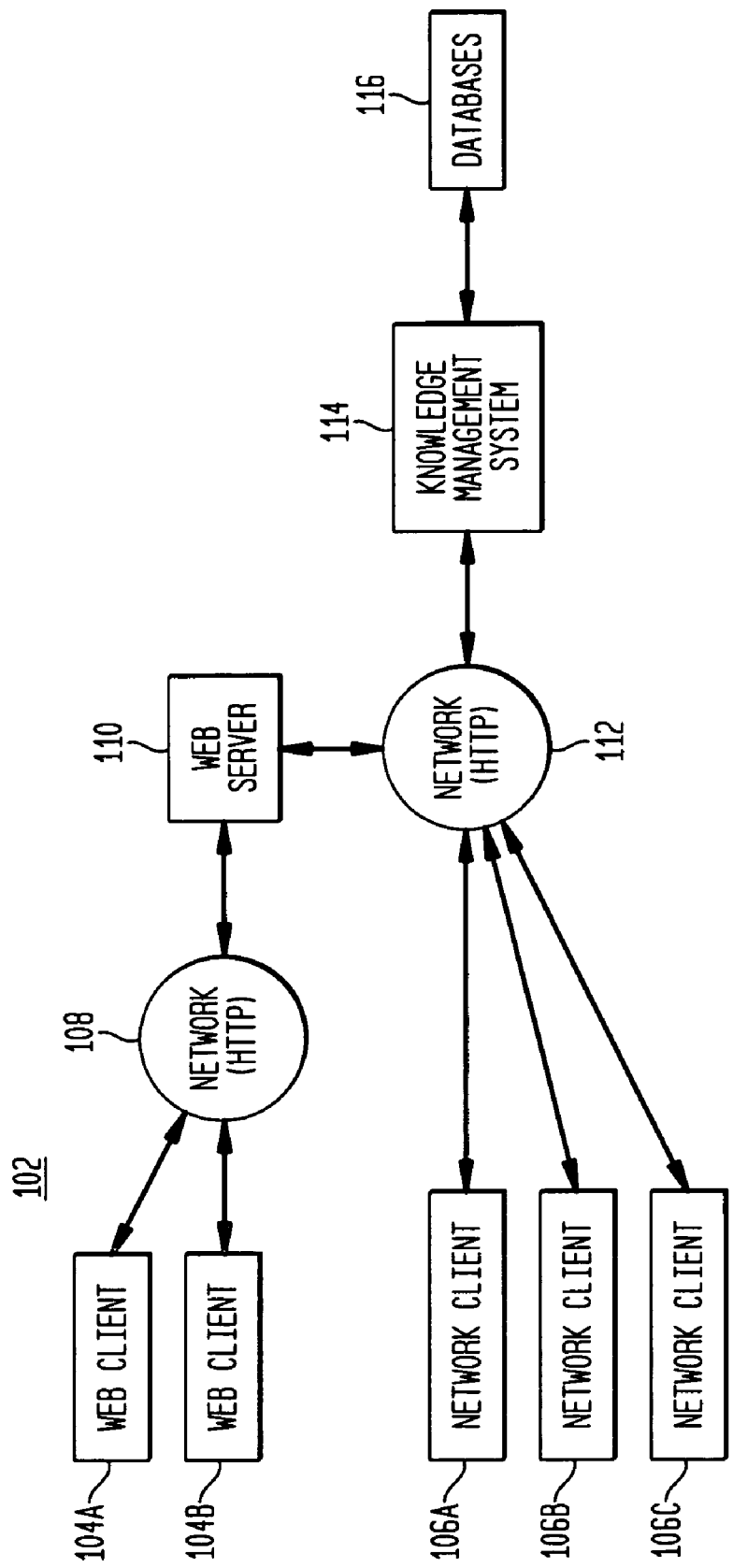
FIG. 1 is a block diagram of a computing environment that includes a knowledge management system (KMS) according to an embodiment of the invention.

FIG. 1 is a block diagram of a system 102 according to an embodiment of the invention.

The system 102 includes a plurality of databases 116 that store documents, such as patent related information and other information (unrelated to patents).

A knowledge management system (KMS) 114 accesses and processes the information in the databases 116. In particular, the KMS 114 includes modules that are capable of semi-automatically and automatically accessing and processing the information in the databases 116 in an document-centric and/or group-oriented manner. Such processing includes, but is not limited to, reporting, analyzing, and planning.

In an embodiment, the KMS 114 is implemented at least in part using an Intellectual Property Asset Manager (IPAM), which is described in U.S. Pat. No. 5,991,751, incorporated herein by reference in its entirety.

In an embodiment, the system 102 includes (but is not limited to) two types of clients, network clients 106 and web clients 104. These clients 104, 106 interact with the KMS 114 to access and process the information in the databases 116.

For example, the clients 104, 106 may request that the KMS 114 retrieve certain information, or automatically analyze certain information. The KMS 114 performs the requested tasks, and sends the results to the requesting clients 104, 106. The clients 104, 106 present these results to their respective operators, for example, and enable the operators to process the results.

Clients 104, 106 may also perform additional processing of data, such as creating a visualization of the data obtained from the KMS 114.

2.1. Example Computer Implementation

Figure 5:
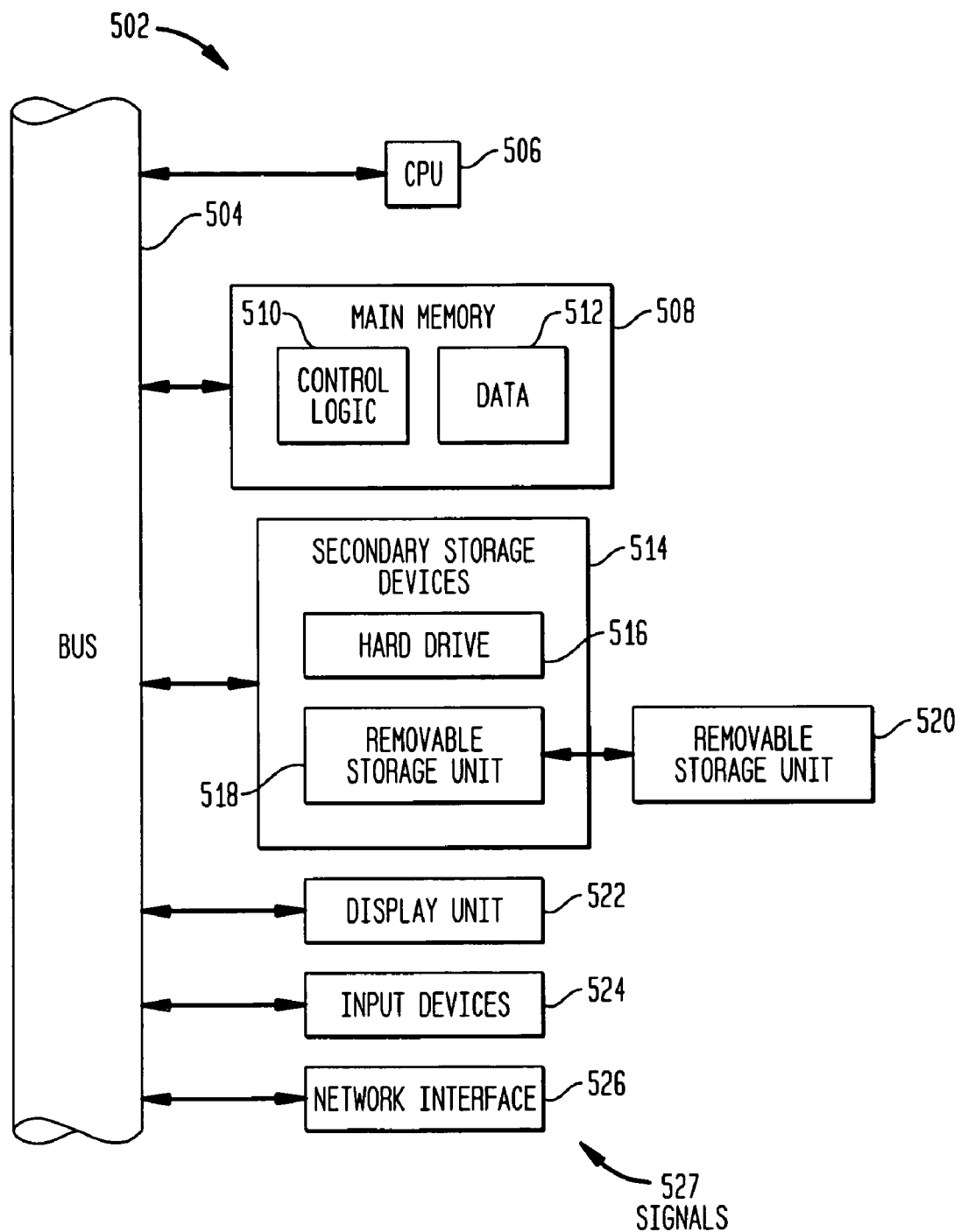
FIG. 5 is a block diagram useful for implementing elements of embodiments of the invention.

In an embodiment of the present invention, the components of the present invention shown in FIG. 1 are implemented using well known computers, such as a computer 502 shown in FIG. 5. The computer 502 can be any commercially available and well known computer capable of performing the functions described herein, such as computers available from International Business Machines, Apple, Silicon Graphics Inc., Sun, HP, Dell, Compaq, Gateway, etc.

The computer 502 includes one or more processors (also called central processing units, or CPUs), such as a processor 506. The processor 506 is connected to a communication bus 504. The computer 502 also includes a main or primary memory 508, preferably random access memory (RAM). The primary memory 508 has stored therein control logic 510 (computer software), and data 512.

The computer 502 also includes one or more secondary storage devices 514. The secondary storage devices 514 include, for example, a hard disk drive 516 and/or a removable storage device or drive 518. The removable storage drive 518 represents a floppy disk drive, a magnetic tape drive, a compact disk drive, an optical storage device, tape backup, ZIP drive, a slot, a PCMCIA device, etc.

The removable storage drive 518 interacts with a removable storage unit 520. As will be appreciated, the removable storage unit 520 includes a computer usable or readable storage medium having stored therein computer software (control logic) and/or data. The removable storage drive 518 reads from and/or writes to the removable storage unit 520 in a well known manner.

Removable storage unit 520, also called a program storage device or a computer program product, represents a floppy disk, magnetic tape, compact disk, optical storage disk, ZIP disk, memory card, PCMCIA card, or any other computer data storage device. Program storage devices or computer program products also include any device in which computer programs can be stored, such as hard drives.

In an embodiment, the present invention is directed to computer program products or program storage devices having software that enables the computer 502 to perform any combination of the functions described herein.

Computer programs (also called computer control logic) are stored in main memory 508 and/or the secondary storage devices 514. Such computer programs, when executed, enable the computer 502 to perform the functions of the present invention as discussed herein. In particular, the computer programs, when executed, enable the processor 506 to perform the functions of the present invention. Accordingly, such computer programs represent controllers of the computer 502.

The computer 502 also includes a display unit 522, such as a computer monitor, and one or more input devices 524, such as a keyboard, a mouse, other pointing devices (such as a light pen and trackball), etc.

The computer 502 further includes a communication or network interface 526. The network interface 526 enables the computer 502 to communicate over communication networks, such as networks 108 and 112, which in embodiments use the well known HTTP communication protocol.

The computer 502 can receive signals 527 from any medium via interface 526. Such signals 527 may include data and/or software. Such signals 527 represent another computer program product embodiment, and the invention is directed to such embodiment.

The components of the invention (shown in FIG. 1) are described in greater detail below. It should be understood that any specific software, hardware, or operating system implementations described herein are provided for purposes of illustration, and not limitation. The invention can work with software, hardware, and operating system implementations other than those described herein. Any software, hardware, and operating system implementations suitable for performing the functions described herein can be used.

2.2. Databases

Figure 3:
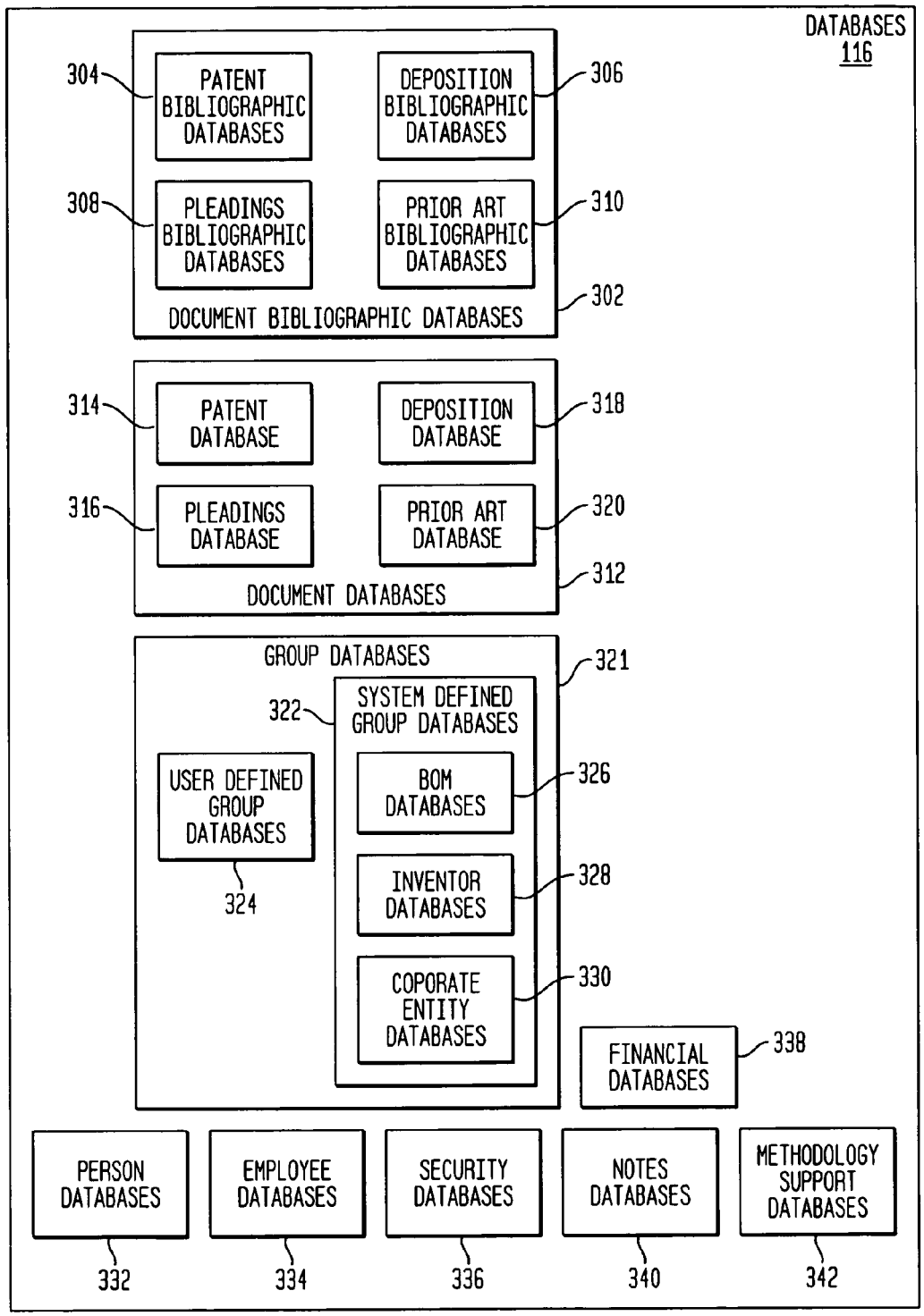
FIG. 3 is a block diagram of databases according to an embodiment of the invention.

FIG. 3 illustrates an example embodiment of the databases 116. According to an embodiment of the present invention, the databases 116 store documents, information related to the documents, and/or information pertinent to the analysis of the documents.

FIG. 3 illustrates a particular embodiment of the databases 116, and also illustrates a particular embodiment of the types of tables that the databases 116 contain, and the attributes in the tables. It should be understood, however, that the invention is not limited to the particular database embodiment of FIG. 3. Instead, the invention is adapted and intended to cover other database structures and organizations that are capable of storing documents and information pertinent to the analysis of the documents. The particular documents and information that are stored in the databases are implementation dependent and vary based on a number of factors, including the type of analysis that is desired, the specific needs of the customer, the type and content of the information that the customer maintains, the application, implementation issues, etc.

2.2.1. Document Databases

The document databases 312 include electronic representations of documents of interest to the customer. The document databases 312 represent the customer's repository of documents, and are thus also called the customer's document repository. (The "repository" could alternatively represent all documents represented in the databases 116, whether represented in the document databases 312 or the bibliographic databases 302.)

For example, the patent database 314 includes electronic representations of U.S. and foreign patents of interest to the customer. The patent database 314 preferably has stored therein an image file and a text file for each patent represented in the patent database 314, where the image file and the text file are representations of the patent. Details of an embodiment of the image file and the text file are described in U.S. Pat. Nos. 5,623,681 and 5,623,679, which are both incorporated herein by reference in their entireties.

The document databases 312 also include other documents of interest to the customer.

The documents in the document databases 312 may be text, images, graphics, audio, video, multimedia, applications, etc.

2.2.2. Document Bibliographic Databases

The document bibliographic databases 302 store information about documents (as opposed to the documents themselves). More particularly, the document bibliographic databases 302 store bibliographic information about documents.

For example, the patent bibliographic databases 304 store bibliographic data about U.S. and non-U.S. patents. Such patent bibliographic data includes, but is not limited to, the information on the front page of patents, such as: the patent number, the issue date, the inventors, the title, the assignee, the serial number, the filing date, the U.S. and international classifications, the fields of search, the references cited, the primary examiner, the assistant examiner, the attorney, the agent, the law firm, priority information, related application information, the number of claims, the number of drawing pages, the patent term, the expiration date, etc. The patent bibliographic databases 304 can also include one or more user defined fields that can store large amounts of data.

2.2.3. Notes Database

The present invention supports annotation of the documents in the document databases 312. More particularly, the present invention allows users to create and link annotations (also called notes) to the documents (or portions thereof) in the document databases 312. Such annotations can include text, graphics, images, video, audio, and/or any other information representation that can be stored in electronic form.

The annotations, linkage information (i.e., information that specifies the link between a note and a portion of a document), and information related to the annotations and/or the linkage information (such as the position of the linked portion in the document, the date of creation, the creator, the date of modification, a note title and/or subject, access rights, etc.) are stored in the notes databases 340. Embodiments of the notes databases 340 are described in U.S. Pat. Nos. 5,623, 679 and 5,623,681, incorporated by reference herein.

2.2.4. Groups Databases

Information on groups is stored in the group databases 321. Generally, a group is a data structure that includes any number of objects that typically follow a common theme or characteristic (although this is not a mandatory requirement of groups). Groups are said to be document-centric.

There are two classes of groups: predefined groups (also called system defined groups) and user-defined groups (also called arbitrary groups).

The invention also supports other types of groups. For example, the invention supports temporary groups. A temporary group is automatically created by the invention in the course of processing a command. One application of temporary groups involves search operations. Specifically, when conducting a search for documents, a new temporary group is created, and the search results are stored in the temporary group. Groups may be created through the processing of other commands or actions. The invention permits operators to save temporary groups. For example, the invention allows operators to convert temporary groups to predefined groups or user-defined groups.

Groups are further described in U.S. Pat. No. 5,991,751, which is herein incorporated by reference in its entirety.

2.3. Example Block Diagram of the Knowledge Management System

Figure 2:
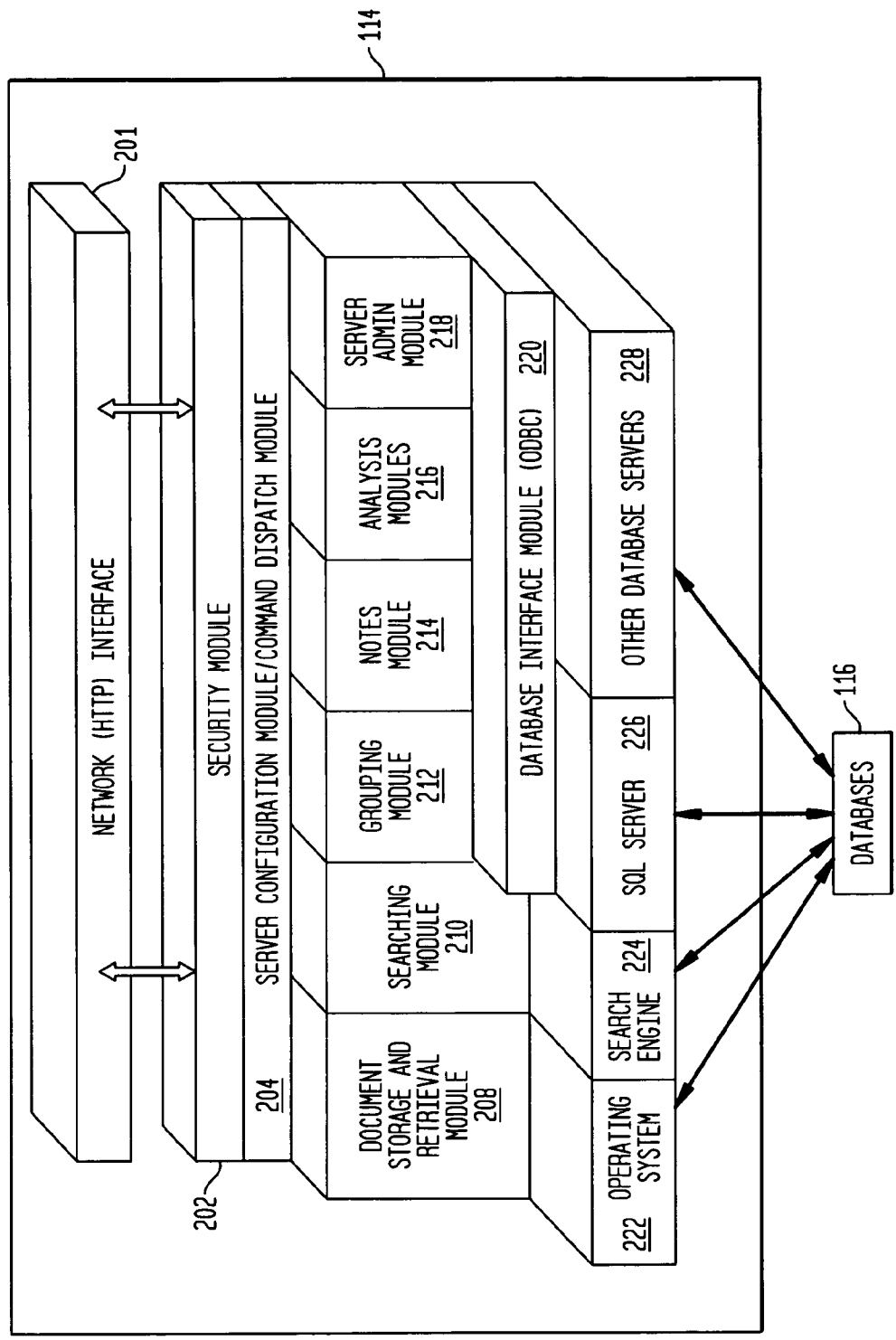
FIG. 2 is a block diagram of the KMS according to an embodiment of the invention.

FIG. 2 is a logical block diagram of the KMS 114. The architecture of FIG. 2 is provided for illustrative purposes. Other architectures suitable to achieve the functions of the invention will be apparent to persons skilled in the relevant art(s) based on the teachings contained herein.

The KMS 114 has a number of modules (collectively called the KMS modules).

A number of the modules interact with the databases 116. A SQL server 226 (such as the Microsoft SQL Server) and/or other well known database servers 228 interact with the databases 116. The KMS modules interact with these servers 226 and 228 and the databases 116 via a database interface module 220, which may represent, for example, an ODBC (object database connectivity) layer.

The Network transport layer or interface 201 is used to receive command request objects from the client 104, 106.

The KMS 114 is a highly secure business decision system. In an embodiment, the specific operations in each command object are checked against the security information maintained about each user in the system. This is logically done through a comprehensive security layer or module 202.

The document storage and retrieval module 208 provides access to documents and information in the databases 116.

The Searching subsystem or module 210 provides for document and information searching. The search layer 210 also encapsulates the specific search engine(s) 224 used in the implementation of the system, which can and will vary based on available search technologies.

The Groups layer or grouping module 212 is responsible for managing groups.

The Notes layer or module 214 is responsible for managing forms of annotations.

The Analysis layer or analysis modules 216 perform analysis in support of specific requests made by various modules in the system.

Finally, the server administration layer or module 218 provides services to manage the configuration of the KMS 114, such as adding or changing the security permissions associated with a specific user.

The modules described above are further described in U.S. Pat. No. 5,991,751, incorporated herein by reference in its entirety.

2.4. Analysis Modules

Figure 4:
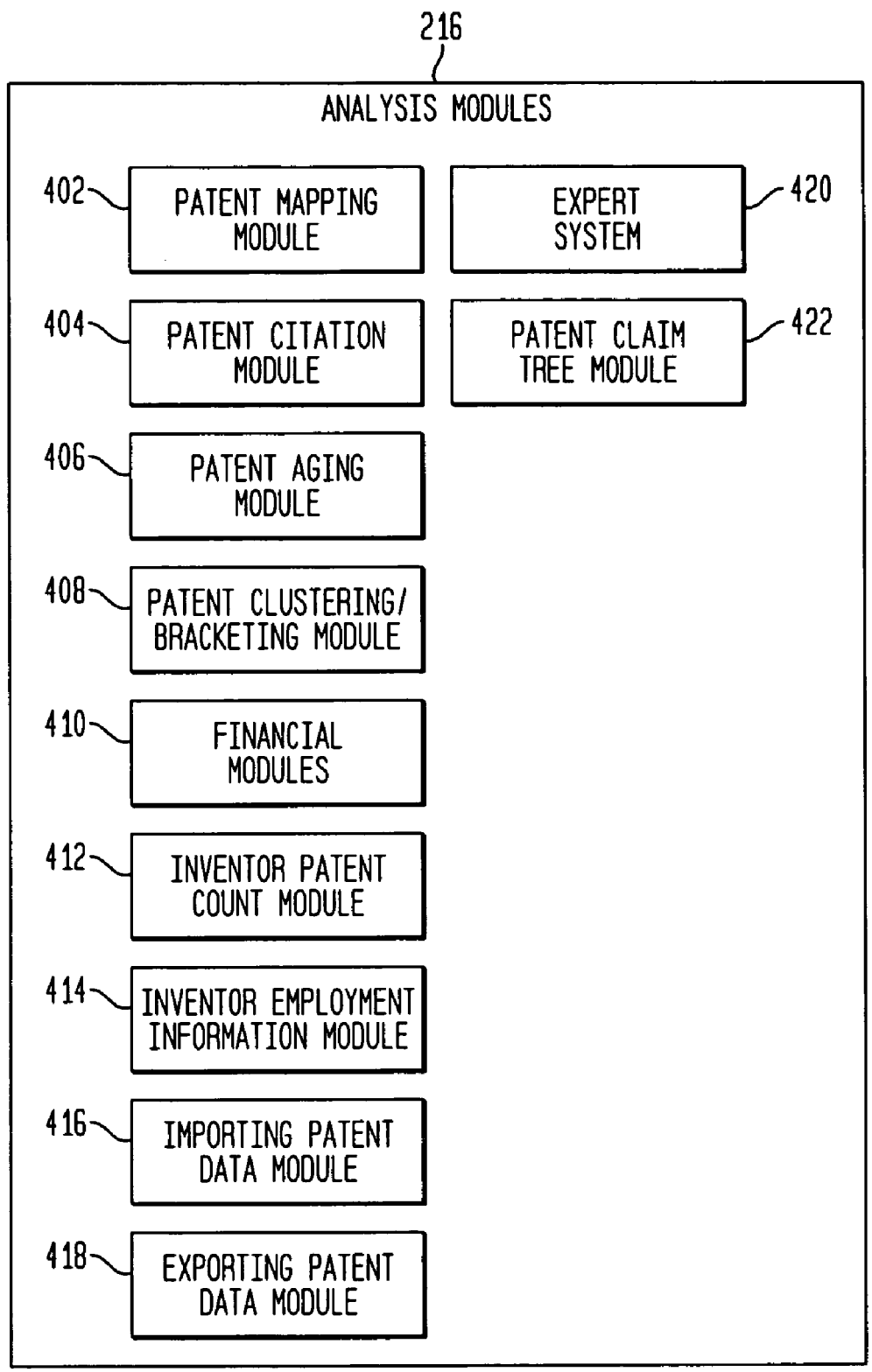
FIG. 4 is a block diagram of analysis modules according to an embodiment of the invention.

Example analysis modules 216 are shown in FIG. 4. These analysis modules 216 semi-automatically and automatically interact and process documents and information contained in the databases 116 pursuant to user commands. Such processing is sometimes referred to herein as "analytics." The analysis modules 216 have the capability of processing documents in one or more groups, and potentially the parents and/or children of these groups.

It should be understood that the invention is adapted and intended to include a wide and varied range of analysis modules 216. The analysis modules 216 shown in FIG. 4 represent only a sampling of the analysis modules 216 that the invention is adapted and intended to support. The invention can support many other analysis modules 216 because the databases 116 are so rich. The analysis modules 216 can include any other module that performs useful processing (from the point of view of the customer) of the data in the databases 116.

Analysis modules 216 are further described in U.S. Pat. No. 5,991,751, which is herein incorporated by reference in its entirety.

3. Knowledge Management—Example Work Flow Embodiments

As its name indicates, the knowledge management system (KMS) 114 is useful for managing knowledge. The knowledge that is being managed comprises documents of interest to users. Such documents may be in any form, such as but not limited to text, images, graphics, audio, video, multimedia, computer programs/applications, etc., and combinations thereof.

The KMS 114 provides a number of functions for processing and manipulating knowledge. Typically, the functions that are performed are selected by users. More particularly, users select the functions that are to be performed, and the sequence in which those functions are performed. This is referred to as "work flow."

Figure 6:
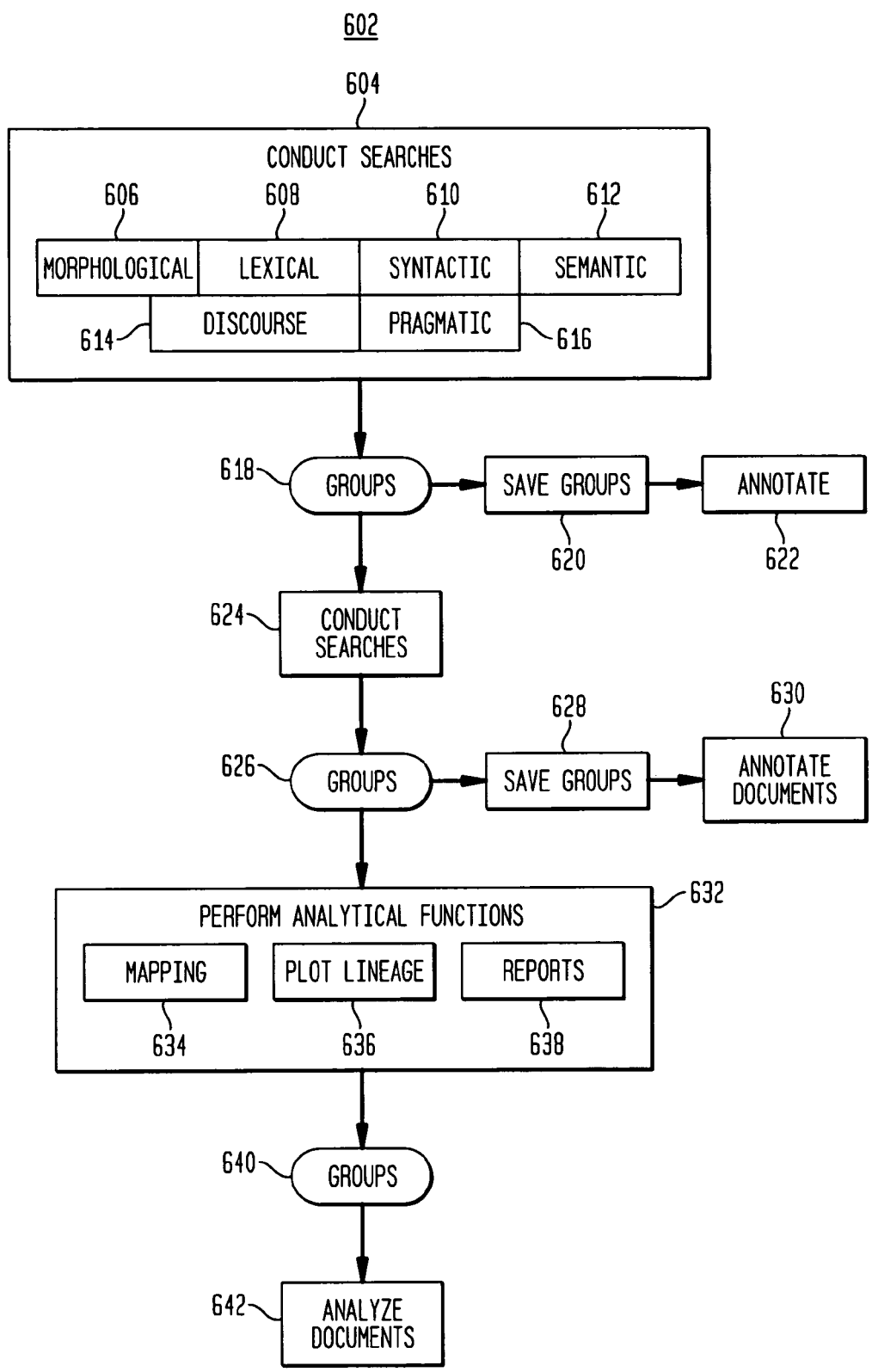
FIG. 6 is an example work flow diagram according to an embodiment of the invention.

FIG. 6 illustrates an example work flow 602 using the KMS 114. It is noted that this work flow 602 is provided for illustrative purposes, and is not limiting. There are any number of work flows that can be achieved using the KMS 114. The work flow that is actually used in any given situation depends on a number of factors, such as the knowledge being processed (i.e., the documents being processed), the goals of the task, the application, the tools that are available, etc.

In step 604 of FIG. 6, one or more searches are performed. These searches can be over databases 116, and/or over another repository of documents, such as over an external database or search engine. The goal of the search is to identify documents which satisfy some criteria (i.e., the search criteria).

The invention supports a number of searching types. These may be based, for example, on morphological processing 606 (involving the understanding of components of words), lexical processing 608 (matching whole words during searches), syntactical processing 610 (taking into consideration the role of words), semantic processing 612 (the meaning of words in sentences), discourse processing 614 (understanding parts of documents), and/or pragmatic processing 616 (using external knowledge). Based on such processing, the invention supports full text search modules 704, boolean search modules 706, clustering modules 708, as well as other search modules (see FIG. 7).

The searches of step 604 result in one or more lists of documents. In an embodiment, the lists correspond to groups 618. Accordingly, the searches of step 604 automatically generate groups 618. This is generally true of the invention. That is, processing of documents results in groups, where the groups include documents that were identified, or that resulted, from such processing.

In an embodiment, the groups 618 are temporary. In such embodiments, it is possible to save the groups 618 (step 620). It is also possible to annotate the groups 618, and the documents in the groups 618 (step 622).

The user may wish to conduct further searching within the groups 618. Such further searching is represented by step 624, and this results in new groups 626. Again, such groups 626 may be saved (step 628) and/or annotated (step 630).

Figure 8:
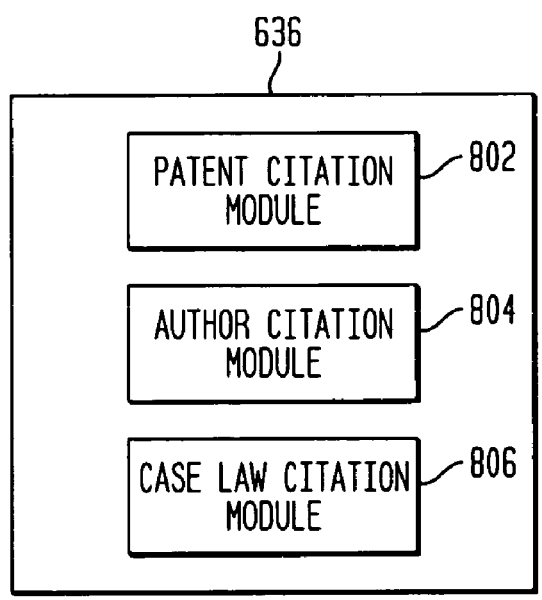
FIG. 8 is a block diagram of various citations modules according to an embodiment of the invention.

In step 632, the user elects to analyze the groups 626 and the documents contained therein. The invention supports a number of analysis modules, such as mapping modules 634, citation or plot lineage modules 636, and reporting modules 638. See also FIG. 4. These modules are further discussed below, as well as in U.S. Pat. No. 5,991,751, which is herein incorporated by reference in its entirety. Also consider FIG. 8, which illustrates an embodiment of the citation modules 636.

The citation modules 636 includes a patent citation module 802 (see U.S. Pat. No. 5,991,751), an author citation module 804, and a case law citation module 806.

Figure 9:
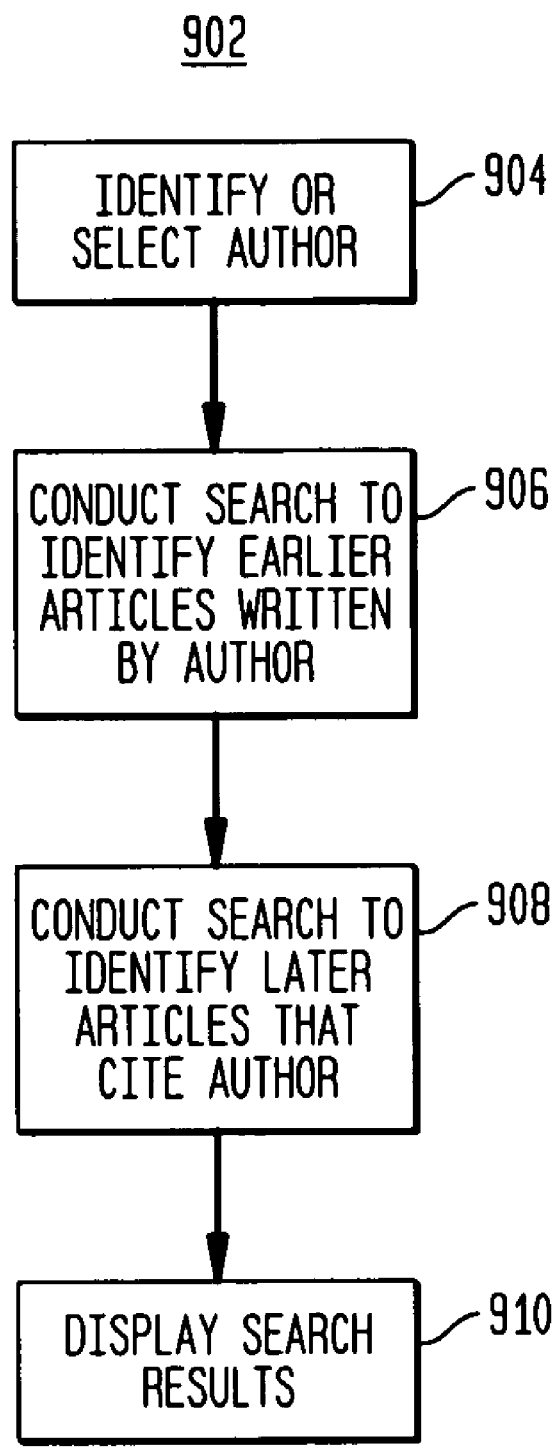
FIG. 9 is a flowchart representing the operation of an author citation module according to an embodiment of the invention.

The author citation module 804 operates to identify documents related to an author. The operation of the author citation module 804 according to an embodiment is shown in FIG. 9. In step 904, an author is identified or selected. In step 906, searches are conducted over databases 116 (and/or over other repositories of documents) to identify articles written by the author. In step 908, searches are conducted over databases 116 (and/or over other repositories of documents) to identify articles that cite the author. In step 910, the search results of steps 906 and 908 are displayed. A hyperbolic tree mechanism may be utilized for the display (similar to a patent citation map).

The author citation module 804 as described above is focused on an author. It can be modified to be focused on a particular article (called the based article). For example, references on which the base article is based, and references that cite the base article, could be displayed in step 910.

The case law citation module 806 operates to display cases on which a given case is based, and cases that cite the given case. In this manner, it is similar to the author citation module 804, and its processing is similar to that shown in FIG. 9.

Referring again to FIG. 6, the analysis of step 632 results in lists of documents. Again, in an embodiment, those lists correspond to groups 640.

The processing performed thus far may have been intended to narrow a large database of documents to a smaller set that is pertinent to certain criteria of interest to the user. This involved various searching (steps 604 and 624) and analysis (step 632). The resulting groups 640 may include documents that the user feels are very pertinent to his criteria of interest. Thus, the user is ready at this point to analyze in detail each document in the groups 640. This is represented by step 642. Such analysis may involve a manual study of the documents, and/or further analytics (such as that performed in step 632).

Figure 30:
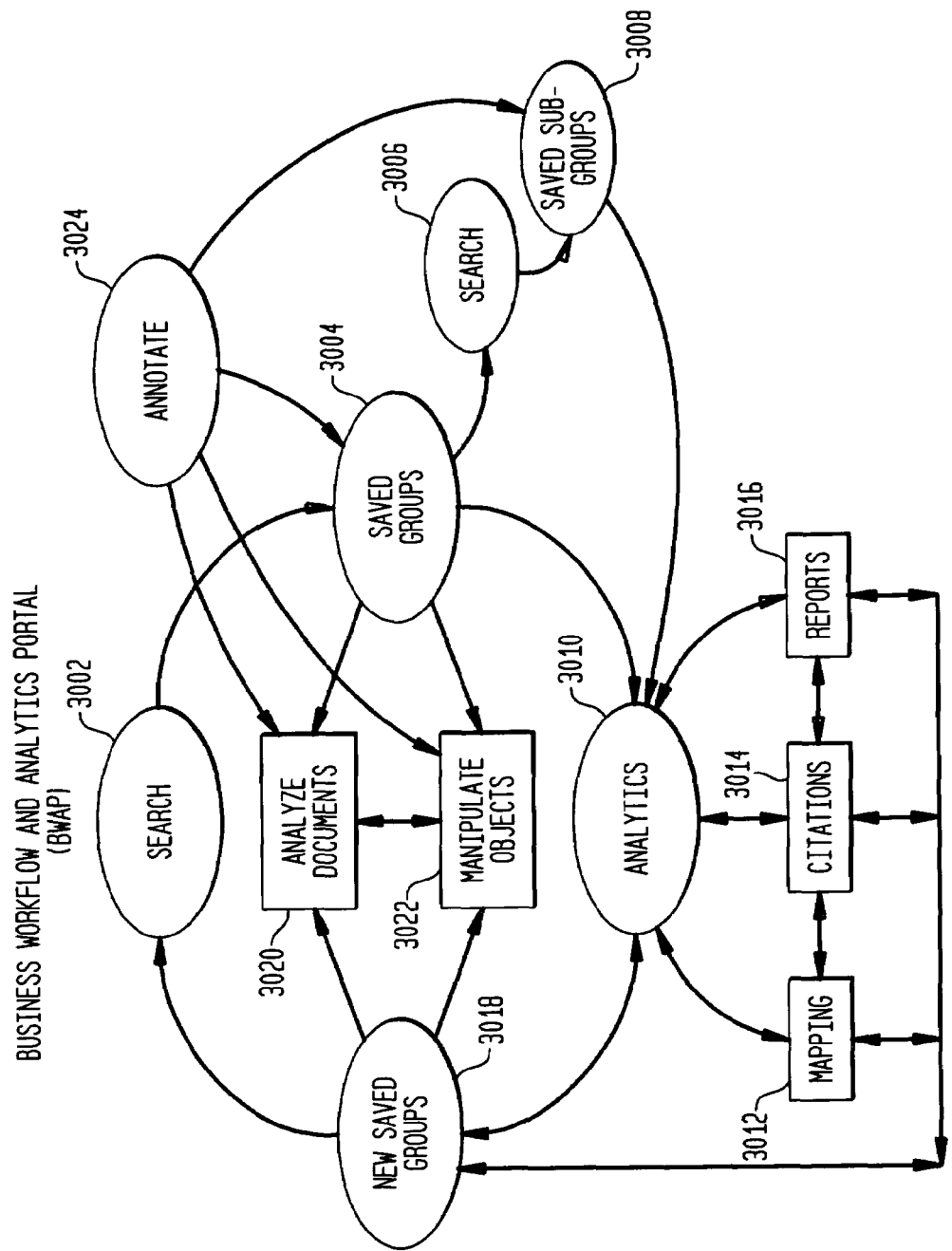
FIG. 30 is an example state diagram indicating the manner in which users may create sequences of actions to thereby generate different work flows/processes.

FIG. 30 is another view of the knowledge management capabilities of the invention. Specifically, FIG. 30 is a state diagram representing some example work flows that are achievable via the KMS 114.

FIG. 30 indicates that searches 3002 can be performed. Such searches 3002 result in groups 3004. The groups 3004 can be further searched 3006 to thereby generate sub-groups 3008. The groups 3004 can also be analyzed 3010, and such analysis results in groups 3018. Such analysis 3010 may include mapping operations 3012, citation operations 3014, and/or reporting operations 3016.

Groups and documents can be annotated 3024. Also, documents can be individually analyzed 3020.

Figure 37:
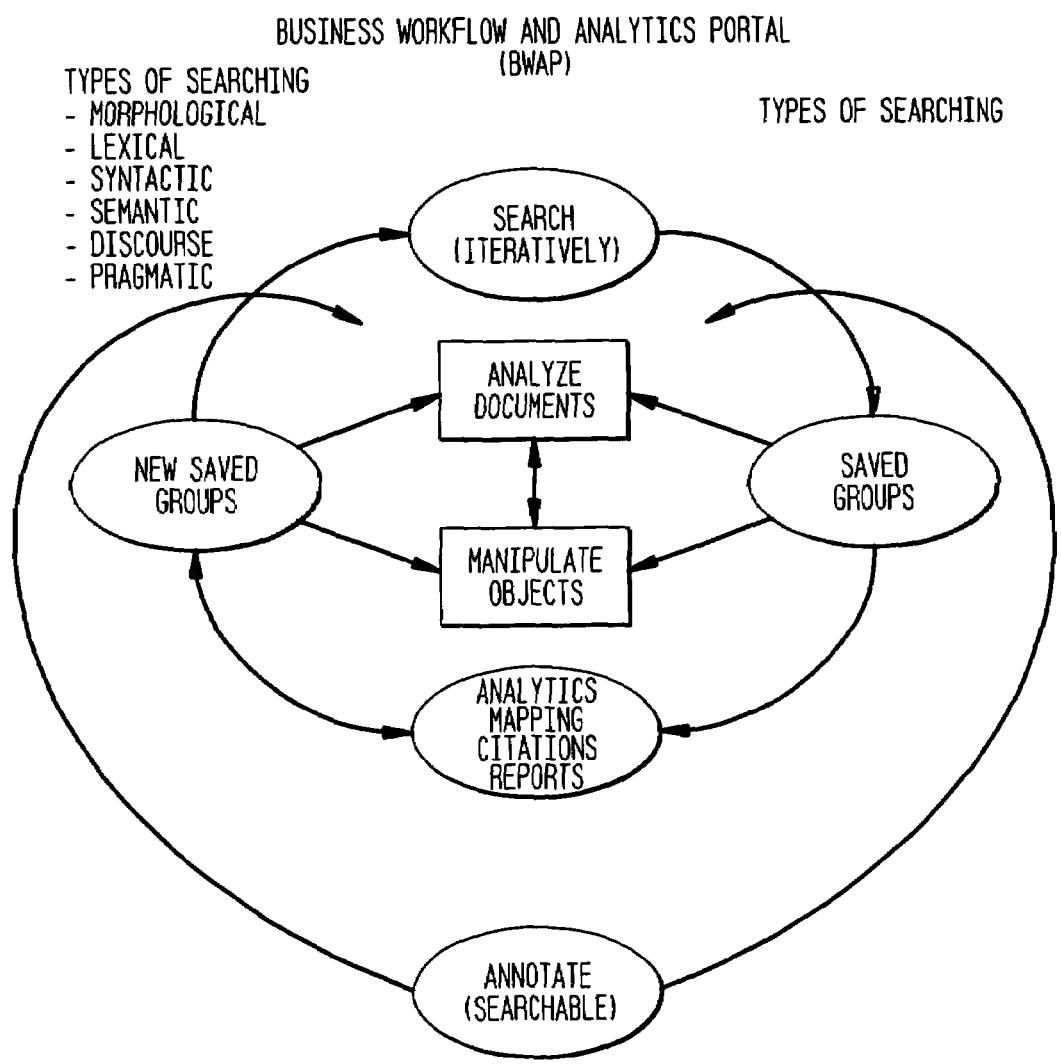

FIG. 37 illustrates another view of the knowledge management capabilities of the invention which is somewhat similar to FIG. 30.

Figure 36:
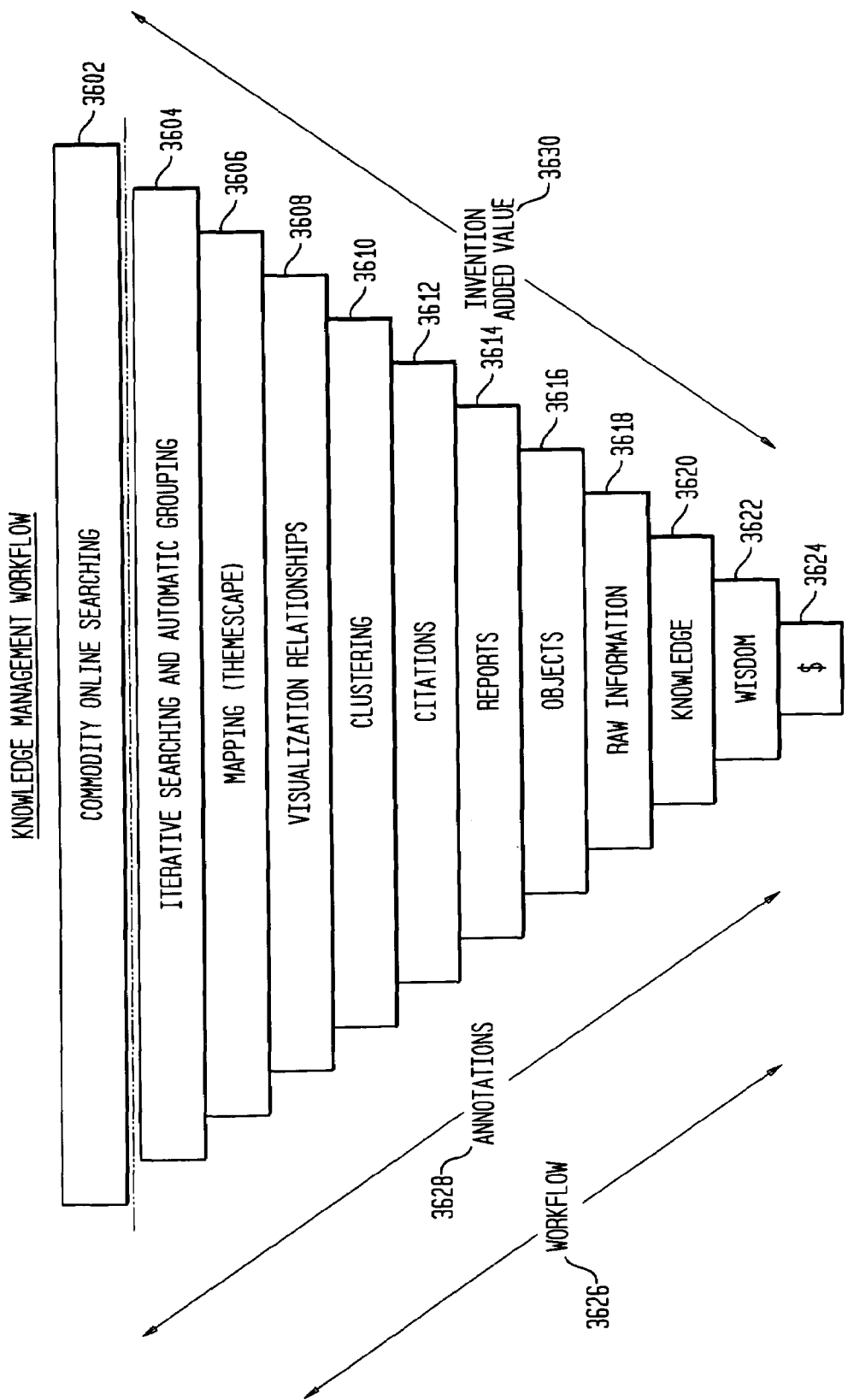
FIGS. 36 and 37 illustrate additional work flow examples of the invention.

FIG. 36 depicts another work flow 3626 view of embodiments of the invention. This workflow 3626 indicates an example use of the invention. Specifically, the invention can be used to "funnel" or process a large amount of information so as to achieve "wisdom" 3622, where such wisdom 3622 can have great commercial value 3624. This example indicates that one may utilize commodity online searching 3602 (such as, but not limited to, a search engine available through the Internet) to identify a number of documents somehow related to a topic of interest. Then, through a series of searching and grouping 3604, mapping 3606, visualization relationships 3608, clustering 3610, citations 3612, reports 3614, use of objects 3616, one may identify from the large set of documents a select few that are more particularly related to the topic of interest. This is represented by the "knowledge" block 3620 in FIG. 36. Through analysis of this select set of documents, one can determine a great deal about the topic of interest, resulting in wisdom, which as noted above may have financial value 3624. As noted above, the invention enables users to annotate 3628 the workflow 3626.

The work flows described herein can be saved. In other words, the invention supports persistent work flows or processes. The invention achieves persistent processes through the use of objects. These objects can be manipulated, as indicated by step 3022 in FIG. 30. This topic is described in the following section.

4. Achieving Persistent Processes Through Use of Objects

As mentioned above, the invention enables users to save work flows, which are also referred to as processes. In other words, the invention allows users to make processes persistent.

The invention uses objects to achieve this function. The invention creates objects for components of a process. For example, with regard to the example process of FIG. 6, the invention creates objects for the search operations 604, 624, the groups 618, 626, 640, and the analysis 632 that is performed. The process can thereby be saved by storing such objects.

A number of advantages are achieved by making a process persistent. Some of the advantages (and features of the invention) are shown in FIG. 11.

On advantage is a process can be easily fully or partially re-executed by traversing one or more of its objects (i.e., by invoking the objects). This is represented by step 1106.

Another advantage is it is easy to create new processes by modifying old processes. This is represented by steps 1108-1114. In step 1108, a user copies objects corresponding to an old process to create new objects. In step 110, the user modifies the copied objects to create a new process. In step 1112, the user executes the new process by traversing its objects. The user can then compare the new process to the old process by comparing its respective objects (see step 1114).

The invention enables users to organize and manage objects. For example, a user can save objects, delete objects, view objects, modify objects, organize objects in folders, etc. Such operation is represented by step 1116.

The invention supports definitions (or templates) for various objects. The invention supports operation objects (such as query, boolean, import, patent family, corporate family, list exploder objects) and application objects (web reporting, citation tree, patent family tree, corporate family tree, visualization, clustering objects), as well as other objects. As a process is being executed, objects corresponding to the process's components are created (instantiated) based on the applicable object definitions.

Figure 29:
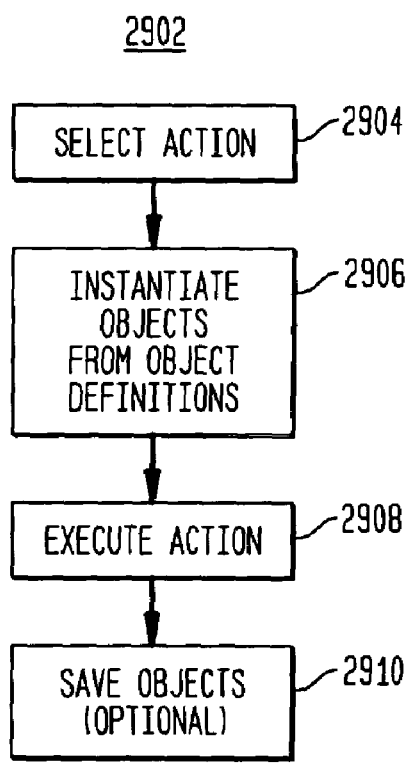
FIG. 29 is an example flowchart used to illustrate how objects are created according to an embodiment of the invention.

Such operation is depicted in the flowchart 2902 of FIG. 29. In step 2904, an action is selected. This is the action that is to be performed next in the process, such as a search. This action may produce a result, such as a list of documents. In step 2906, the object definitions corresponding to the action and the result are identified, and objects are created based on such object definitions. In step 2908, the action is executed. This may involve updating the objects created in step 2906. For example, at this point, a list object may be populated with the list of documents resulting from executing the action in step 2908 (or the list object could be instantiated at this point). In step 2910, the objects can be saved (this is an optional step).

Figure 28:
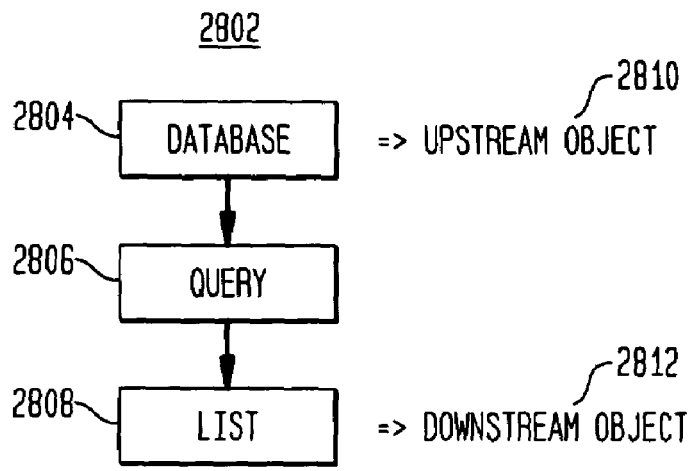
FIG. 28 is an example work flow diagram used to illustrate the difference between upstream objects and downstream objects.

Many objects have an input and an output. The input represents one or more other objects, which are called upstream objects 2810 (see the example work flow diagram 2802 in FIG. 28). Similarly, the output represents one or more other objects, which are called downstream objects 2812.

Thus, the features of the invention just described enable users to create, store, manage, manipulate, and share their work - not just results, but the operations and processes for arriving at those results. In addition, these features enable automation of processes to greatly reduce or eliminate the manual effort required to update previously generated results.

Each object type has attributes that help users document and re-use their work. Users can create, manage, and access objects from Object Manager, a tree navigation and management tool similar to Windows File Manager.

With regard to queries (searches), by defining upstream objects (such as a List or database) that will be queried, the Trigger (such as a change to a List or an update to a database source) that could cause the Query to auto-execute, and the downstream object (the output List), a user could set up a number of Queries to feed Lists of common topics (such as competitor activity) that could be shared with perhaps many users. The other types of objects will have similar properties.

Using the defined objects as building blocks connected together in strings, complete processes can be set up. Some simple examples would be:

Database->Query->List->Report

[List A, List B]->Boolean->List C->ThemeScape

One powerful feature of this architecture is that these strings of objects can be defined as objects themselves. Called Process Stream Objects, these objects can be created, stored, and auto- or manually-executed. They can also be copied, modified, and moved, greatly simplifying the task of setting up new processes. A goal in developing these features is to provide the building blocks to enable users to construct, store, utilize, and manage whatever Process Streams they might envision.

Object definitions are described in the following sections. These definitions are provided for illustrative purposes. The invention supports other objects, and the definitions for these other objects will be apparent to persons skilled in the relevant arts based on the teachings contained herein.

4.1.1. Common Object Features

In an embodiment, the following features apply to all objects.

4.1.1.1. Generic Attributes

Object Type

The Object Type is a code that identifies the object as a List Object, Import Object, Patent Family Exclude Object, etc. This provides the system with a simple way to verify that connections are attempted only between compatible Object Types.

Name

The same naming rules apply for all Object Types. A maximum of 50 characters may be used, including any printable ASCII character except < > / \ ' , " Naming is case-sensitive; neither the first nor the last character can be a space. When generating a new Object, the system generates a default name of the format (NewList, NewList1, NewList2, etc) and prompts the user for the desired name. The default name is used unless the user enters an alternative.

Path

The Path for an Object consists of the Windows path to the Object Database, followed by the traversal of the hierarchy (as defined in the Object Database) to the Folder containing the object.

Object ID

The Object ID is a unique system generated object identifier which allows the system to maintain a simple notation for describing linkages between objects. For example, a list of downstream objects imbedded in the attributes of a Data Object requires only the list of Object IDs, rather than a list of Object Paths/Names. When the user changes the name and/or location of a folder or Data Object, the Object ID stays the same. A lookup table is used to relate Object ID to Object Path/Name. This table is modified if the user moves the object to a different folder, folders in the path are renamed, or folders are moved around in the hierarchy.

Object Version Number

The Object Version Number indicates the definition and format used when an Object was created. Use of this number allows future changes to the number and type of object attributes, or to the object's storage format. The system should ensure that the object version is current; if not, the system should prompt the user to supply missing attribute information, or insert defaults and re-store in the updated version.

Object Description

The Object Description is a short user-entered text that can be displayed in the listing of objects in the Object Manager. Maximum text length is 50 characters.

Owner

The Owner of an object is the user who created it. When objects are copied, the user creating the copy is the Owner of the copy. Ownership implies full read/write/modify/delete/execute permissions. The Owner field is displayable by any user, but is editable only by the system administrator.

Permissions

In an embodiment, top-level folders are provided for each individual user and each user group; all users who have access to a top-level folder have full access to all objects in that branch of the hierarchy. In another embodiment, permissions may be set separately for individual users, user groups, top-level folders, and individual objects. Supported permissions are Read, Write, Annotate, and Execute.

Create Date

The Create Date is set to the date the object is created. When an object is copied, the Create Date of the new version is the same as the Create Date of the original. It may be displayed, but cannot be edited.

Modification Date

The Modification Date is initially set to the Create Date, then is updated based on the following events:
Name changed
Path changed
Owner changed
Object version updated
Permissions changed
Annotations changed
Contents added, deleted, or modified (applies only to objects that have Contents, including Folders and Lists)
Other Attributes changed
Object copied Object Modification History The Object Modification History is a table showing dates the object was modified, the modification that occurred, and the User Name of the user who made the modification. When an object is copied, the Object Modification History of the new version is the same as the Object Modification History of the original, except that the copy has the additional table entry showing that the object was copied. The Object Modification History may be displayed and printed, but not edited.

Object Modification History table entries:
Object created
Name changed to _____
Path changed to _____
Object Description changed
Owner changed to _____
Object version updated to _____
Permissions changed
Annotations changed
Contents added, deleted, or modified
Object copied
Related Objects added or deleted Annotations Objects have annotation capabilities that are similar to the Group annotation capabilities in IPAM.

Related Objects

Related Objects include Upstream Objects and Downstream Objects in the same Process Stream as the current object:

Upstream Objects

Upstream Objects are those Data Objects that feed data to the current object. See 2810 in FIG. 28. Object Types that are allowable as upstream Objects depends on the Object Type of the current object. For example, a Query cannot be an upstream Objects for another Query—only Lists and Databases can be upstream Objects for a Query.

Downstream Objects

Downstream Objects are those Data Objects that receive data from the current object. See 2812 in FIG. 28. Object Types that are allowable as Downstream Objects depends on the Object Type of the current object. For example, a Query cannot be an Downstream Objects for another Query—only Lists can be Downstream objects for a Query.

Object Triggers

The Object Trigger parameter specifies what causes the object to be executed. Only Operations Objects and Analytic Objects have triggers; List Objects do not. Types of triggers include:
Time-based triggers (daily, weekly, monthly)
Event-based triggers (change to an Object, update to a database)
Manual trigger

4.1.1.2. Generic Object Views

Permissions View

The Permissions View shows which individual users and user groups have access permissions to the List. These permissions may include Read, Write, and Annotate. The Permissions View also allows the Owner to add, change, and delete permissions for the Object.

Figure 12:
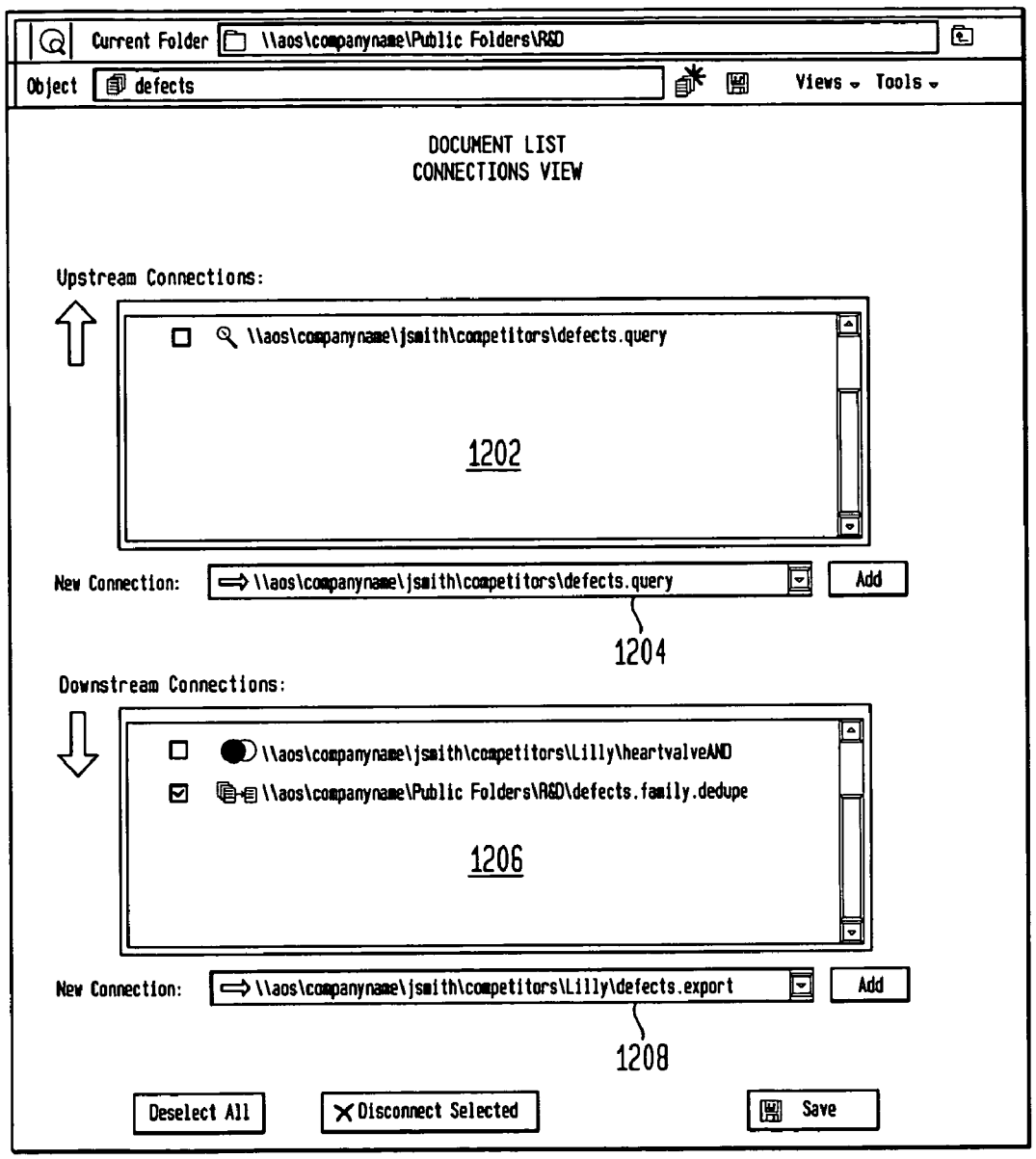

Connections View (see, for example, FIG. 12)

The Connections View shows how the Current Object is connected in the Process Stream to its Upstream and Downstream Objects (see 1202 and 1206 that represent windows in which current connections for the objects are displayed). This view allows the user to add and delete connections to other Objects (see 1204 and 1208 in FIG. 12). The Path/Name of each Object in the Upstream and Downstream Object Lists serves as a hyperlink to Views of that Object. However, these Object Lists are filtered based on the permissions of the user and the Objects, with a placeholder inserted for objects that the user is not permitted to see.

Trigger View (see, for example, FIG. 13)

The Trigger View allows the user to set up auto-executing Process Streams by selecting the trigger event or execution schedule for the object. In the example of FIG. 13, a query called "NewQuery.qry" (see 1312) is being triggered based on the occurrence of an event (see 1302). The event is a change to an list object called "newproj.lst," and the trigger begins on Mar. 27, 2001 (see 1304), and continues for 10 occurrences thereafter (see 1306).

Figure 14:
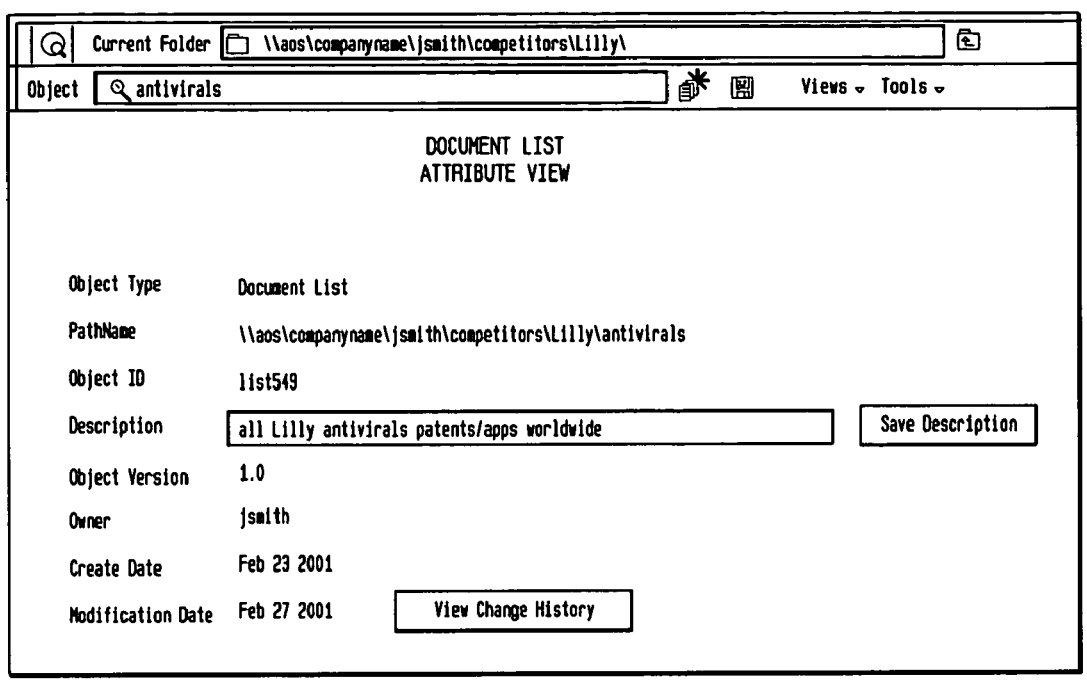

Attribute View (see, for example, FIG. 14)

The Attribute View shows the values of the following object attributes:

Object Type
Name
Path
Object ID
Description
Object Version
Owner
Create Date
Modification Date Users can change the Description in the Attribute View.

Figure 15:
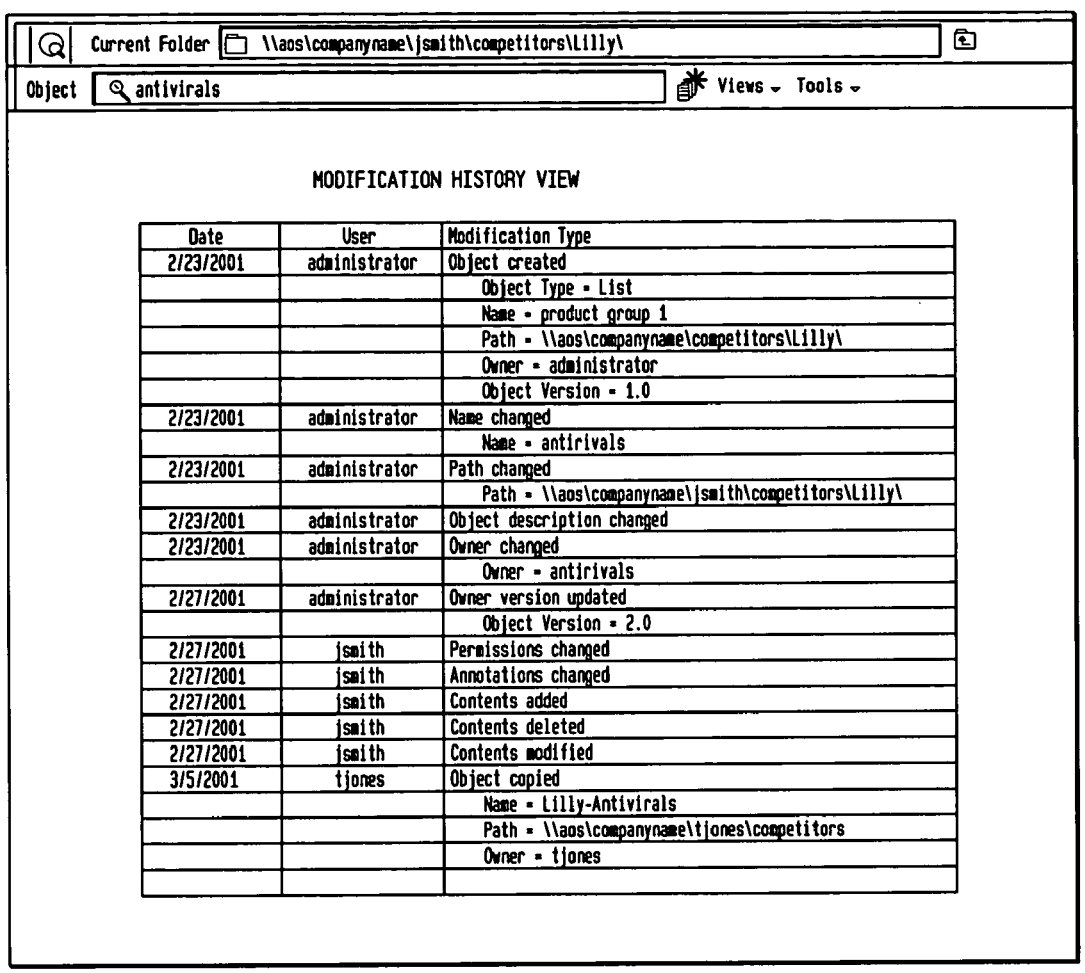

Modification History View (see, for example, FIG. 15)

The Modification History View provides a table of change activities affecting the List. Date of change and user ID of the user who made the change is also shown. The entire Modification History may be printed from this view.

Figure 16:
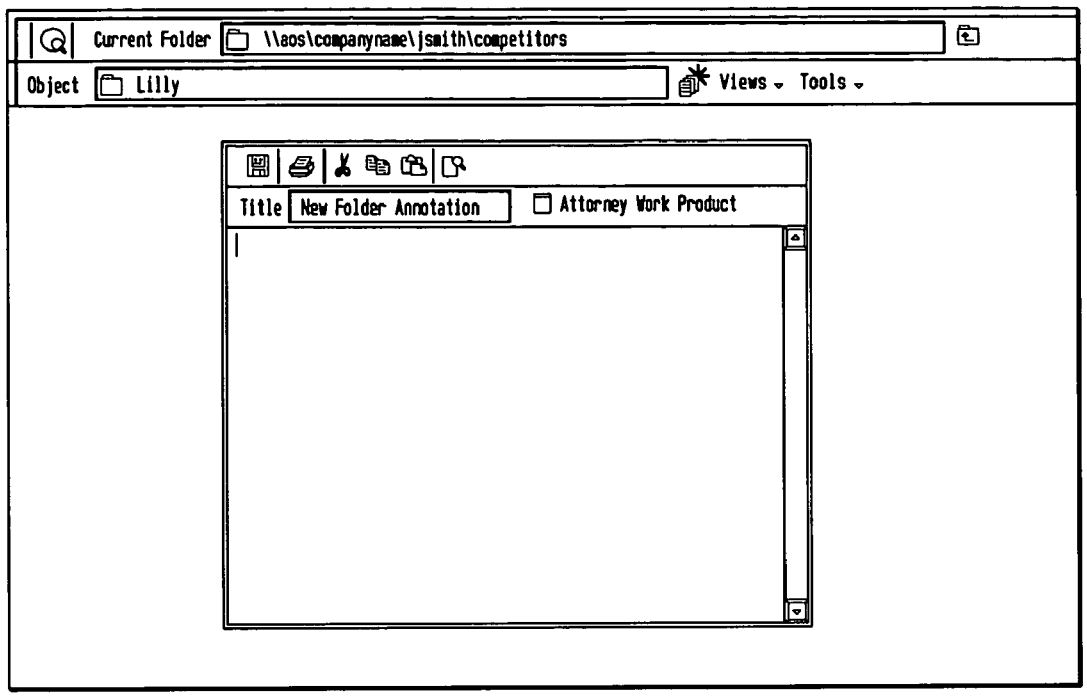

Annotation View (see, for example, FIG. 16)

The Annotation View allows the user to view, edit, and print existing List annotations, as well as add new ones. Any user with Annotate permission for the List may add annotations. Annotations of individual Documents contained in the List are handled in the Document View.

4.1.2. Boolean Operation Objects

The Boolean Operation Object allows users to perform boolean operations on Lists to generate List output. Possible boolean operations are (in the following, the upstream objects are List A and List B, and the downstream object is List C):

AND

List A AND List B->List C

List C contains all the documents that appear in both List A and List B.

OR

List A or List B->List C

List C contains all the documents that appear in either List A or in List B.

NOT

List A NOT List B->List C

List C contains all the documents that appear in List A, but not List B.

Figure 17:
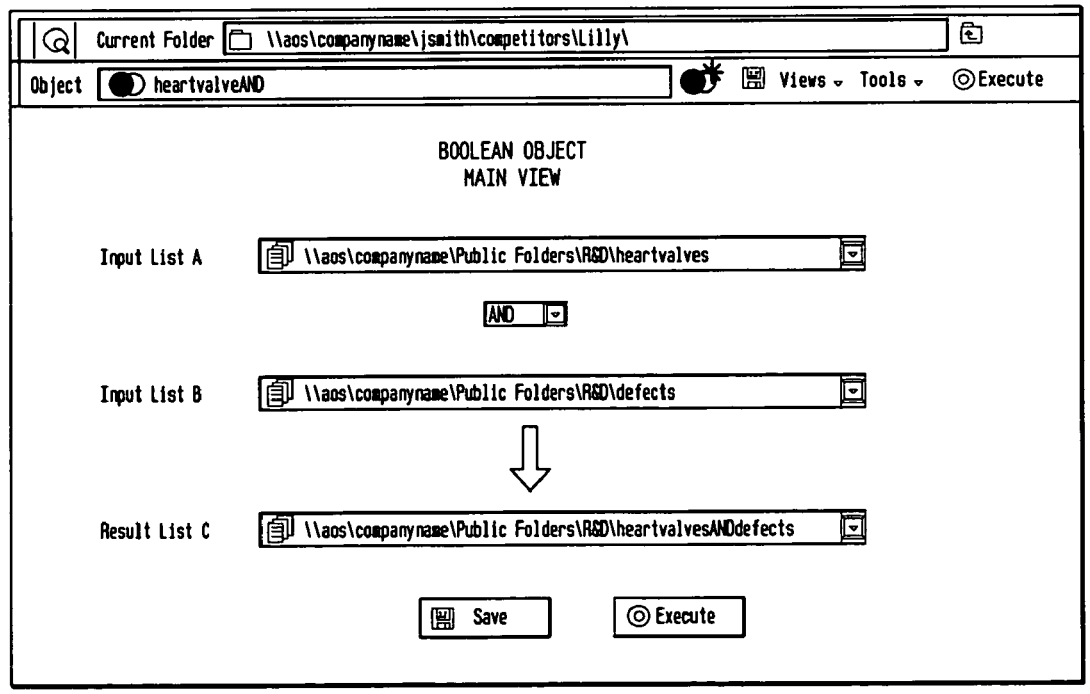

See also, for example, FIG. 17.

4.1.3. Corporate Family Operating Objects

The Corporate Family Operation allows users to define operations based on corporate entity information. For example, this object can sort through a list of patents to identify those that are assigned to a particular corporate entity.

4.1.4. Export Objects

The Export Operation Object allows tracking of exported Lists and their formats. This object corresponds to an export operation where a particular object, such as a list object for example, is exported to a destination. The export operation includes modifying the object according to the specifications of the destination (such as the format of the destination). The user would be prompted to generate or choose an Export Operation Object when beginning the operation. Examples of Export Operation data transactions are exporting to Lotus Notes or to loosely coupled analytic software.

Export specific attributes include the following:

Destination name/provider

Export Format Definition

Allowed formats could include List, delimited text, spreadsheet, etc. The format definition also specifies which fields are exported, and in what order.

Export List description

The export list description is a text string that can be provided to an external program that receives the exported list. This description field also allows the user to record the purposes of the export.

4.1.5. Folder Objects

Folders represent storage locations for other objects, including other Folders. They can be nested in a hierarchy, similar to folders or directories in Windows and DOS. Although in IPAM Folders are implemented in a database rather than in the Windows file system, this is transparent to the user. Folders may be annotated.

Figure 18:
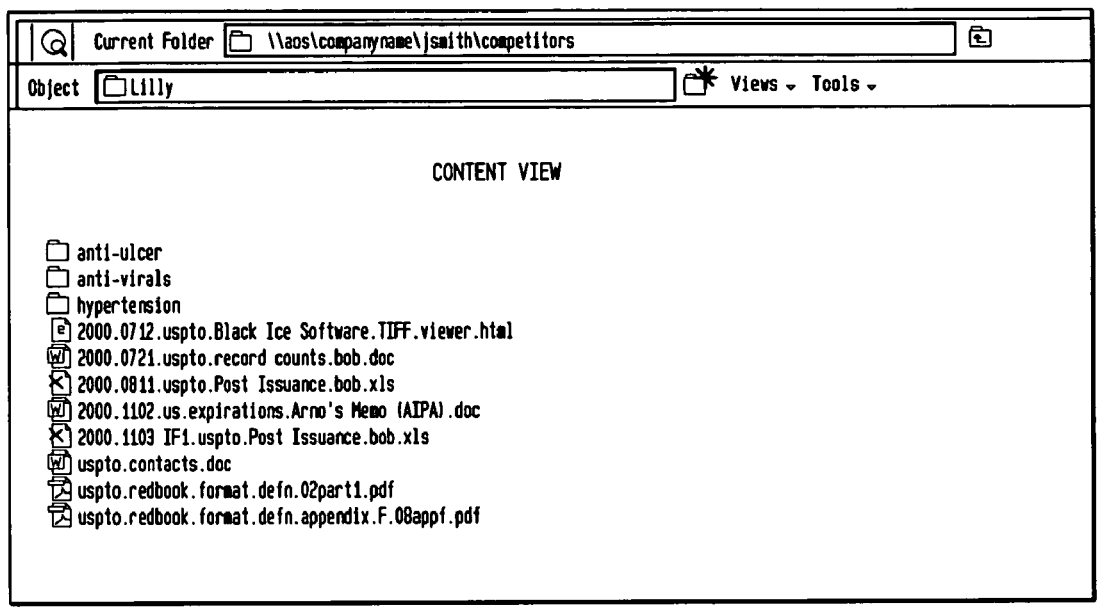

Content View is a Folder-Specific Object View. The Content View shows the contents of the Folder, which can include subfolders and Data Objects of any type. Contents are listed in alphabetical order by name, with subfolders listed first, followed by Data Objects. In addition to the names of the contents, the listing can optionally include the Object Description. The Content View is the default view. See, for example, FIG. 18.

4.1.6. Import Objects

The Import Operation Object allows tracking of the source of list imports, as well as reformatting input data into Lists. In cases where the Import Operation is driven by the external source, the external software could generate an Import Operation Object. An example of a data transaction generating an Import Operation externally would be an export from SciFinder to IPAM.

In cases where the Import Operation is driven from within IPAM, the user would generate an Import Operation Object. An example of an IPAM-driven data transaction could be an import to IPAM.

Import specific attributes include the following:

Source name/provider

Import Format Definition

Accepted formats could include List, delimited text, spreadsheet, etc.

Import List description

The import list description is a text string that can be provided by an external program that generates the list for import. This might describe the search criteria used to generate the set on another search engine, the name of the list on the source platform, etc.

4.1.7. List Exploder Operation Objects

The List Exploder Operation allows users to easily break an input List into a number of output Lists based on one of several criteria: Publication Year, Inventor, IPC, subject matter, etc.

4.1.8. List Objects

A List Object represents a list of documents, implemented as a list of document GUIDs. Display of the List would result in any additional document fields specified for the List View to be fetched from the Patent or Document database. This object corresponds to the concept of "Group" (described elsewhere herein).

Related Objects
Permitted Upstream Objects (one object)
Operation Objects
Query
Boolean
Import
Patent Family Dedupe
Patent Family Expand
Corporate Family
List Exploder
Application Objects
Web Reporting
Citation Tree
Patent Family Tree
Corporate Family Tree
Themescape
ClearForest
Permitted Downstream Objects (multiple objects)
Operation Objects
Query
Boolean
Export
Patent Family Dedupe
Patent Family Expand
Corporate Family
List Exploder
Application Objects
Web Reporting
Citation Tree
Patent Family Tree
Corporate Family Tree
Claims Tree
Themescape
ClearForest
List-Specific Attributes
Document Table
For each document in the Document List, the following fields are contained in the Document Table in the Object Database:
  Doc ID/GUID
  Document Status Code
  Values: Active, Deleted, Pending-Add, Pending-Delete
  Change Source
The Change Source may be either the Upstream Object or Manual.
  Status Change Date (date of most recent status change)
Content Change Type
For those changes to the List content that result from the Upstream Object (in contrast to manual Adds and Deletes), the Content Change Type indicates whether additions or deletions of documents must be confirmed by the user. Content Change Type can have a value of either Auto or Pending. Setting the Content Change Type to Pending for an upstream Query, for example, will cause all Adds and Deletes resulting from a refresh run of that Query being initially marked as Pending-Add or Pending-Delete. Upon confirmation by the user, documents marked Pending-Add or Pending-Delete will be changed to Active or Deleted. Setting the Content Change Type to Auto will cause all Adds and Deletes that result from a refresh run of that Query being marked as Active or Deleted.

List Display Parameters

The List Display Parameters indicate which database fields associated with the documents are to be displayed, the document sort order, and the View and format in which to display the List. These parameters include:

Default View
  This parameter defines which view is displayed when the List is first opened. Choices are Short List View, Full List View, Abstract List View, and Shoebox List View.
Max Docs Per Page
  The user may set the number of documents to display on each page of the List. The maximum number varies depending on the List Content View: Short List View (50 docs max per page), Full List View (20), Abstract List View (10), and Shoebox List View (5).
Sort Order
  The Sort Order parameter indicates the primary, secondary, and tertiary sort keys for displaying the List. Any of the biblio fields may be selected as a sort key.
Display Fields
  A series of check boxes in the List Option View allows the user to select which fields will be displayed for each of the List Content Views. Fields include biblio fields, abstract, front page thumbnail image, or primary drawing. The specific fields available vary between the different List Content Views.
Status Code Display
  Allows the user to choose Document Status Codes for which documents will be displayed. For example, the user may choose to hide all Deleted documents; or may display only the Pending-Add and Pending-Delete documents.
Document View Links
  Allows the user to choose which Document View Links to display. Document Views include Standard View, Fulltext, Claims, Summary Page, HTML Image, PDF Image, Derwent WPI record, etc. See Document View Options MRD for detailed information.

List-Specific Views

List Display Options View
In the List Display Options View, the user may define the Default View for displaying the List, the fields to display, the fields to sort on, and the number of documents to display per page. The user may also choose to display or hide documents for each of the Document Status Codes. The default object view is either 1) the default view defined for that particular List, or 2) the default view specified in the user's Preference setting. Priority of 1) or 2) is specified in the user's Preference setting. See, for example, FIG. 19.

List Content Views:

The List Content Views show the contents of the List, including selected database fields related to the document. Depending on the specific List Content View chosen, the following fields may be available for display:
  Country Code Doc ID
: The Doc ID serves as a hyperlink to the Default View for that document.

Kind Code
Priority Date
Filing Date
Pub Date
Assignee
Inventor
IPC Code
USPC Code
Legal Status
Title
Abstract
Front Page Thumbnail image
Primary Drawing
Document Status Codes
: Document data is displayed in the font color associated with its Status Code; i.e., black for Active, gray for Deleted, green for Pending-Add, red for Pending-Delete.

Change Source
: The Change Source, when it is the Upstream Object, serves as a hyperlink to the Default View for that object.

Status Change Date
Document View Links
: Icons appear only for those Document Views that are available for that particular document.

List Content Views include:

Short List View (see, for example, FIG. 20)
: The Short List View shows a table with one line per document. Rolling the mouse over cells in the table will cause a pop-up to appear showing the entire contents of the cell. This view maximizes the number of records that can appear on each page. Abstracts, drawings, and thumbnails may not be displayed in this view. A maximum of 50 documents per page are allowed in this view.

Full List View (see, for example, FIG. 21)
: The Full List View shows a table with contents of each cell wrapping to as many lines as necessary to show the entire contents of the cell. Abstracts, drawings, and thumbnails may not be displayed in this view. A maximum of 20 documents per page are allowed in this view.

Abstract List View
: The Abstract List View can show the greatest detail regarding each document, and is used for browsing the abstract and other fields. This is the only view in which the abstract is available. A maximum of 10 documents per page are allowed in this view.

Figure 22:
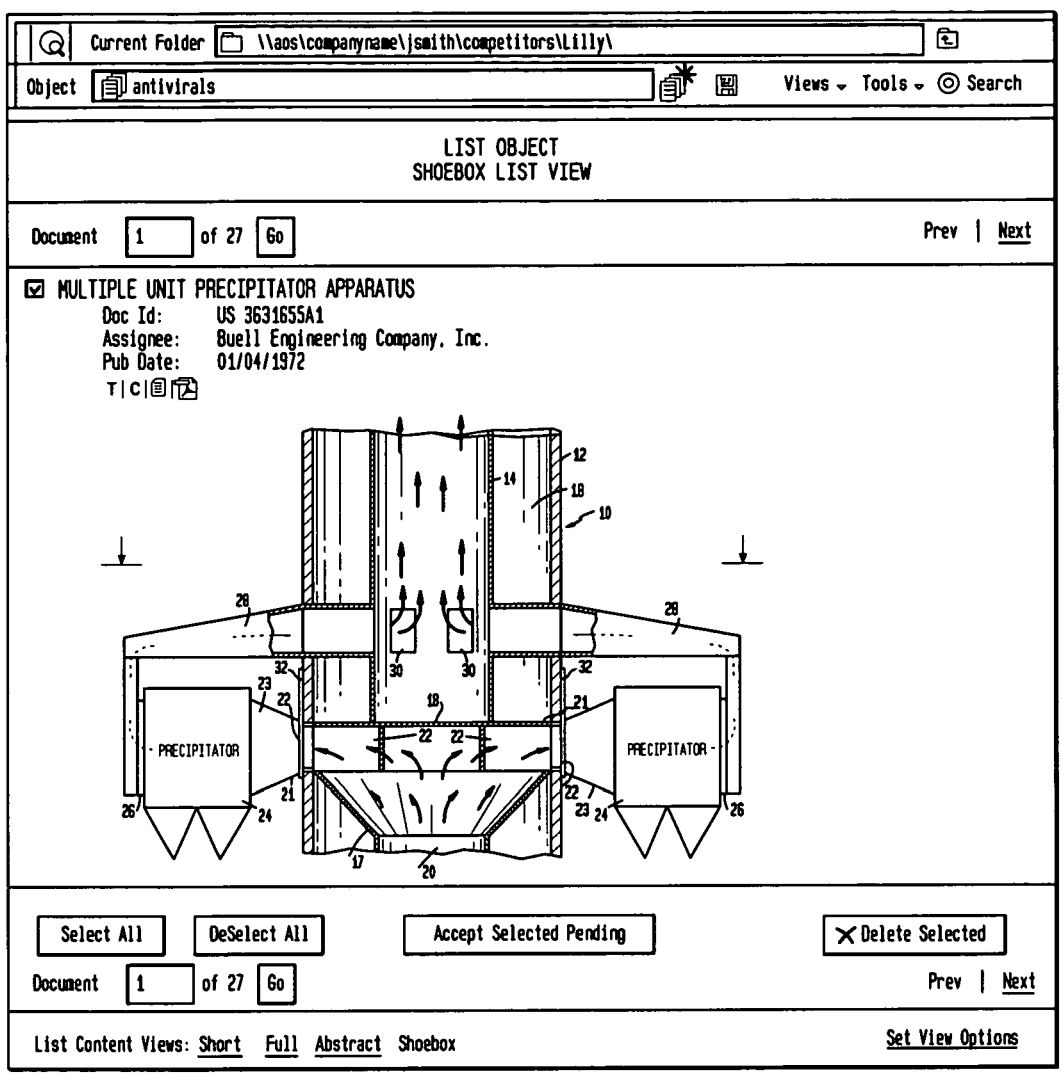

Shoebox List View (see, for example, FIG. 22)
: The Shoebox List View is used for browsing thru Primary Drawings. If no Primary Drawing is available, the Front Page Thumbnail is presented. The fields available for display in this view are very limited to conserve screen space and allow rapid page loading. A maximum of 5 documents per page are allowed in this view.

4.1.9. Query Objects

Figure 23:
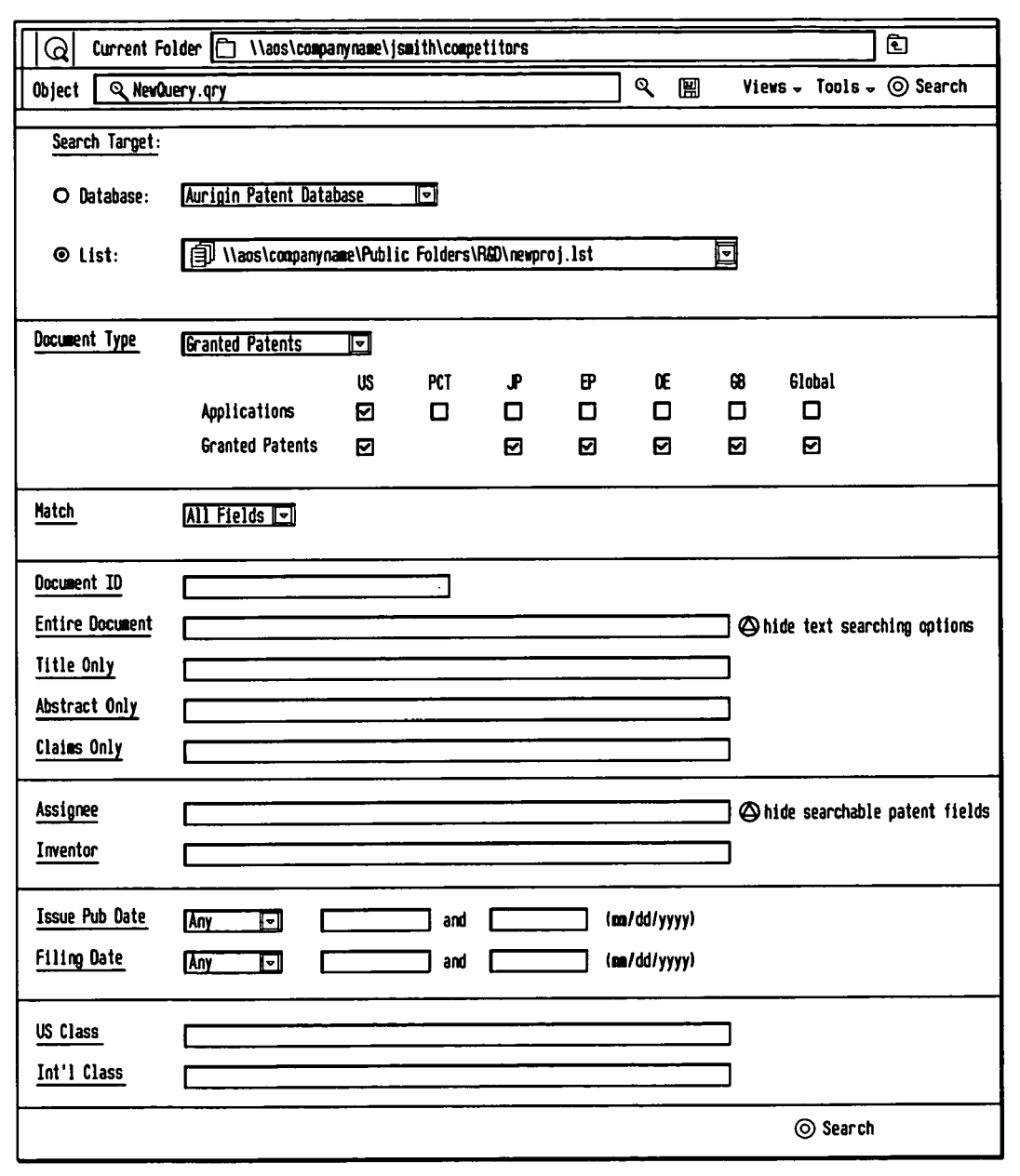

Query operations may be executed against any supported database/search engine. Depending on the database/search engine, queries may be structured in searchscreen format and/or native query strings. For example, an initial Query Object implementation for a Dialog search could provide a screen for entering the Dialog search command string; a later implementation could provide a search form that automatically generates Dialog command strings. See, for example, FIG. 23.

Query specific attributes include the following:

Database name/provider
Query string
: The query string is preferably in a displayable/modifiable format—i.e., displayed to the user as a filled-in search form showing fields available in the subject database, and/or as a native query string. Native query strings would be SQL for queries to SQLServer databases, Dialog command language for Dialog queries, etc.

4.1.10. Patent Family Dedupe

The Patent Family Dedupe operation allows users to dedupe a List of patent documents so as to keep only one member of a patent family in the result List. For example, if a list includes a U.S. patent and its PCT, Japanese, and European counterparts, this operation allows the user to delete all copies of this patent except for one.

Users will select the Family Definition that they wish to use (Inpadoc Family, Derwent Family, Identical Priority Family, or Priority-in-Common Family). Users also select Document Retention Priority, which is the priority order for keeping documents so that the retained doc from each family contains the maximum amount of useful information. An example priority order might be to retain the patents according to the following preference: 1) WPI record, 2) US grant, 3) EP-B publication in English, 4) PCT publication in English, etc.

Figure 24:
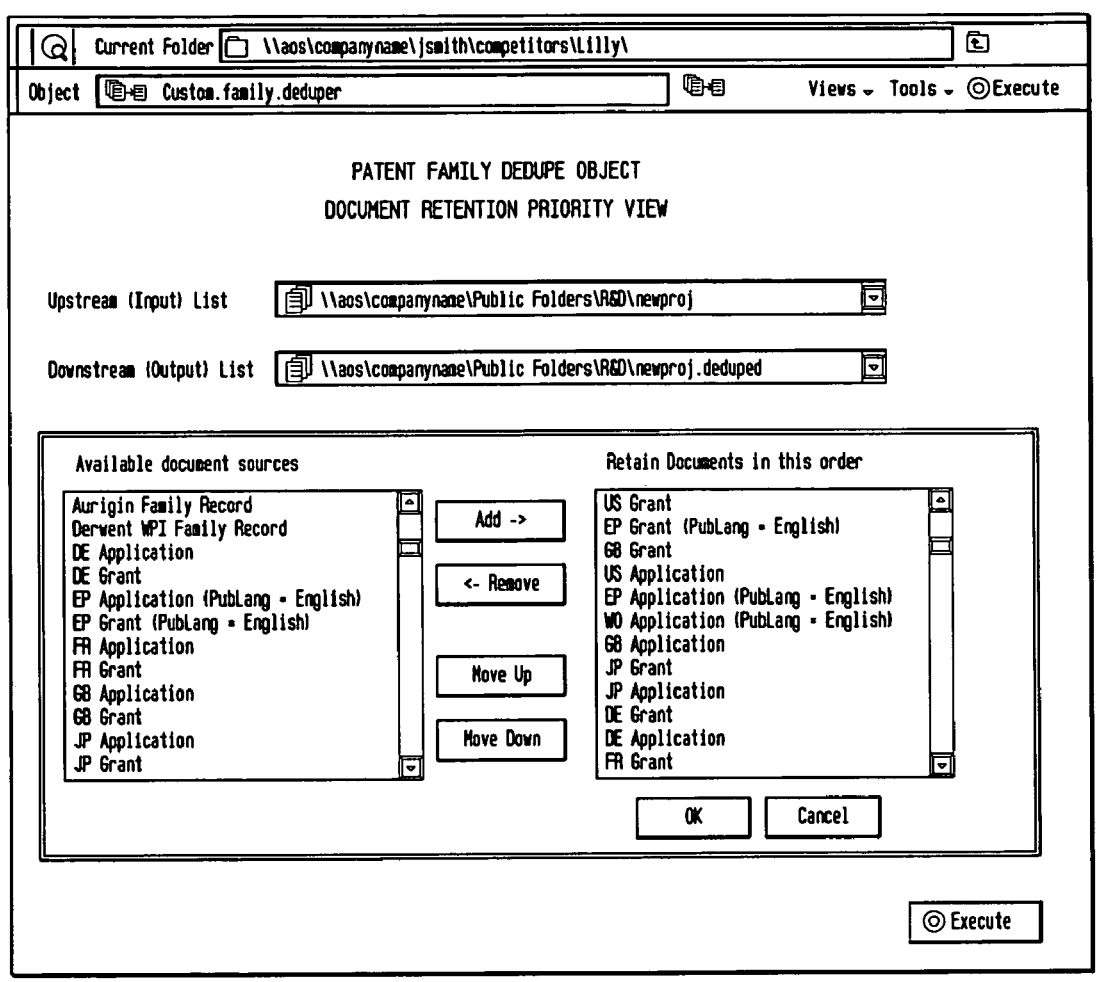

This object has the following object specific views:

Document Retention Priority View
: The Document Retention Priority View allows users to select the priority order for keeping documents so that the retained doc from each family contains the appropriate amount of useful information in the preferred language. For example, if the Output List is to be reviewed by managers who prefer only to read abstracts, then the priority order would be chosen to provide the highest quality abstract, without regard to availability of fulltext. However, if the reviewer is a scientist or engineer, the priority order might reflect the requirement for fulltext. An example priority order might be: 1) WPI record, 2) U.S. grant, 3) EP-B publication in English, 4) PCT publication in English, etc. See, for example, FIG. 24.

Figure 25:
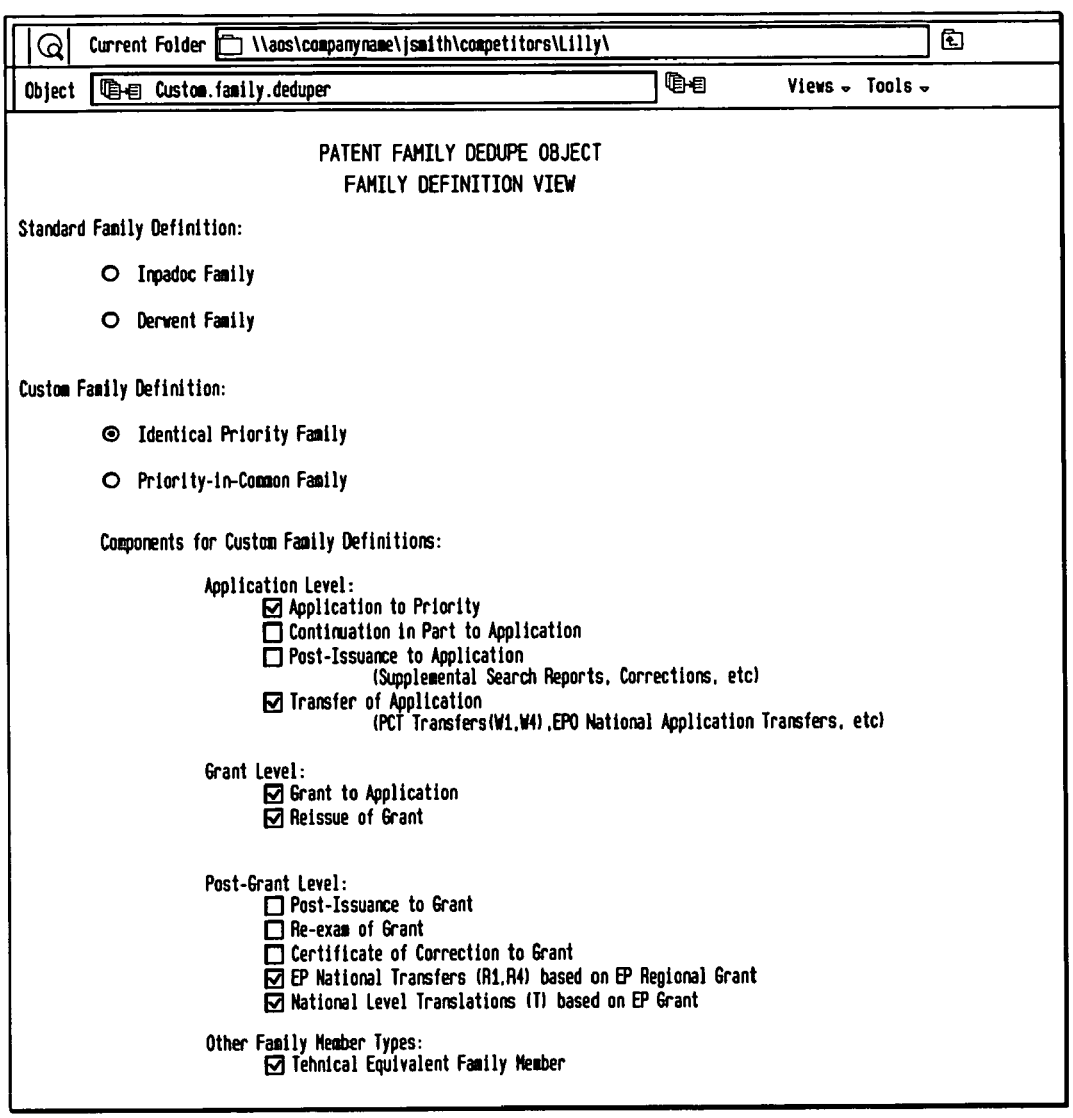

Family Definition View
: The Family Definition View allows the user to select their preferred Family Definition. Possible definitions include the standard definitions: Inpadoc Family or Derwent Family; or user-defined families based on either Identical Priority or Priority-in-Common. For user-defined families, the user must select the specific document-to-document relationships that the user considers to be a Family Relationship. See, for example, FIG. 25.

4.1.11. Patent Family Expand Object

The Patent Family Expand operation allows users to expand a List of patent documents so that for each patent family represented in the Input List, all family members are included in the Result List. For example, if a List includes a particular U.S. patent, this operation causes all counterpart patent applications and patents to be inserted into the List.

Membership in a family is determined by the user's choice of Family Definition (Inpadoc Family, Derwent Family, Identical Priority Family, or Priority-in-Common Family). The user may also choose which types of documents to include, i.e., Pseudo-Docs, Primary Patent Docs, and/or Secondary Patent Docs.

Figure 26:
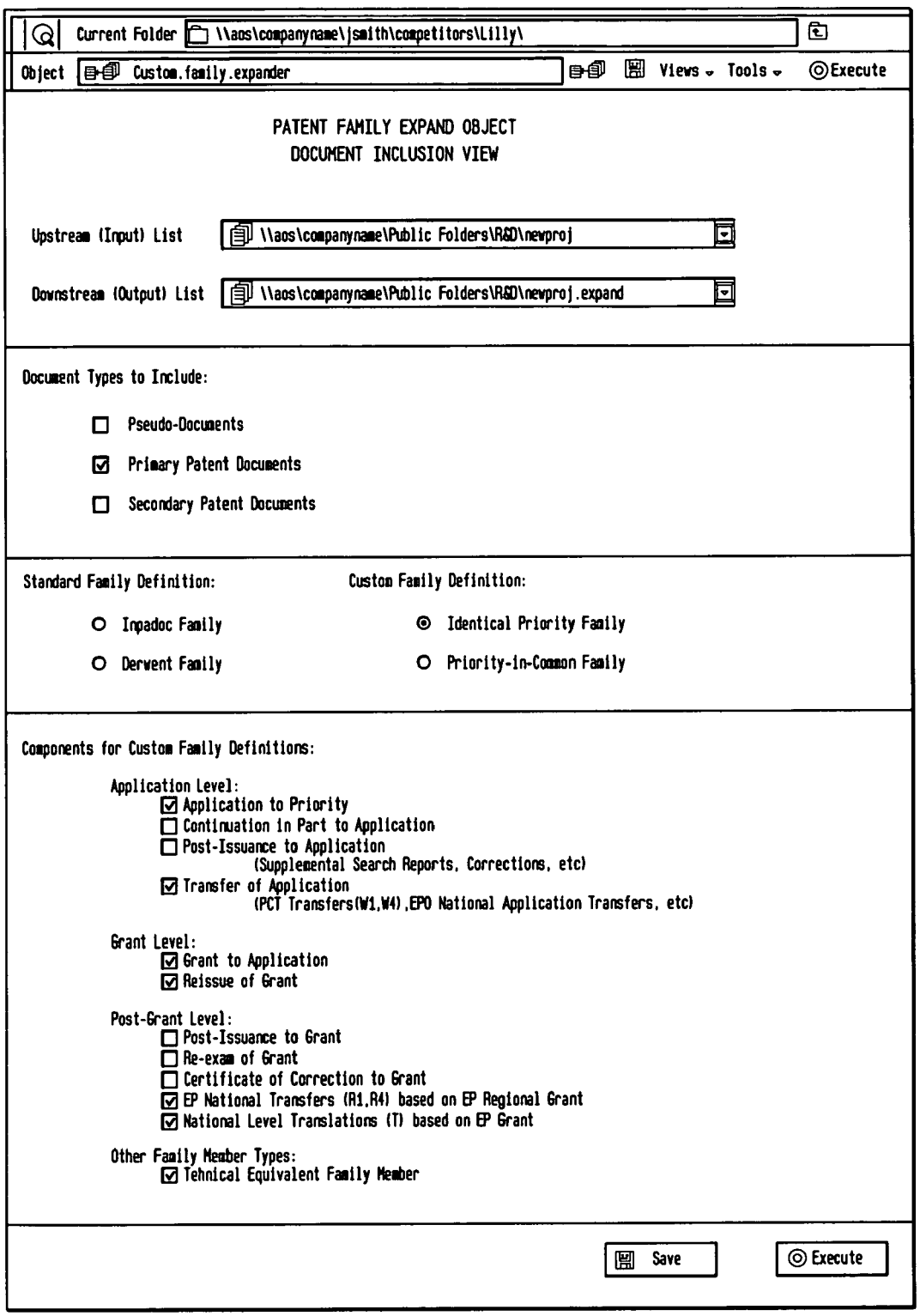

This object has an object-specific view called the Document Inclusion View. The Document Inclusion View allows the user to select the Input List, Result List, Document Types to include, and the preferred Family Definition. Possible Family Definitions include the standard definitions (Inpadoc Family or Derwent Family), or custom Family Definitions (based on either Identical Priority or Priority-in-Common). For custom Family Definitions, the user must select the specific document-to-document relationships that the user considers to be a Family Relationship. See, for example, FIG. 26.

4.2. Work Flow (Process) Example

Figure 10A:
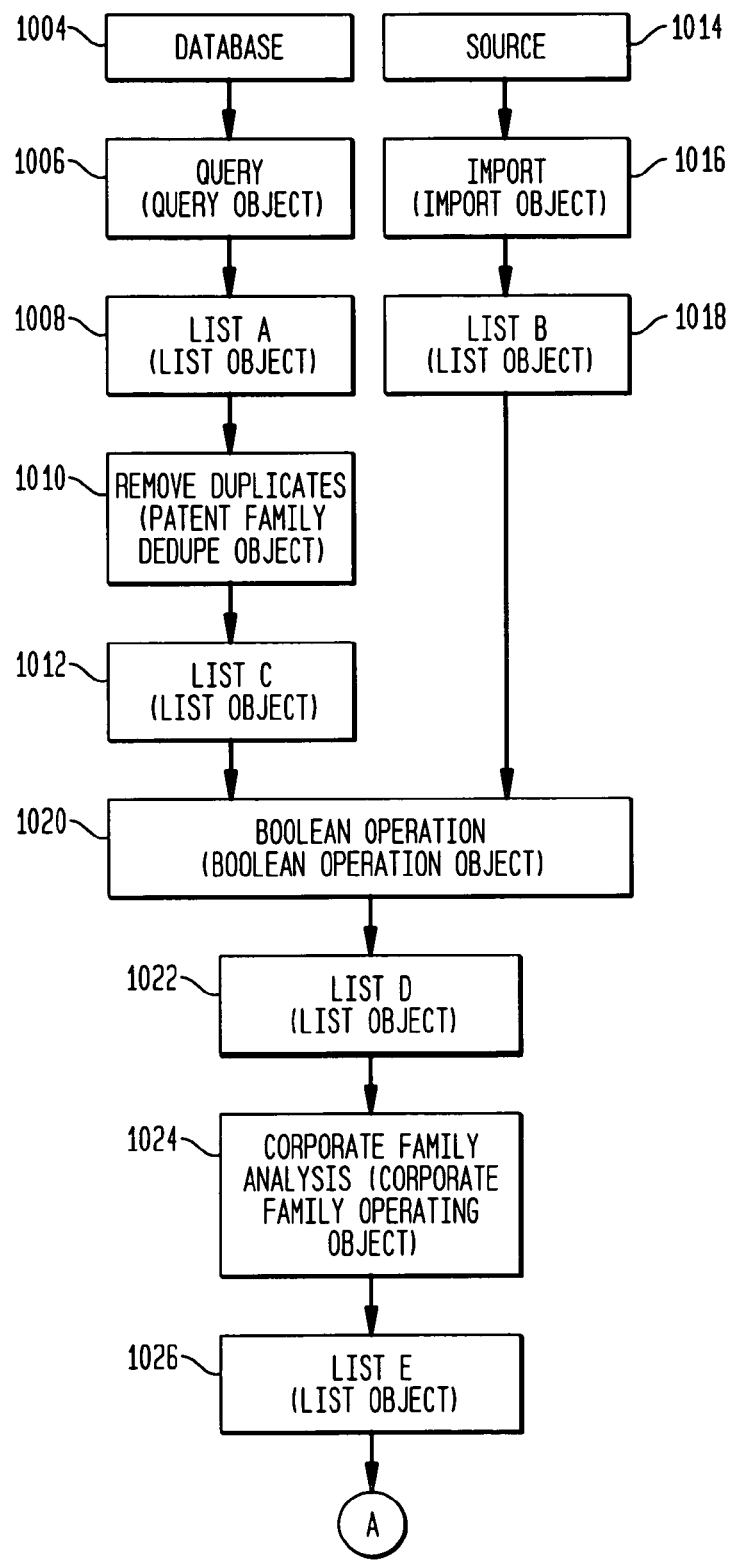
FIGS. 10A and 10B depict another example work flow diagram according to an embodiment of the invention.
Figure 10B:
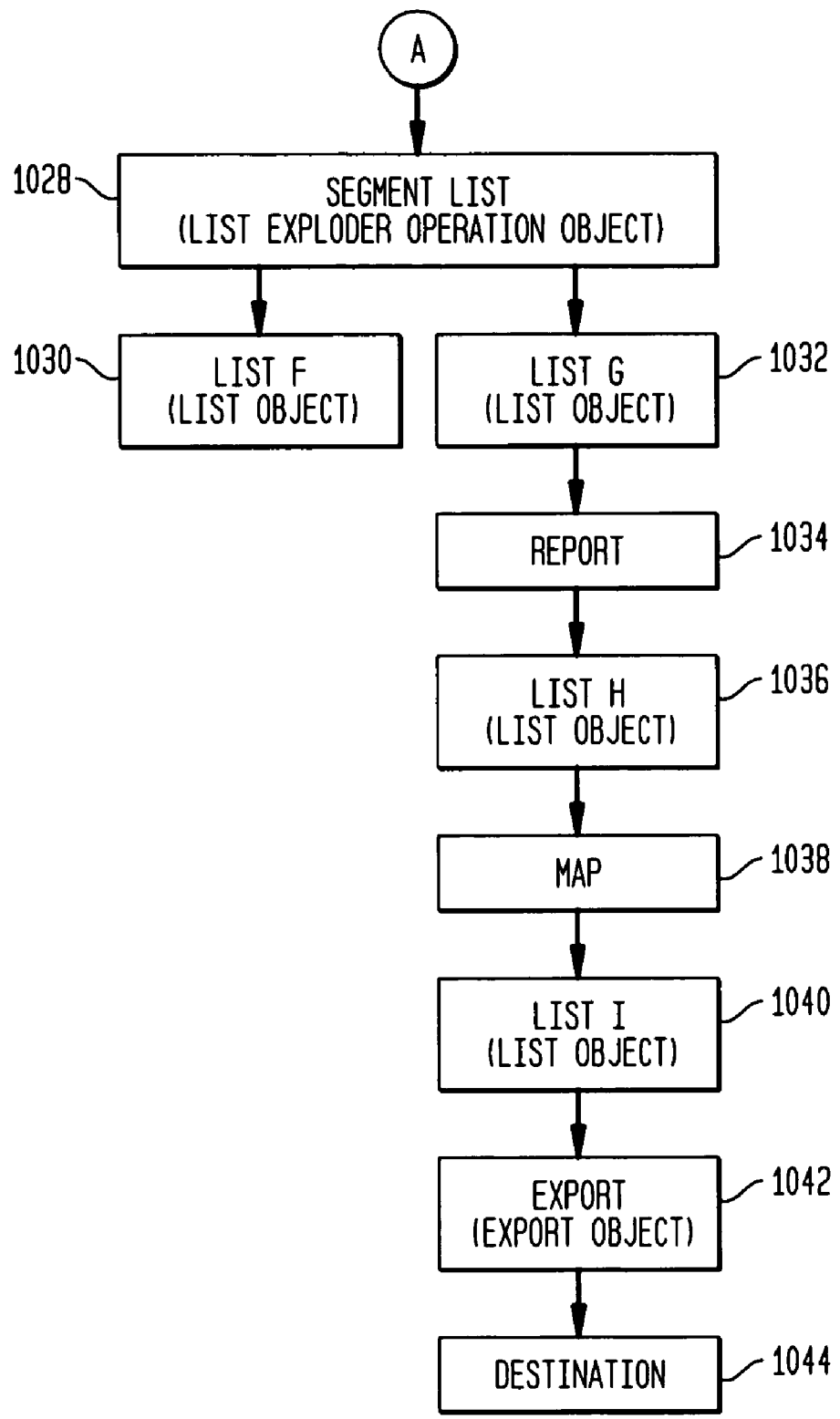

FIGS. 10A and 10B illustrate an example work flow diagram 1002 that shall be used to further illustrate the object features of the invention. This diagram 1002 indicates the objects that are created for components of the work flow.

In step 1006, a query is conducted on a database 1004. A query object is created for the query.

In step 1008, List A results from the query, and a list object corresponding to List A is created.

In step 1010, duplicate patents are removed from List A. A patent family dedupe object is created corresponding to this operation.

In step 1012, List C results from the operation of step 1010, and a list object corresponding to List C is created.

In step 1016, documents are imported from some source 1014. This creates an import object.

In step 1018, List B results from the operation of step 1016, and a list object corresponding to List B is created.

In step 1020, a boolean operation is performed on List C and List B. This results in a boolean operation object.

In step 1022, List D results from the operation of step 1020, and a list object corresponding to List D is created.

In step 1024, a corporate family analysis is performed to identify patents contained in List D that are assigned to a particular corporate entity. This results in a corporate family operating object.

In step 1026, List E results from the operation of step 1026, and a list object corresponding to List E is created.

Referring now to FIG. 10B, in step 1028, List E is divided into multiple lists according to some criteria selected by the user. This results in a list exploder operation object.

As a result of step 1028, List F (step 1030) and List G (step 1032) are created. This results in list objects corresponding to Lists F and G.

In step 1034, some report is performed on List G. This results in an application object being created.

In step 1036, List H results from the operation of step 1034, and a list object corresponding to List H is created.

In step 1038, a mapping operation is performed on the List H. This results in an application object being created.

In step 1040, List I results from the operation of step 1038, and a list object corresponding to List I is created.

In step 1042, List I is exported to some destination 1044. This results in an export object being created.

The work flow of FIGS. 10A and 10B is then complete. The objects generated during the work flow may be save and then re-used at a later time, as described above.

5. Object Manager and Database

Objects are stored in an object database. The invention also provides an object manager for manipulating objects.

Figure 27:
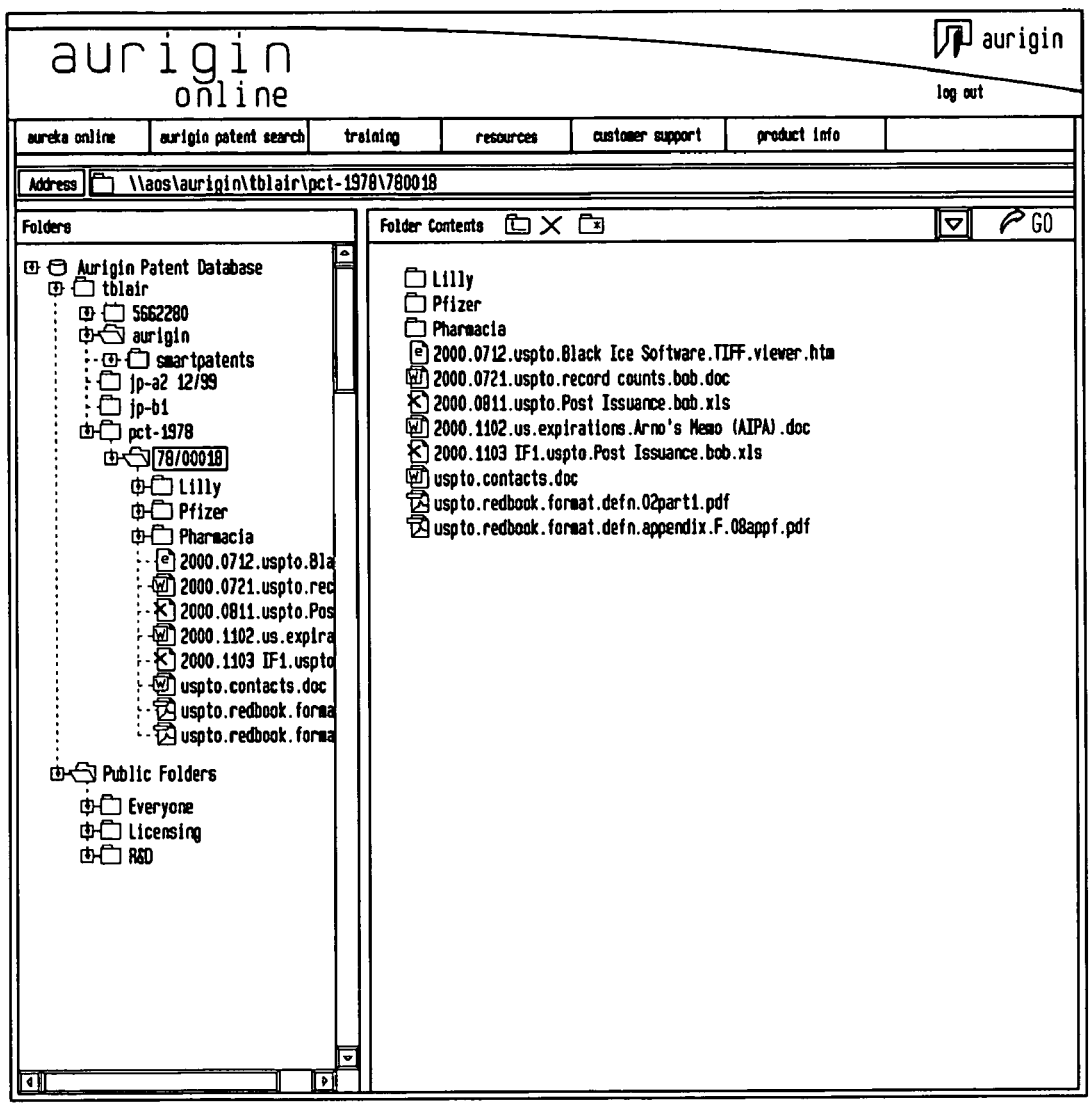

The Object Manager is a tool for visualizing the Folder hierarchy within the Object Database. See, for example, FIG. 27. When the Object Manager is open, the page is framed, dividing the screen into three areas:

(1) the header/menu bar area at the top;
(2) the Object Manager pane on the left, displaying the folder hierarchy as an indented outline;
(3) the Work Pane on the right, which is used for a variety of tasks and objects.

When the Object Manager is active and a folder is selected, the Work Pane displays the folder contents. When the Object Manager is active and an object is selected, the Work Pane displays that object's Default View.

6. Example Modules of the Invention

6.1. Clustering Tools

Figure 7:
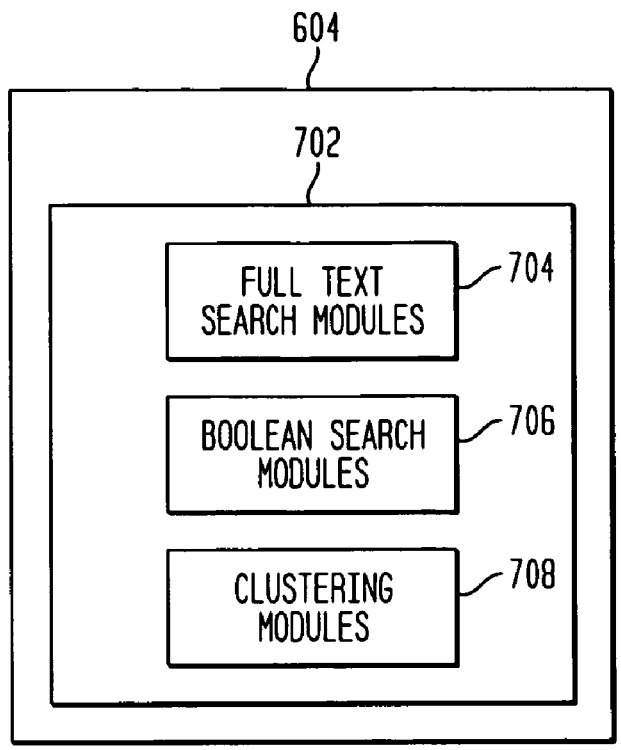
FIG. 7 is a block diagram of various searching modules according to an embodiment of the invention.

Referring to FIG. 7, the invention supports various clustering modules for analyzing documents. Such clustering modules organize documents into meaningful groups. More specifically, such clustering modules analyze documents and organize them into a hierarchy or tree according to their content (using, for example, a well-known "Windows Explorer"-style interface).

Generally, some embodiments of the clustering modules operate by parsing the documents to extract particular information. The information may be extracted from unstructured data contained in the document (such as the specification of a patent), and/or from structured data contained in the document (such as meta data, i.e., titles, authors, abstracts, etc.). The documents are then grouped according to this information. The invention supports clustering modules that operate differently than just described.

Figure 31:
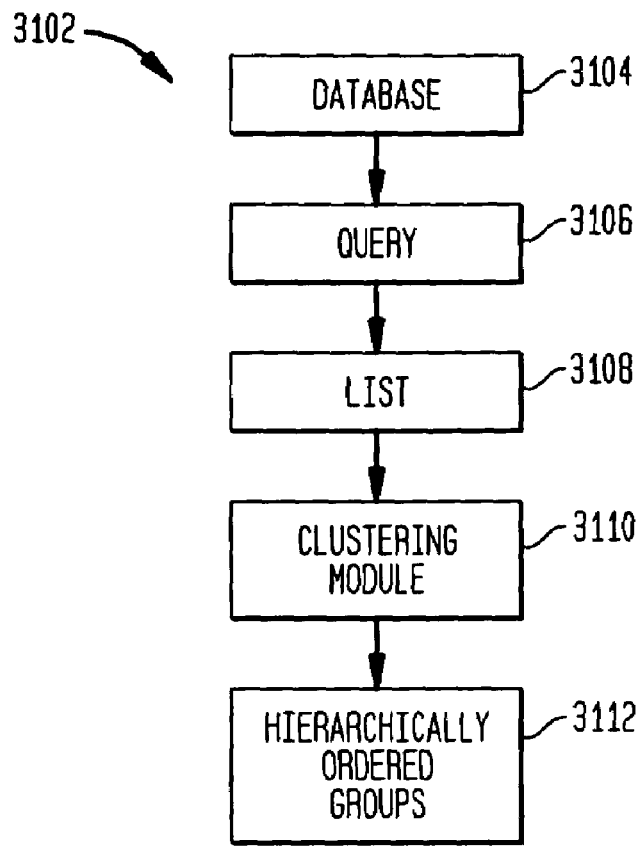
FIG. 31 is an example work flow diagram involving the use of a clustering module according to an embodiment of the invention.

FIG. 31 illustrates an example process (work flow) diagram 3102 that involves a cluster module. In step 3106, a query is made over a database 3104. This results in a list 3108 of documents. Suppose that the query was directed to CDMA (code division multiple access). In this case, the list 3108 would include documents that related in some way to CDMA.

However, the list 3108 could include hundreds or thousands (or more) of documents, all relating in some way to CDMA. The user might only be interested in a particular CDMA topic, such as GSM.

Figure 32:
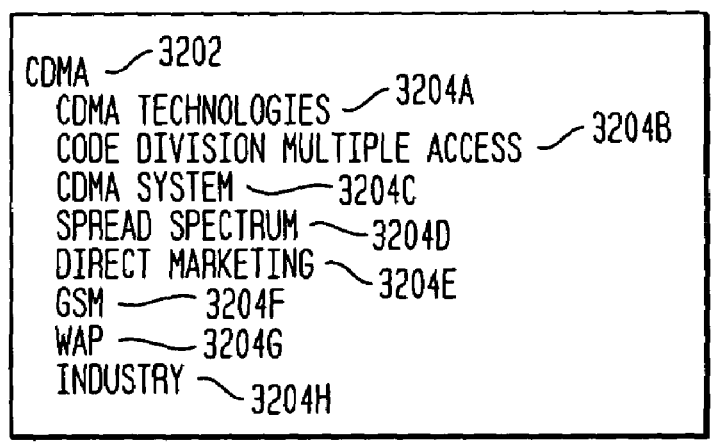
FIG. 32 is an example display produced by a cluster module according to an embodiment of the invention.

In the example of FIG. 31, in step 3110, the list 3108 is processed by a clustering module. The clustering module operates to analyze the documents in the list and assign them to categories according to their content (as represented by their unstructured and/or structuured portions). In an embodiment, each of these categories represents a group. The categories may have sub-categories, each of which also represents a group (or sub-group). Accordingly, the clustering module produces from the list 3108 hierarchically ordered groups 3112. These groups can then be processed as elsewhere described herein. An example of this hierarchical tree is shown in FIG. 32.

An example of a clustering module that operates as just described is Vivisimo of Pittsburgh, Pa., although the invention is not limited to this example.

6.2. Relevancy Visualization Tool

The invention supports other modules for processing and organizing documents. For example, the invention supports a relevancy visualization (RV) module that extracts key terms from documents (from unstructured and/or structured portions of the documents), assigns them to meaningful categories (a taxonomy), and establishes their inter-relationships. As a result, the RV module generates a highly structured body of information that users can slice as needed. Users can generate patterns related to the documents in a variety of visual forms such as maps, tables and graphs.

More particularly, the RV module analyzes a group of documents to identify how those documents relate to various key terms, and/or relate to each other with regard to (or relative to) those key terms. For example, suppose the key term is "assignee." In this patent related example, the RV module would analyze a group of patents to determine who their assignees are. The RV performs this task by performing a key word search of the documents, for example.

Figure 34:
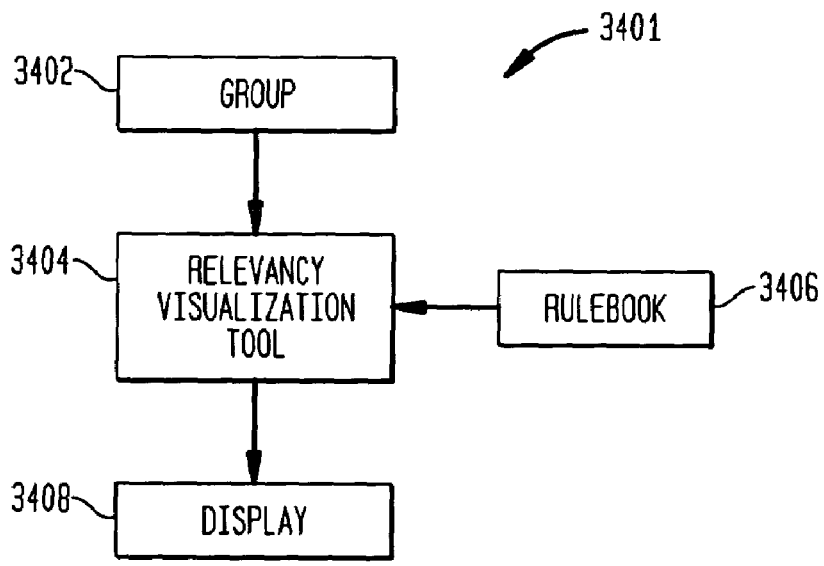
FIG. 34 is an example work flow diagram involving the use of a relevancy visualization module according to an embodiment of the invention.

FIG. 34 illustrates an example work flow diagram involving the RV module. In step 3404, the RV module analyzes a group 3402 of documents according to key terms that the user previously supplied. In particular, the RV module determines the relevance of these key terms on the documents. The output of the RV module is displayed in step 3408. An example display is shown in FIG. 35.

In embodiments, the RV module operates according to a rule book 3406. The rule book comprises a set of instructions describing specific linguistic patterns relevant to a particular vertical market or horizontal discipline, such as patents. The rulebook tells the module what concepts and relationships to retrieve from the text documents.

In an embodiment, the rule book 3406 includes rules to analyze patents. The rule book may include instructions to analyze patents according to the following key terms: assignee and inventor. When processing a group of patents (as shown in the example of FIG. 34), the RV module 3404 would analyze the patents in the group 3402 to identify the assignees and the inventors of the patents. This information would then be displayed in step 3408, as shown for example in FIG. 35.

Figure 35:
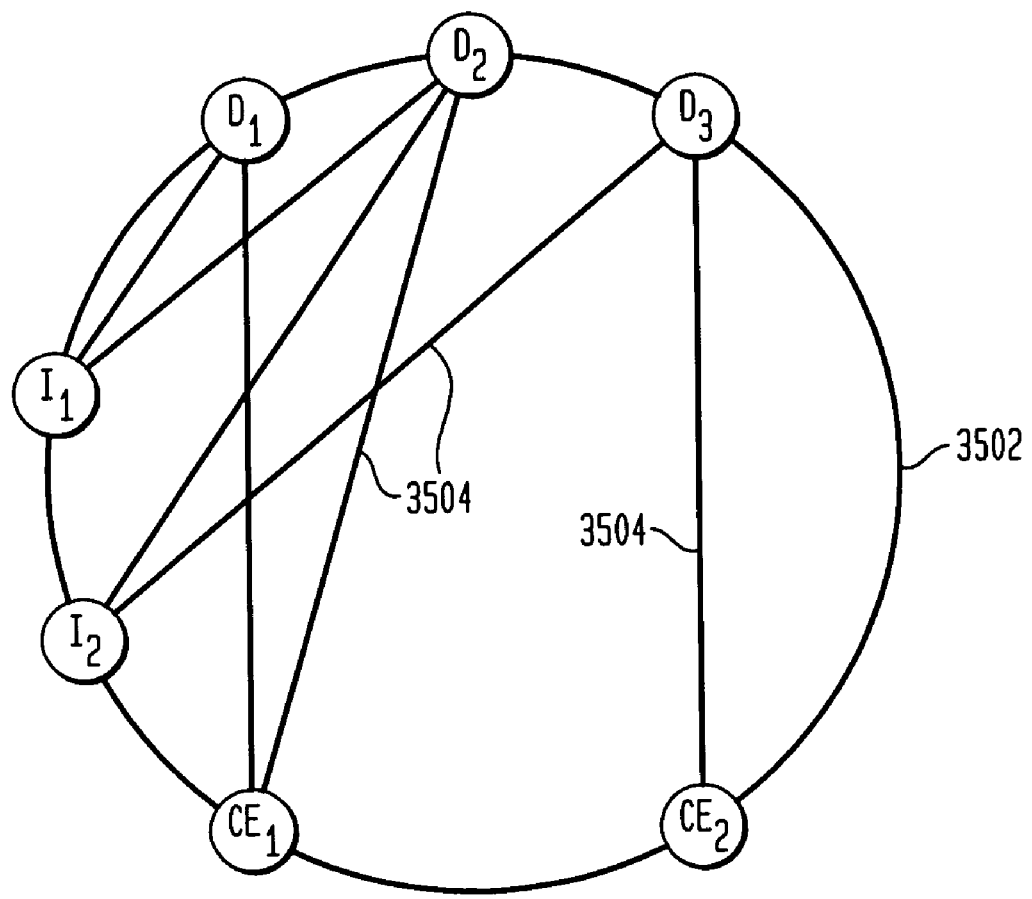
FIG. 35 is an example display produced by a relevancy visualization module according to an embodiment of the invention.

FIG. 35 indicates that document D1 has inventor I1 and assignee CE1. Document D2 has inventors I1 and I2 and assignee CE1. Document D3 has inventor I2 and assignee CE2.

An example of this module is ClearForest of New York, N.Y., although the invention is not limited to this example.

6.3. Patent Family Expand Features

This section describes features of the invention relating to processing patent families. A patent family is a collection of patent documents that are related to one another in some way. For example, a patent family may include a U.S. provisional application, a corresponding U.S. non-provisional application, a corresponding PCT application, and a Japanese patent that was filed from the PCT application.

Requirements

This section describes requirements needed to support the patent family features according to an embodiment of the invention.

Family Relationship Types

The following family relationship types must be represented in the database. Other relationship types may be added based on analysis of each country's patenting process.

Unstructured Family Relationships

Unstructured Family Relationships do not provide specifics of how one document is related to another—only that a relationship exists. Priority data is contained in many databases. For example, tables of family members are contained in Inpadoc PFS and Derwent WPI. Technical Equivalents are patent documents that cover the same invention as other members of the family, but for a variety of reasons are not linked thru common priorities. Following are the Unstructured Family Relationship types:

Priority

Technical Equivalent Family Member

Inpadoc Family

Derwent Family

Structured Family Relationships

Structured family relationships describe the specifics of how one document is related to another in a family. These relationships are programmatically derived based on knowledge of each country's patenting process, numbering system, and database fields. For example, an EP grant has the same Doc ID as its corresponding application, except that the kind code is different. Following is a list of some Structured Family Relationship types.

Application to Priority

Grant to Priority

Continuation in Part to Application

Post-Issuance to Application

Eg: Supplemental Search Reports, Corrections, etc

Grant to Application

Post-Issuance to Grant

Re-exam of Grant

Reissue of Grant

Certificate of Correction to Grant

EP National Transfers (R1, R4) based on EP Regional Grant

National Level Translations (T) based on EP Grant

Transfer of Application Eg: PCT Transfers (W1, W4), EPO National Application Transfers Family Definitions For a variety of functions supported by the invention, the user chooses the Family Definition desired. Family Definitions include Standard and Custom Families.

Standard Family Definitions

Inpadoc Family

The Inpadoc Family links documents appearing in the family table in the Inpadoc PFS database. These families are based on Priority-In-Common, but also have some Technical Equivalent family members as identified by Inpadoc/EPO.

Derwent Family

The Derwent Family links documents appearing in the family table in the Derwent WPI database.

Custom Family Definitions

Family Definitions are fundamentally either Identical Priority or Priority-In-Common. However, in an embodiment these definitions also allow the user to select which Family Relationship Types to include or exclude. For example, a user may choose to exclude all post-issuance documents so as to focus only on Primary Patent Documents.

Identical Priority Family

This definition requires that all family members have exactly the same set of priority documents.

Priority-in-Common Family

This definition includes in the family any document that has at least one priority document in common with other docs in the family.

Document Types

In order to facilitate the Usages below, documents within the system are identified according to a Document Type. The following Document Types will be represented:

Pseudo-Docs

This is a classification for non-issued documents, such as US applications prior to 2001. A Pseudo-Doc has data associated with it (eg U.S. application number, application date, and family relationships), but is not actually an issued document.

Primary Patent Docs

This includes publications of Applications, Grants, Reissues. Primary Patent Docs would be identified as such in Lists.

Secondary Patent Doc

This includes post-issuance docs such as Supplementary Search Reports (EP-A3, EP-A4), Certificates of Correction, etc.

Usage of Patent Family Data

Family Report

A Family Report is a listing of the family members for a particular document. In embodiments, this report requires the patent family table data from Inpadoc, and can present only the Inpadoc Patent Family. In other embodiments, as Derwent Family data is acquired and Family RelationshipTypes are identified, the Family Report will be able to present all Family Definitions.

Family Tree

Figure 33:
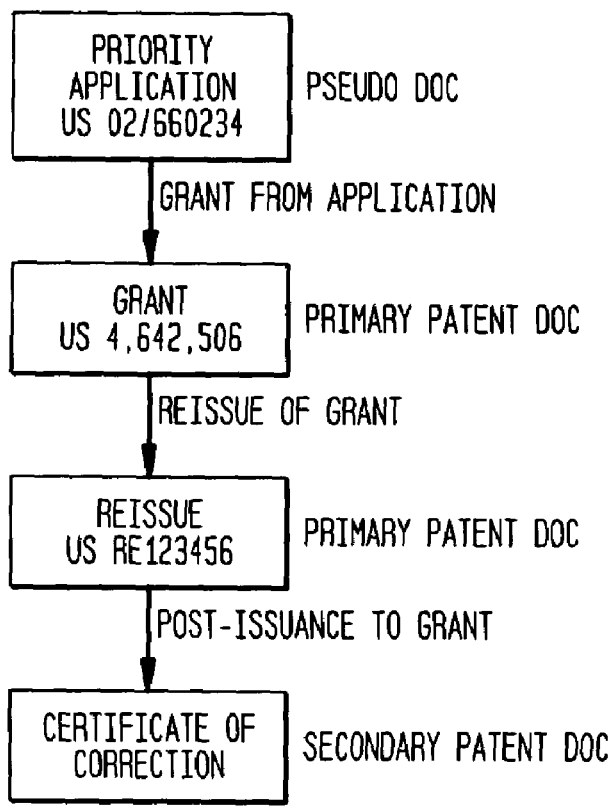
FIG. 33 is an example family tree generated by the invention.

A Family Tree is a graphical representation of the relationships between each of the documents in the family. Users choose the Family Definition desired before the graph is drawn. A Family Tree example is shown in FIG. 33.

Patent Family Expand

The Patent Family Expand operation allows users to expand a List of patent documents so that for each patent family represented in the Input List, all family members are included in the Result List. Membership in a family is determined by the user's choice of Family Definition (Inpadoc Family, Derwent Family, Identical Priority Family, or Priority-in-Common Family). The user may also choose which types of documents to include, ie Pseudo-Docs, Primary Patent Docs, and/or Secondary Patent Docs. This is further described above.

Patent Family Dedupe

The Patent Family Dedupe operation allows users to dedupe a List of patent documents so as to keep only one member of a patent family in the Result List. Users select the Family Definition that they wish to use (Inpadoc Family, Derwent Family, Identical Priority Family, or Priority-in-Common Family). Users also select Document Retention Priority, which is the priority order for keeping documents so that the retained doc from each family contains the maximum amount of useful information. An example priority order might be: 1) WPI record, 2) US grant, 3) EP-B publication in English, 4) PCT publication in English, etc. Only Primary Patent Documents are retained. This is further described above.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer-readable medium having instructions stored thereon that, if executed-by a computing device, cause the computing device to perform operations for enabling a user to organize and analyze information, the operations comprising:

searching a first group of documents according to one or more search functions to output a second group of documents, wherein the second group of documents is a subset of the first group of documents;

wherein the search functions comprise one or more of the following:
morphological functions;
lexical functions;
syntactic functions;
semantic functions;
discourse functions;
pragmatic functions;
full text functions;
Boolean functions; or
clustering functions;

analyzing a third group of documents according to one or more analytical functions to output a fourth group of documents, wherein the third group of documents is not a subset of the first group of documents, and wherein the fourth group of documents is a subset of the third group of documents;

wherein the analytical functions comprise one or more of mapping functions, citation functions, plot lineage functions, or reporting functions; and selectively iterating one or more of the searching step or the analyzing step, wherein each iteration of the searching step or the analyzing step is performed using as input the second group of documents, the fourth group of documents, or output of a previous iteration;

wherein said selectively iterating step includes:

performing an additional iteration of the searching step using as input the second group of documents, to output a fifth group of documents, wherein the fifth group of documents is a subset of the second group of documents; and performing an additional iteration of the analyzing step using as input the fourth group of documents, to output a sixth group of documents, wherein the sixth group of documents is a subset of the fourth group of documents.

2. The computer-readable medium of claim 1, the operations further comprising:

making one or more of the second group or the fourth group a permanent group.

3. The computer-readable medium of claim 1, wherein the searching comprises:

performing a cluster analysis of the first group of documents to create a hierarchical arrangement of groups containing documents from the first group, wherein the second group is one of the hierarchical arrangement of groups.

4. The computer-readable medium of claim 1, the operations further comprising:

performing a relevancy visualization analysis of one of the first group and the third group to identify how documents contained therein are inter-related with respect to key terms.

5. The computer-readable medium of claim 4, wherein relevancy visualization analysis operates according to a rule book.

6. The computer-readable medium of claim 5, wherein the rule book comprises patent specific rules.

7. The computer-readable medium of claim 1, the operations further comprising:

generating an object corresponding to a search process component or an analyze process component of a work flow represented by the searching, analyzing, and selective iterating.

8. The computer-readable medium of claim 7, wherein an object is generated using object definitions.

9. The computer-readable medium of claim 8, wherein the object definitions comprise:

a Boolean operation object definition;
a corporate family operating object definition;
an export object definition;
a folder object definition;
an import object definition;
a list exploder operation object definition;
a list object definition;
a query object definition; or
a patent family dedupe object definition.

10. The computer-readable medium of claim 7, the operations further comprising:
saving the object.

11. The computer-readable medium of claim 7, the operations further comprising:
re-executing the work flow by traversing the object.

12. The computer-readable medium of claim 7, the operations further comprising:
creating a new work flow by modifying the object.

13. The computer-readable medium of claim 1, the operations further comprising:
annotating one or more of the first group, third group, or any portion of any document contained in the first group or the third group.

14. The computer-readable medium of claim 1, wherein the first group of documents is from one or more of a database, an external source, or the Internet.

15. A computer-implemented method of organizing and analyzing information, the method comprising:
initiating a search of a first group of documents according to one or more selected search functions to output a second group of documents, wherein the second group of documents is a subset of the first group of documents;
initiating an analysis of a third group of documents according to one or more analytical functions to output a fourth group of documents, wherein the third group of documents is not a subset of the first group of documents, and wherein the fourth group of documents is a subset of the third group of documents;
wherein the one or more analytical functions are performed by a computing device, and wherein the one or more analytical functions are selected from a group comprising mapping functions, citation functions, plot lineage functions, or reporting functions; and
selectively iterating one or more of the searching step or the analyzing step, wherein each iteration of the searching step or the analyzing step is performed using as input the second group of documents, the fourth group of documents, or output of a previous iteration;
wherein said selectively iterating step includes:
performing an additional iteration of the searching step using as input the second group of documents, to output a fifth group of documents, wherein the fifth group of documents is a subset of the second group of documents; and
performing an additional iteration of the analyzing step using as input the fourth group of documents, to output a sixth group of documents, wherein the sixth group of documents is a subset of the fourth group of documents.

16. The computer-implemented method of claim 15, further comprising:
making one of the second group or the fourth group a permanent group.

17. The computer-implemented method of claim 15, wherein the initiating a search comprises:
initiating a performance of a cluster analysis of the first group of documents to create a hierarchical arrangement of groups containing documents from the first group, wherein the second group is one of the hierarchical arrangement of groups.

18. The computer-implemented method of claim 15, further comprising:
initiating a performance of a relevancy visualization analysis of one of the first group and the third group to identify how documents contained therein are inter-related with respect to key terms.

19. The computer-implemented method of claim 18, wherein relevancy visualization analysis operates according to a rule book.

20. The computer-implemented method of claim 19, wherein the rule book comprises patent specific rules.

21. The computer-implemented method of claim 15, further comprising:
initiating a generation of an object corresponding to a search process component or an analysis process component of a work flow represented by the initiating of a search, the initiating of an analysis, and the selective initiating of at least one iteration.

22. The computer-implemented method of claim 21, wherein an object is generated using object definitions.

23. The computer-implemented method of claim 22, wherein the object definitions comprise:
a Boolean operation object definition;
a corporate family operating object definition;
an export object definition;
a folder object definition;
an import object definition;
a list exploder operation object definition;
a list object definition;
a query object definition; or
a patent family dedupe object definition.

24. The computer-implemented method of claim 21, further comprising:
initiating a save of the object.

25. The computer-implemented method of claim 21, further comprising:
initiating a re-execution of the work flow, wherein re-execution is accomplished by traversing the object.

26. The computer-implemented method of claim 21, further comprising:
creating a new work flow by modifying the object.

27. The computer-implemented method of claim 15, further comprising:
annotating one or more of the first group, third group, or any portion of any document contained in the first group or the third group.

28. The computer-implemented method of claim 15, wherein the first group of documents is from one or more of a database, an external source, or the Internet.

29. A system, comprising:
a processor; and
a memory having instructions stored thereon, that, in response to execution by the processor, cause the processor to organize and analyze information, the instructions comprising:
instructions for searching a first group of documents according to one or more search functions to output a second group of documents, wherein the second group of documents is a subset of the first group of documents;
wherein the one or more search functions are selected from a group comprising morphological functions, lexical functions, syntactic functions, semantic functions, discourse functions, pragmatic functions, full text functions, Boolean functions, or clustering functions;
instructions for analyzing a third group of documents according to one or more selected analytical functions to output a fourth group of documents, wherein the third group of documents is not a subset of the first group of documents, and wherein the fourth group of documents is a subset of the third group of documents;
instructions for selectively iterating one or more of the searching step or the analyzing step, wherein each iteration of the searching step or the analyzing step is performed using as input the second group of documents, the fourth group of documents, or output of a previous iteration;

instructions for performing an additional iteration of the searching step using as input the second group of documents, to output a fifth group of documents, wherein the fifth group of documents is a subset of the second group of documents; and instructions for performing an additional iteration of the analyzing step using as input the fourth group of documents, to output a sixth group of documents, wherein the sixth group of documents is a subset of the fourth group of documents.

30. The system of claim 29, wherein the instructions further comprise instructions for making one or more of the second group or the fourth group a permanent group.

31. The system of claim 29, wherein the instructions further comprise instructions for performing a cluster analysis of the first group of documents to create a hierarchical arrangement of groups containing documents from the first group, wherein the second group is one of the hierarchical arrangement of groups.

32. The system of claim 29, wherein the instructions further comprise instructions for performing a relevancy visualization analysis of one of the first group and the third group to identify how documents contained therein are inter-related with respect to key terms.

33. The system of claim 32, wherein relevancy visualization analysis operates according to a rule book.

34. The system of claim 33, wherein the rule book comprises patent specific rules.

35. The system of claim 29, wherein the instructions further comprise instructions for generating an object corresponding to a search process component or an analyze process component of a work flow represented by the searching, the analyzing, and the selective iteration.

36. The system of claim 35, wherein an object is generated using object definitions.

37. The system of claim 36, wherein the object definitions comprise:
a Boolean operation object definition;
a corporate family operating object definition;
an export object definition;
a folder object definition;
an import object definition;
a list exploder operation object definition;
a list object definition;
a query object definition; or
a patent family dedupe object definition.

38. The system of claim 35, wherein the instructions further comprise instructions for saving the object.

39. The system of claim 35, wherein the instructions further comprise instructions for re-executing the work flow by traversing the object.

40. The system of claim 35, wherein the instructions further comprise instructions for creating a new work flow by modifying the object.

41. The system of claim 29, wherein the instructions further comprise instructions for annotating one of the first group, third group, or any portion of any document contained in the first group or the third group.

42. The system of claim 29, wherein the first group of documents is from one or more of a database, an external source, or the Internet.

43. A computer program product having instructions stored thereon that, in response to execution by a computing device, cause the computing device to organize and analyze information, the instructions comprising:

instructions for searching a first group of documents according to one or more search functions to output a second group of documents, wherein the second group of documents is a subset of the first group of documents;

wherein the one or more search functions are selected from a group comprising morphological functions, lexical functions, syntactic functions, semantic functions, discourse functions, pragmatic functions, full text functions, Boolean functions, or clustering functions;

instructions for analyzing a third group of documents according to one or more analytical functions to output a fourth group of documents, wherein the third group of documents is not a subset of the first group of documents, and wherein the fourth group of documents is a subset of the third group of documents;

wherein the one or more analytical functions are selected from a group comprising mapping functions, citation functions, plot lineage functions, or reporting functions; and instructions for selectively iterating one or more of the searching step or the analyzing step, wherein each iteration of the searching step or the analyzing step is performed using as input the second group of documents, the fourth group of documents, or output of a previous iteration;

wherein said selectively iterating includes:

performing an additional iteration of the searching step using as input the second group of documents, to output a fifth group of documents, wherein the fifth group of documents is a subset of the second group of documents; and performing an additional iteration of the analyzing step using as input the fourth group of documents, to output a sixth group of documents, wherein the sixth group of documents is a subset of the fourth group of documents.

44. The computer program product of claim 43, the instructions further comprising:
instructions for making one or more of the second group or the fourth group a permanent group.

45. The computer program product of claim 43, wherein the instructions for searching further comprise:
instructions for performing a cluster analysis of the first group of documents to create a hierarchical arrangement of groups containing documents from the first group, wherein the second group is one of the hierarchical arrangement of groups.

46. The computer program product of claim 43, the instructions further comprising:
instructions for performing a relevancy visualization analysis of one of the first group and the third group to identify how documents contained therein are inter-related with respect to key terms.

47. The computer program product of claim 46, wherein relevancy visualization analysis operates according to a rule book.

48. The computer program product of claim 47, wherein the rule book comprises patent specific rules.

49. The computer program product of claim 43, the instructions further comprising:
instructions for generating one or more object corresponding to a search process component or analyze process component of a work flow represented by the searching, the analyzing, and the selectively iterating.

50. The computer program product of claim 49, wherein an object is generated using object definitions.

51. The computer program product of claim 50, wherein the object definitions comprise:
- a Boolean operation object definition;
- a corporate family operating object definition;
- an export object definition;
- a folder object definition;
- an import object definition;
- a list exploder operation object definition;
- a list object definition;
- a query object definition; or
- a patent family dedupe object definition.

52. The computer program product of claim 49, the instructions further comprising:
instructions for saving the object.

53. The computer program product of claim 49, the instructions further comprising:
instructions for re-executing the work flow by traversing the object.

54. The computer program product of claim 49, the instructions further comprising:
instructions for creating a new work flow by modifying the object.

55. The computer program product of claim 43, the instructions further comprising:
instructions for annotating one of the first group, third group, or any portion of any document contained in the first group or the third group.

56. The computer program product of claim 43, wherein the first group of documents is from one or more of a database, an external source, or the Internet.

57. A computing device including a computer-readable medium having instructions stored thereon that, in response to execution by the computing device, cause the computing device to perform operations comprising:
- searching a first group of documents according to one or more search functions to output a second group of documents, wherein the second group of documents is a subset of the first group of documents;
- wherein the one or more search functions are selected from a group comprising morphological functions, lexical functions, syntactic functions, semantic functions, discourse functions, pragmatic functions, full text functions, Boolean functions, or clustering functions;
- analyzing a third group of documents according to one or more analytical functions to output a fourth group of documents, wherein the third group of documents is not a subset of the first group of documents, and wherein the fourth group of documents is a subset of the third group of documents;
- wherein the one or more analytical functions are selected from a group comprising mapping functions, citation functions, plot lineage functions, or reporting functions; and
- selectively iterating one or more of the searching step or the analyzing step, wherein each iteration of the searching step or the analyzing step is performed using as input the second group of documents, the fourth group of documents, or output of a previous iteration;
- wherein the selectively iterating includes:
  - performing an additional iteration of the searching step using as input the second group of documents, to output a fifth group of documents, wherein the fifth group of documents is a subset of the second group of documents; and
  - performing an additional iteration of the analyzing step using as input the fourth group of documents, to output a sixth group of documents, wherein the sixth group of documents is a subset of the fourth group of documents.

58. The device of claim 57, the operations further comprising:
making one or more of the second group or the fourth group a permanent group.

59. The device of claim 57, wherein the searching comprises:
performing a cluster analysis of the first group of documents to create a hierarchical arrangement of groups containing documents from the first group, wherein the second group is one of the hierarchical arrangement of groups.

60. The device of claim 57, the operations further comprising:
performing a relevancy visualization analysis of one of the first group and the third group to identify how documents contained therein are inter-related with respect to key terms.

61. The device of claim 60, wherein relevancy visualization analysis operates according to a rule book.

62. The device of claim 61, wherein the rule book comprises patent specific rules.

63. The device of claim 57, the operations further comprising:
generating an object corresponding to a search process component or an analyze process component of a work flow represented by the searching, the analyzing, and the selectively iterating.

64. The device of claim 63, wherein an object is generated using object definitions.

65. The device of claim 64, wherein the object definitions comprise:
- a Boolean operation object definition;
- a corporate family operating object definition;
- an export object definition;
- a folder object definition;
- an import object definition;
- a list exploder operation object definition;
- a list object definition;
- a query object definition; or
- a patent family dedupe object definition.

66. The device of claim 63, the operations further comprising:
saving the object.

67. The device of claim 63, the operations further comprising:
re-executing the work flow by traversing the object.

68. The device of claim 63, the operations further comprising:
creating a new work flow by modifying the object.

69. The device of claim 57, the operations further comprising:
annotating one of the first group, third group, or any portion of any document contained in the first group or the third group.

70. The device of claim 57, wherein the first group of documents is from one or more of a database, an external source, or the Internet.

71. A system for organizing and analyzing information, comprising:
- a processor;
- a memory; and
- means for searching a first group of documents according to one or more search functions to output a second group of documents, wherein the second group of documents is a subset of the first group of documents;

wherein the search functions comprise one or more of the following:
morphological functions;
lexical functions;
syntactic functions;
semantic functions;
discourse functions;
pragmatic functions;
full text functions;
Boolean functions; or
clustering functions;
means for analyzing, with the processor, a third group of documents according to one or more selected analytical functions to output a fourth group of documents, wherein the third group of documents is not a subset of the first group of documents, and wherein the fourth group of documents is a subset of the third group of documents;
means for performing a selective iteration of one or more of the searching or the analyzing, wherein each iteration of the searching or the analyzing is performed using as input the second group of documents, the fourth group of documents, or output of a previous iteration;
means for performing an additional iteration of the searching using as input the second group of documents, to output a fifth group of documents, wherein the fifth group of documents is a subset of the second group of documents; and
means for performing an additional iteration of the analyzing using as input the fourth group of documents, to output a sixth group of documents, wherein the sixth group of documents is a subset of the fourth group of documents.

72. A method for enabling a user to organize and analyze information, the method comprising:
initiating a search of a first group of documents according to one or more user-selected search functions executed by one or more computing devices to output a second group of documents, wherein the second group of documents is a subset of the first group of documents;
initiating analysis of a third group of documents according to one or more analytical functions executed by one or more computing devices to output a fourth group of documents, wherein the third group of documents is not a subset of the first group of documents, and wherein the fourth group of documents is a subset of the third group of documents; and
initiating a selective iteration one or more of the searching step or the analyzing step, wherein each iteration of the searching step or the analyzing step is performed using as input the second group of documents, the fourth group of documents, or output of a previous iteration;
wherein said selective iteration includes:
initiating an additional iteration of the searching step using as input the second group of documents, to output a fifth group of documents, wherein the fifth group of documents is a subset of the second group of documents; and
initiating an additional iteration of the analyzing step using as input the fourth group of documents, to output a sixth group of documents, wherein the sixth group of documents is a subset of the fourth group of documents.

* * * * *

UNITED STATES PATENT AND TRADEMARK OFFICE
CERTIFICATE OF CORRECTION

| | | |
|---|---|---|
| PATENT NO. | : 7,797,336 B2 | |
| APPLICATION NO. | : 09/848437 | |
| DATED | : September 14, 2010 | |
| INVENTOR(S) | : Blair et al. | |

It is certified that error appears in the above-identified patent and that said Letters Patent is hereby corrected as shown below:

Title Page, (63) should read:
"Continuation-in-part of application No. 08/921,369, filed on Aug. 29, 1997, now Pat. No. 6,339,767, which is a continuation-in-part of application No. 08/867,392, filed Jun. 2, 1997, now Pat. No. 5,991,751.

Replace Paragraph beginning at Column 1, line 5 with:
--This is a continuation-in-part application of pending U.S. non-provisional application Ser. No. 08/921,369 filed Aug. 29, 1997, U.S. Pat. No. 6,339,767, titled "Using Hyperbolic Trees to Visualize Data Generated by Patent-Centric and Group-Oriented Data Processing," which is a continuation-in-part application of U.S. Pat. No. 5,991,751 titled "System, Method, and Computer Program Product for Patent-Centric and Group-Oriented Data Processing," both of which are herein incorporated by reference in their entireties.--

Column 9, line 48: Replace "On" with -- One --.

Column 9, line 54: Replace "step 110" with -- step 1110 --.

Column 12, line 56: Replace "an Downstream Objects" with -- a Downstream Object --.

Signed and Sealed this
Fourth Day of October, 2011

David J. Kappos
*Director of the United States Patent and Trademark Office*